(12) United States Patent
Ramsay

(10) Patent No.: US 6,979,002 B2
(45) Date of Patent: Dec. 27, 2005

(54) SEALING APPARATUS HAVING SEQUENTIALLY ENGAGEABLE SEALS

(75) Inventor: Thomas W. Ramsay, Waterloo (CA)

(73) Assignee: Ashbridge & Roseburgh Inc., Ontario (CA)

( * ) Notice: Subject to any disclaimer, the term of this patent is extended or adjusted under 35 U.S.C. 154(b) by 38 days.

(21) Appl. No.: 10/312,020

(22) PCT Filed: Apr. 13, 2001

(86) PCT No.: PCT/IB01/00621

§ 371 (c)(1),
(2), (4) Date: Dec. 20, 2002

(87) PCT Pub. No.: WO01/79729

PCT Pub. Date: Oct. 25, 2001

(65) Prior Publication Data

US 2004/0007821 A1  Jan. 15, 2004

(30) Foreign Application Priority Data

Apr. 13, 2000  (GB) .............................. 0013481

(51) Int. Cl.[7] .............................................. F16J 15/32
(52) U.S. Cl. ..................... 277/551; 277/320; 277/914
(58) Field of Search .................. 277/320, 321, 277/551, 562, 914, 370

(56) References Cited

U.S. PATENT DOCUMENTS

| | | | |
|---|---|---|---|
| 2,405,120 A | 8/1946 | Evans | |
| 2,836,441 A | 5/1958 | Doble | |
| 3,413,008 A | * 11/1968 | Greiner | .................. 277/505 |
| 3,434,727 A | * 3/1969 | Kollenberger | ............... 277/577 |
| 3,698,724 A | 10/1972 | Blachere et al. | |
| 3,727,923 A | 4/1973 | McEwen | |
| 3,773,336 A | 11/1973 | Walter et al. | |
| 4,008,897 A | 2/1977 | Wentworth | |
| 4,218,813 A | 8/1980 | Cather, Jr. | |
| 5,052,695 A | * 10/1991 | Curtis | .......................... 29/235 |
| 5,460,386 A | 10/1995 | McCoy et al. | |
| 5,503,404 A | 4/1996 | Newton et al. | |
| 5,820,132 A | 10/1998 | Marnot | |
| 6,098,990 A | 8/2000 | Marnot | |
| 6,152,454 A | 11/2000 | Marnot | |

FOREIGN PATENT DOCUMENTS

| | | | |
|---|---|---|---|
| DE | 23 52 944 | * | 4/1975 |
| DE | 36 10226 C1 | * | 6/1987 |

OTHER PUBLICATIONS

International Search Report mailed Aug. 6, 2001 corresponding to PCT/IB 01/00821.
Claims, Office Actions, and Amendments from U.S. Appl. No. 10/387,730.

* cited by examiner

*Primary Examiner*—Alison K. Pickard
(74) *Attorney, Agent, or Firm*—Marshall, Gerstein & Borun LLP

(57) ABSTRACT

Advantageous seal systems (1500) are provided that include a barrier member movable relative (1504) to a shaft (1550) to allow sequential engagement of resilient seal members (1506), e.g., lip seals, with the shaft. Movement of the barrier member (1504) may be effected manually or through introduction of pressurized fluid to effect piston-like movement. The disclosed seal assemblies may include an automatic leak detector and may utilize such leak detection to effectuate automatic movement of the barrier member. The barrier member may be moved relative to the shaft while the shaft is in movement, e.g., rotating or reciprocating, thereby permitting seal maintenance without interruption in operation. As seal members are sequentially brought into sealing engagement with the shaft, the previously engaged seal members contribute to the sealing performance of the seal assembly, although no longer effective to establish a stand-alone seal with the shaft.

12 Claims, 63 Drawing Sheets

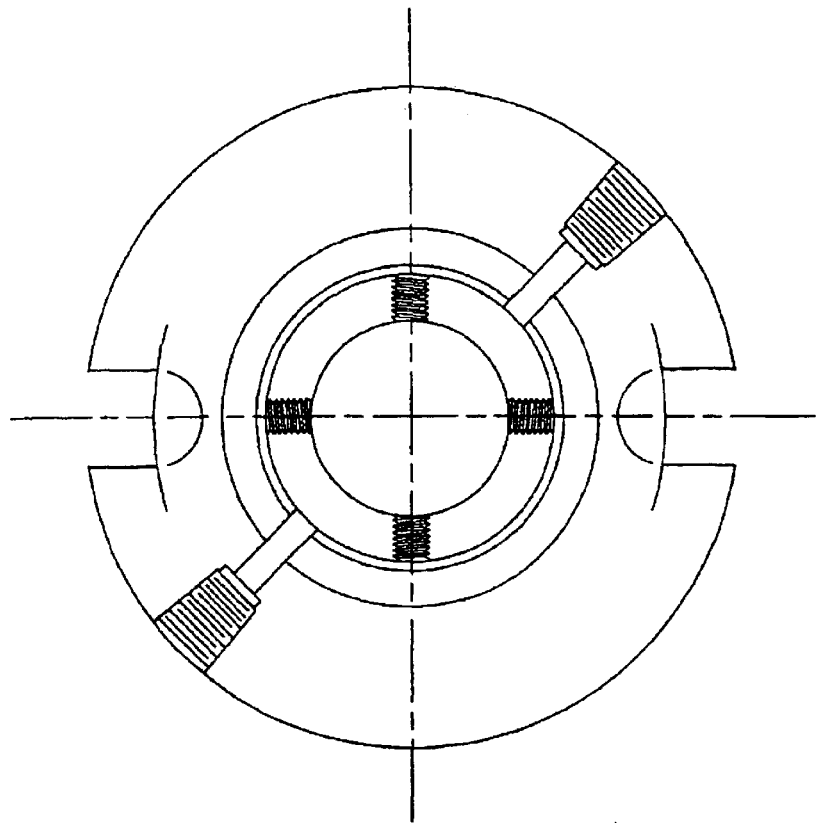
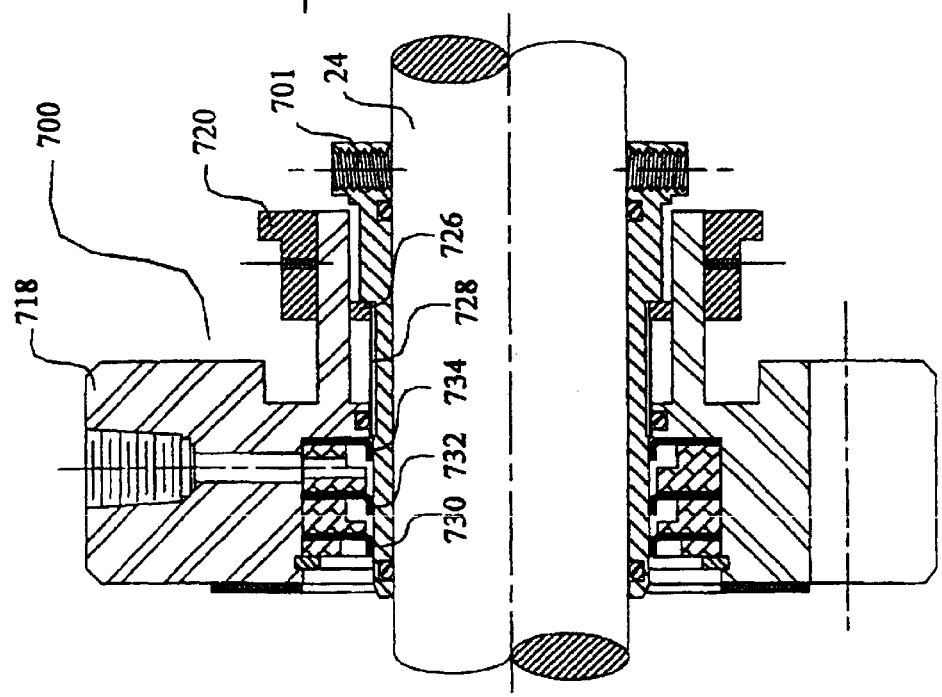
Fig 32
Fig 31

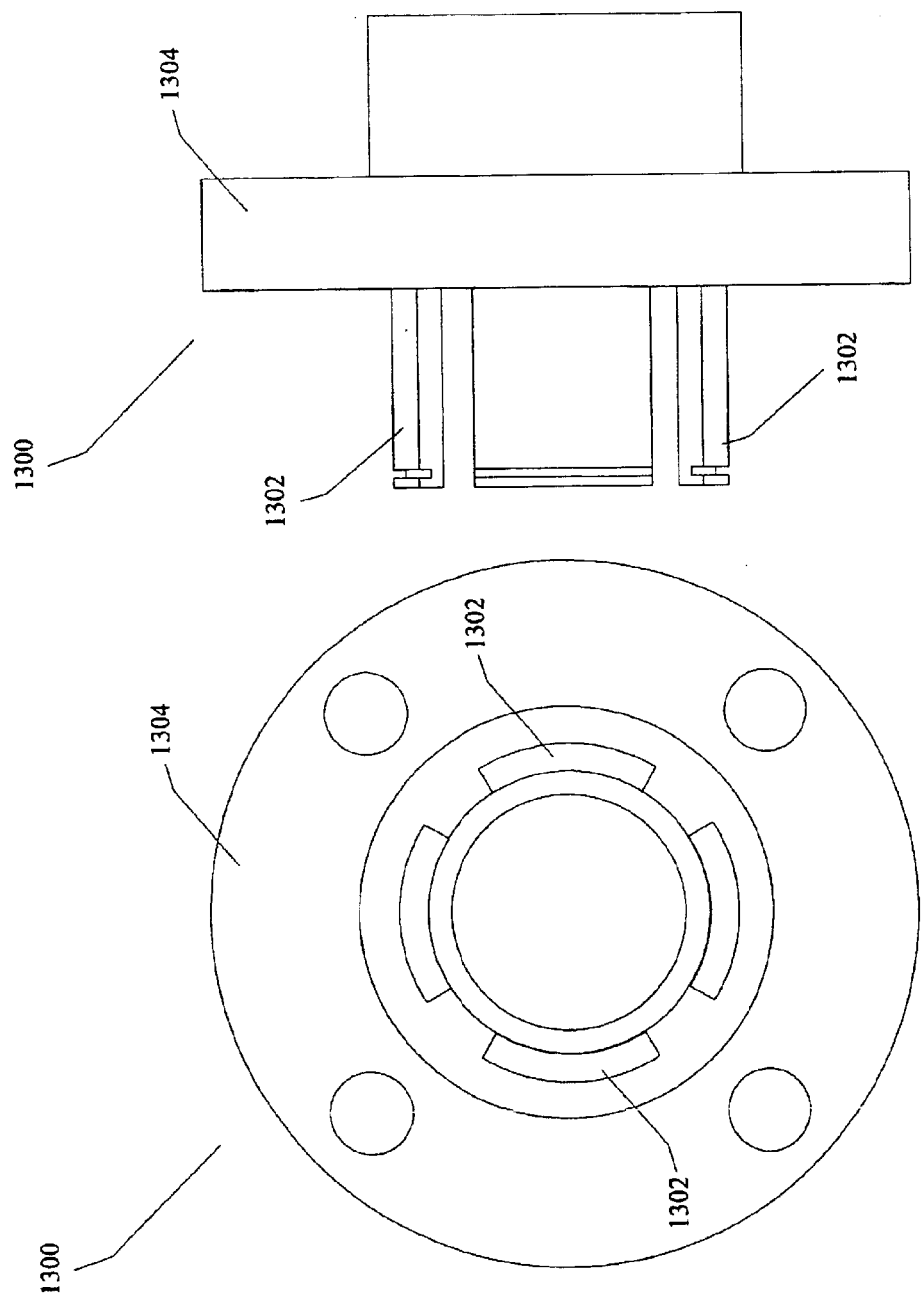

SEALING APPARATUS HAVING SEQUENTIALLY ENGAGEABLE SEALS

CROSS REFERENCE TO RELATED APPLICATIONS

The present application claims the benefit of four copending patent applications, the contents of which are hereby incorporated by reference. The four applications from which priority is claimed are as follows: GB 0013481.4, filed Apr. 13, 2000; GB 0013480.9, filed May 4, 2000; U.S. No. 60/232,148, filed Sep. 9, 2000; and U.S. No. 60/241,497, filed Oct. 18, 2000.

BACKGROUND OF THE DISCLOSURE

1. Technical Field

The present disclosure relates to advantageous seal systems having sequentially engageable seals, and more particularly to replacement seal systems that provide sequential engagement of lip seal members with moving element(s), e.g., rotating and/or reciprocating shafts, through relative movement between a barrier member and the lip seal members.

2. Background Art

A sealing apparatus or seal cartridge is generally used in a fluid-handling machine to seal a case or body of the machine around a rotating or reciprocating shaft that penetrates the case or body. The sealing apparatus typically includes a lip seal mounted to a stationary housing or gland. The gland is bolted to the case or body of the machine. The lip s al extends radially from the housing to be pressed against the rotating or reciprocating circumference of the shaft, or to a shaft sleeve fixed to the shaft. Such a sealing apparatus is used, for example, at the penetration of a shaft into a pump case to prevent the leakage of pumped process fluid around the joint formed by the shaft penetration.

In operation, lips seals have a limited useful life due to wear. At the end of the useful life, leakage will develop at the interface between the stationary lip seal and the rotating/reciprocating shaft. When leakage is observed, the operation of the fluid handling machine generally must be terminated and the sealing apparatus must be at least partially dismantled to replace the lip seal. Such dismantling and maintenance is time consuming and expensive. Additionally, there is the possibility that a significant cost in operating downtime may be suffered due to the replacement of the lip seal.

Various approaches have been undertaken to improve the performance of sealing apparatus and/or to lengthen service periods between required maintenance. Thus, for example, U.S. Pat. No. 2,836,441 to Doble discloses a shaft seal system in which the shaft includes a conical surface and the seal is axially repositionable along the shaft to achieve improved engagement between the seal and the shaft as the system experiences wear. In U.S. Pat. No. 3,698,724 to Blachere et al., a sealing device is disclosed that includes a series of inflatable seals positioned in grooves. As individual inflatable seals fail, they are moved out of engagement with the shaft and replaced, while the remaining inflatable seals provide the required sealing function.

Efforts have also been directed to developing sealing apparatus that include multiple seal members that are brought into contact with a shaft at different points in time, e.g., as individual seal members are worn down or fail. For example, U.S. Pat. No. 3,727,923 to McEwen provides a "double life" seal system in which a garter spring is repositioned from a first position, where it biases a first seal into engagement with a shaft, to a second position where a second, axially spaced seal is biased into engagement with the shaft. The McEwen '923 provides a system for automatically moving the garter spring from the first position to the second position after a predetermined level of wear.

The patent literature also includes several seal systems in which two or more seal members are axially spaced along a shaft, and individual seal members are axially repositioned so as to be brought into contact with the shaft at appropriate points in time. U.S. Pat. No. 3,773,336 to Walter et al. discloses a seal system in which a spare seal member is initially positioned adjacent a recess in the shaft (or is associated bushing), thereby avoiding engagement with the shaft until needed/desired. The spare seal member may be brought into contact with the shaft by axially repositioning the seal holder or the shaft/bushing. Similarly, U.S. Pat. No. 4,008,897 to Wentworth provides a reserve sealing ring that initially extends into an annular chamber, i.e., is not engaged with the shaft. Axial repositioning of the reserve sealing ring to effect engagement with the shaft is accomplished through an hydraulically pressurized system.

U.S. Pat. Nos. 5,820,132, 6,098,990 and 6,152,454 to Marnot also describe seal systems in which a spare seal is initially positioned adjacent a set back region formed in the shaft. As the spare seal is axially repositioned so as to be brought into engagement with th shaft, e.g., using a screw jack or fluid-pressure annular jack, the replaced seal is moved adjacent a set back region formed in the shaft, i.e., out of engagement with the shaft. The Marnot patents further contemplate a control system in which a leak detector monitors system operation and causes the spare seal to move into engagement with the shaft (or signals an operator who can manually cause the spare seal to move into engagement with the shaft).

Despite efforts to date, a need remains for seal system designs that provide reliable, efficacious sealing functionality, that extend periods of useful operation, and that minimize maintenance downtime. Moreover, a need remains for seal system designs that achieve improved system operation and functionality over the course of a use cycle. These and other needs are satisfied by the sealing systems disclosed herein.

SUMMARY OF THE DISCLOSURE

The present disclosure provides a sealing apparatus that includes a plurality of seal members, each seal member typically including a seal lip for engaging a moving member, e.g., a reciprocating or rotating shaft. In the event an initial seal member becomes worn or malfunctions, the disclosed sealing apparatus facilitates sequential deployment of additional seal member(s) to replace and/or supplement the previously engaged seal lip that is worn or malfunctioning. In a preferred embodiment of the present disclosure, the sealing apparatus includes an automatic mechanism for sequentially deploying the seal members. The disclosed sealing apparatus ensures that the back-up seal members are only deployed against the shaft, which may be rotating or reciprocating, or against an associated shaft sleeve, when needed, to prevent unnecessary wear on the seal lips during the period of time when no back-up/replacement/supplementary sealing is required.

According to a first preferred aspect of the present disclosure, a plurality of seal members, e.g., lip seals or seal rings, are arranged spaced apart along an axis of a shaft. The seal members are mounted to a stationary housing or cartridge and extend radially toward the shaft. The seal members include a first lip seal and one or more back-up lip seals. The shaft may optionally include a shaft sleeve fixed to the shaft. A barrier member, e.g., a barrier sleeve, is initially interposed between the shaft (or shaft sleeve) and the back-up lip seal(s). When desired, e.g., when leakage is observed, the barrier sleeve may be shifted outwardly in an axially direction to sequentially release the back-up lip seals, each released back-up lip seal assuming a radial length to be sealingly pressed to or against the outer circumference of the rotating or reciprocating shaft (or shaft sleeve). The previously deployed seal, or seals, remain applied to the shaft, even though spent, thus providing some limited, preliminary sealing effect which can serve, due to the pressure drop caused by each such spent seal, to make easier and thus prolong the life of the most recently released seal.

According to another preferred aspect of the present disclosure, a sealing apparatus is provided that includes a barrier member, e.g., a barrier sleeve. The barrier sleeve may interact with or define an annular piston that is moved by hydraulic pressure applied to one end thereof, e.g., pressure applied to one end of the barrier sleeve. Such pressure application moves the barrier sleeve outwardly to sequentially release back-up seal lips for engagement with a shaft or shaft sleeve.

According to another preferred aspect of the present disclosure, a sensing mechanism is provided to sense leakage relative to a sealing apparatus, e.g., leakage relative to one or more lip seals. When leakage of process fluid through a lip seal is sensed, e.g., automatically by a leak detector, an automatic apparatus is advantageously provided that is responsive to a signal from the leak detector. The automatic apparatus is generally effective for deploying a back-up lip seal onto or against the shaft.

According to another preferred aspect of the present disclosure, a barrier sleeve is provided that carries an O-ring seal at its outboard end. The O-ring seal typically faces the shaft or shaft sleeve. The shaft or shaft sleeve typically includes a recess that allows clearance between the O-ring seal and the shaft or shaft sleeve. If the disclosed sealing apparatus fails to hold a seal after all the lip seals are deployed, the fluid handling machine can be shut down, and the shaft/shaft sleeve disengaged and slid inwardly to a shut down position. In the shut down position, the O-ring seal seals tightly against the shaft or shaft sleeve. Of note, the shaft sleeve is typically fastened tightly to the shaft at this position. Accordingly, although the machine is not operable in this condition, if the machine is connected to other machines and cannot be fluid-isolated to effect sealing apparatus repairs, the sealing apparatus can be repaired at a later, more convenient time, i.e., the sealing apparatus maintains a stationary fluid seal at the idle machine.

Numerous other advantages and features of the present disclosure will become readily apparent from the following detailed description and the embodiments thereof, from the claims and from the accompanying drawings.

BRIEF DESCRIPTION OF THE DRAWINGS

So that those having ordinary skill in the art to which the subject matter of the present disclosure appertains will more readily understand how to construct and use the sealing apparatus of the present disclosure, reference may be had to the following drawings and the accompanying detailed description, wherein:

FIG. 31 is a diagrammatic sectional view of the sealing apparatus of FIG. 30 with the barrier sleeve shifted outwardly a second incremental distance;

FIG. 32 is a left end view of the sealing apparatus of FIG. 31;

FIGS. 52a, 52b, 53a and 53b are diagrammatic sectional views of aspects of a further alternate sealing apparatus according to the present disclosure;

DETAILED DESCRIPTION OF THE PREFERRED EMBODIMENTS

Figure 1:
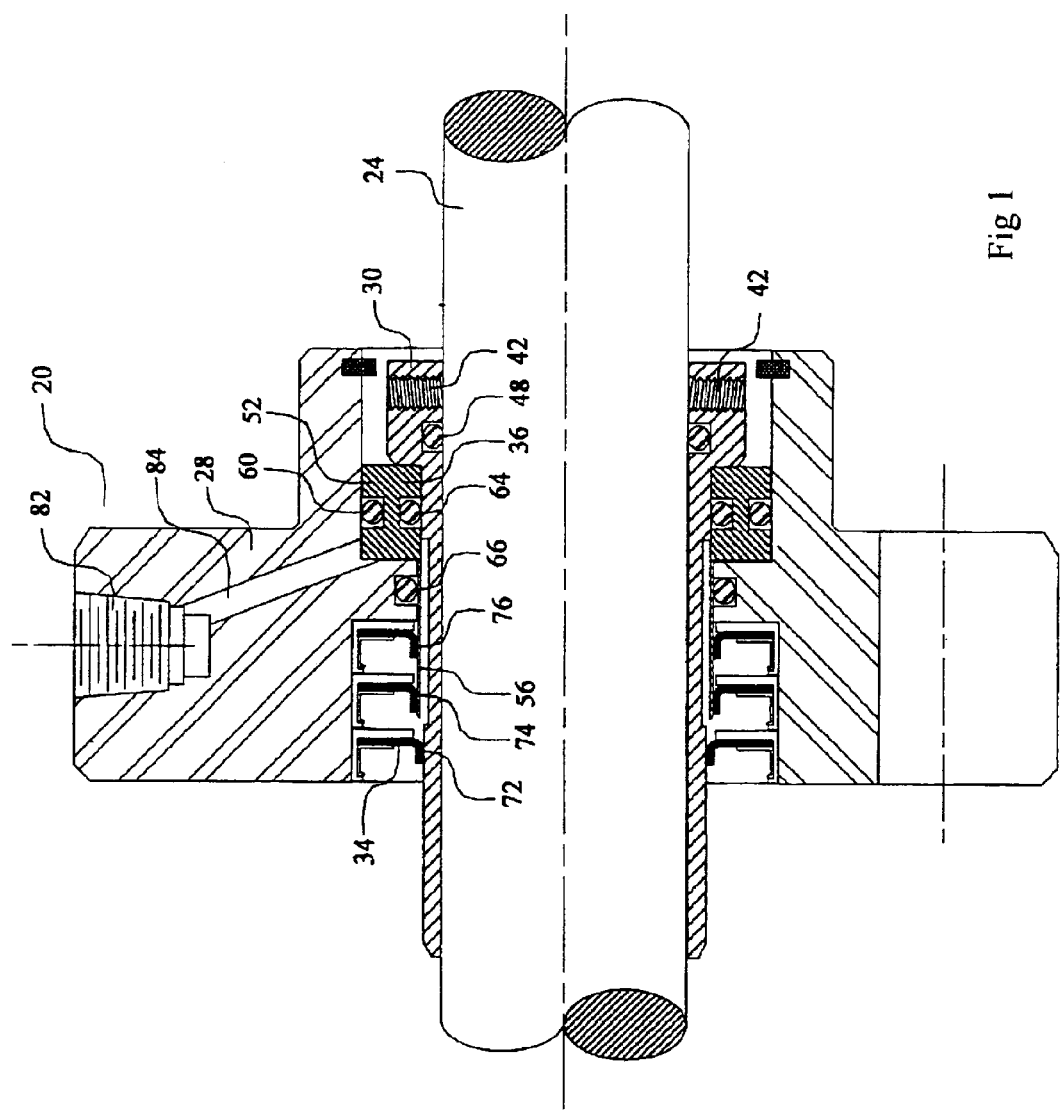
FIG. 1 is a diagrammatic sectional view of a sealing apparatus surrounding a shaft in a pre-assembly, non-operating condition.

While the disclosed invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated. The following embodiments are described in reference to rotating shaft applications; however, the disclosed sealing apparatus also has similar application for linear movement shafts, such as valve stems or reciprocating pumps.

FIG. 1 illustrates a sealing apparatus or seal cartridge 20 initially surrounding a shaft 24 in a pre-assembly, non-operating condition. The sealing apparatus 20 includes a housing or gland 28, a shaft sleeve 30, a plurality of lip seals 34, and a barrier sleeve 36. The shaft 24 rotates with respect to the housing 28. The shaft sleeve 30 rotates with the shaft 24. The barrier sleeve 36 and the lip seals 34 are stationary with respect to the housing 28. The shaft sleeve 30 fits tightly around the shaft 24 and is fixed to the shaft 24 by a plurality of circumferentially spaced set screws which are threaded into threaded bores 42. An O-ring 48 seals between the shaft 24 and the shaft sleeve 30.

The barrier sleeve 36 includes an annular piston 52 connected to a barrier cylinder 56. The barrier cylinder 56 can be composed of 316 SS, depending on process fluid and service conditions, and can be a relatively thin tube, such as having a wall thickness between 0.004 and 0.010 inches. The piston 52 is sealed to the gland 28 by an outer O-ring 60. An inner O-ring 64 is pressed to the shaft sleeve. The function of the inner O-ring 64 will be described hereinafter. A further O-ring 66 seals the barrier cylinder 56 to the gland 28.

The lip seals 34 include an inner or primary seal lip 72, an intermediate back-up lip seal 74, and an outer back-up lip seal 76. The intermediate and outer lip seals 74, 76 are supported on the barrier cylinder 56 to be held outside of or away from the shaft sleeve 30, i.e., in non-contact with the shaft sleeve 30. The inner lip seal 72 is in sealing contact with an outer circumference of the shaft sleeve 30. The gland 28 includes an inlet port 82 which communicates through a channel 84 to an annular chamber 86 (shown in FIG. 3), behind the annular piston 52.

Figure 2:
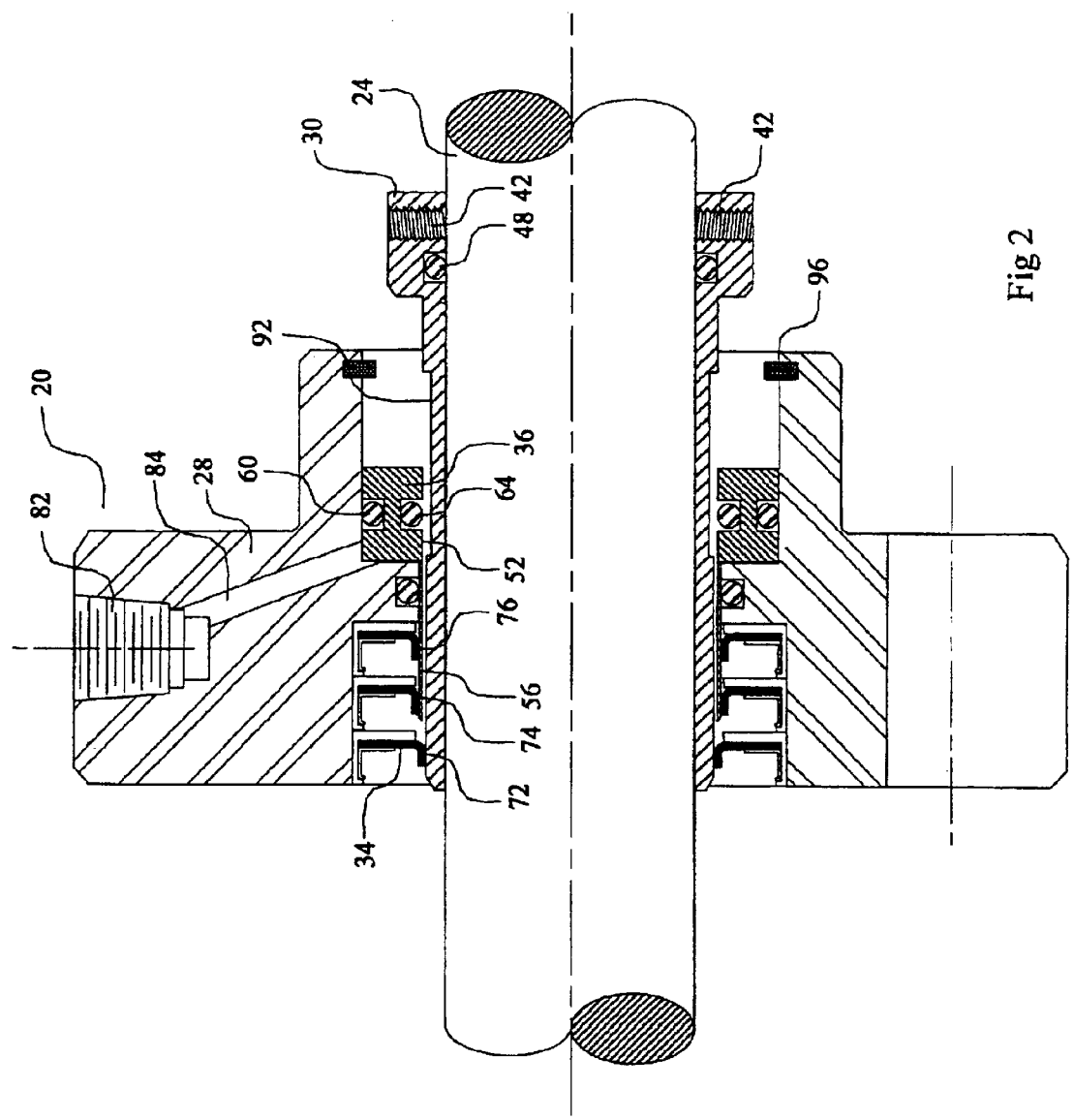
FIG. 2 is a diagrammatic sectional view of the sealing apparatus and shaft of FIG. 1 with a shaft sleeve shifted outwardly and fixed to the shaft.

FIG. 2 illustrates the sealing apparatus 20 in final assembly on the shaft. Once the gland has been installed to the machine case (not shown) and the gland bolts tightened, the shaft sleeve 30 can be extended outwardly and fixed to the shaft, as shown in FIG. 2, ready for use.

The shaft sleeve 30 includes an annular recess 92 which provides a clearance between the inner O-ring 64 and the shaft sleeve 30, in the position of FIG. 2. The recess 92 is typically about 0.025 inches deep. The recess ensures non-interference between the barrier cylinder 56 and the O-ring 64 with the shaft sleeve 30. Additionally, the clearance helps to avoid interference with barrier sleeve movement due to build up of material or deposits on the shaft sleeve. The shaft sleeve 30 is typically fabricated with a chrome oxide surface having a surface finish of 6 to 8 micro-inches at a 60–70 Rockwell C hardness.

Figure 3:
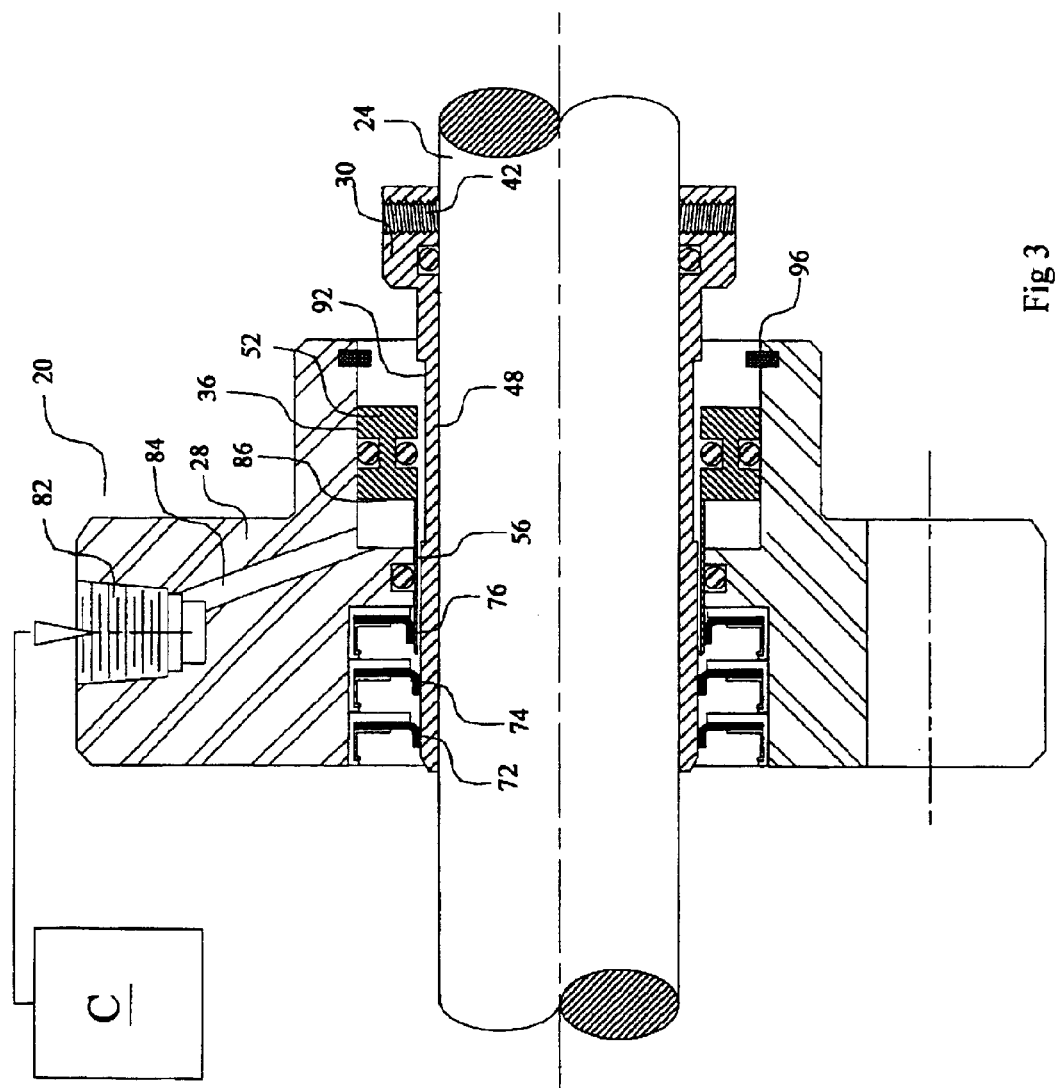
FIG. 3 is a diagrammatic sectional view of the sealing apparatus and shaft of FIG. 2 with a barrier sleeve shown partly shifted outwardly.
Figure 4:
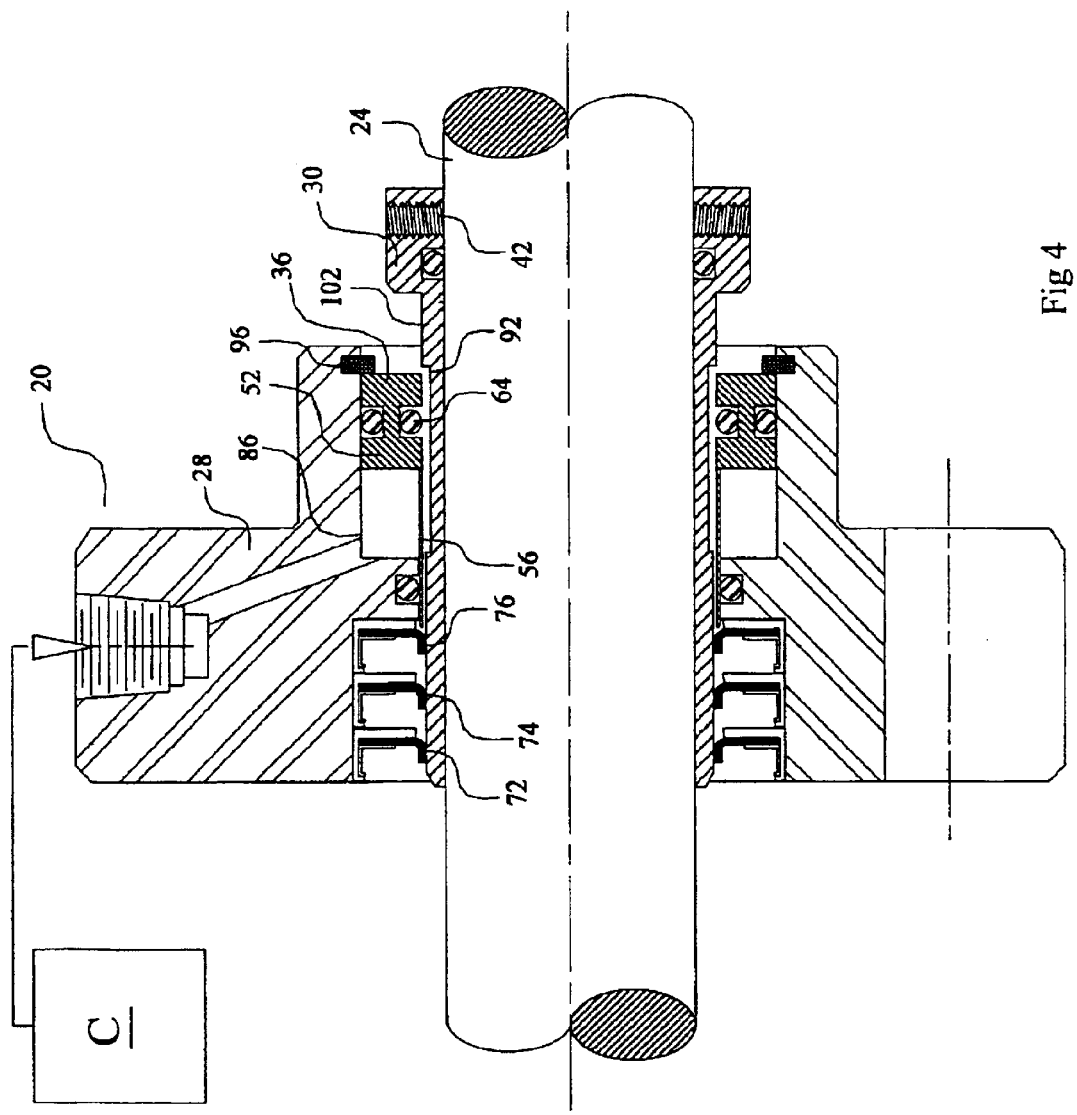
FIG. 4 is a diagrammatic sectional view of the sealing apparatus and shaft of FIG. 2 with the barrier sleeve shown completely shifted outwardly.

According to the present disclosure, the piston 52 is advantageously activated once a leak is detected in the most outboard active lip seal, either the primary lip seal 72 or the first back-up lip seal 74, to sequentially add a lip seal to seal to the shaft sleeve 30. In this arrangement, the worn lip seal(s) advantageously serve, to provide initial, incremental resistance against flow leakage. FIGS. 3 and 4 illustrate the movement of the barrier sleeve 36 as the piston 52 is activated.

As illustrated in FIG. 3, pressurized fluid or gas may be directed into the annular chamber 86 from the port 82 and the channel 84 to force the piston 52 to th right, increasing the size of the annular chamber 86. By moving the piston 52 to th right, the barrier sleeve 36 draws the barrier cylinder 56 to the right sliding out from inside the intermediate lip seal 74, thereby removing the barrier cylinder 56 from contact or engagement with intermediate lip seal 74. Thus, barrier cylinder 56 is no longer interposed between intermediate lip seal 74 and the shaft sleeve 30. The intermediate back-up lip seal 74 resiliently rebounds radially inward to press against the outer circumference of the shaft sleeve 30, thereby effecting sealing engagement thereto.

To ensure that the barrier sleeve 36 moves only one lip seal increment, a controlled volume of pressurized fluid, preferably liquid, may be injected by a source C which moves the piston 52 a preselected amount or distance against the resistance provided by the O-ring 60. Other devices or structural arrangements for effecting resistance to movement of the piston 52 could also be used, such as a series of detents. Alternately, a position sensor or other device can be used to control the precise movement of the barrier sleeve. The fluid source C is contemplated to be a known fast-acting, solenoid-actuated gate, which has been calibrated for controlled volume dispensing. The solenoid could be advantageously activated manually or automatically (such as on the basis of a leak detector), locally or remotely.

If leakage develops through the intermediate back-up lip seal 74, the piston 52 may be moved once again. A controlled amount of pressurized fluid is directed through the port 82, the channel 84 into the chamber 86, to move the piston 52. FIG. 4 illustrates the barrier sleeve 36 shifted completely to the right and abutting a thrust ring 96 which is held within a groove 97 of the gland 28. In this position, the barrier cylinder 56 has been withdrawn from beneath the outer back-up lip seal 76 which now sealingly presses against the outer circumference of the shaft sleeve 30, sealing thereto.

The outer diameter of the shaft sleeve 30 and the inner diameter of the barrier sleeve 36 generally have a difference therebetween of approximately 0.020 inches (0.010 radial clearance) that ensures, during installation, that centralization and concentricity between the shaft and the sealing apparatus 20 is maintained. This centralization functionality corresponds to the function of the centralizing clips used on a typical mechanical seal cartridge.

The barrier cylinder 56 typically has a radial thickness of about 0.007 inches. Thus, the back-up lip seals 74, 76 are radially retracted (preloaded) by the interposition of barrier cylinder 56, e.g., by the presence of an increased inside diameter of about 0.034 inches. When the barrier cylinder 56 is shifted to deploy back-up lip seals, the preload, as well as the process fluid pressure, generally ensure a rapid engagement of the back-up lip seal(s) to the shaft sleeve.

Figure 5:
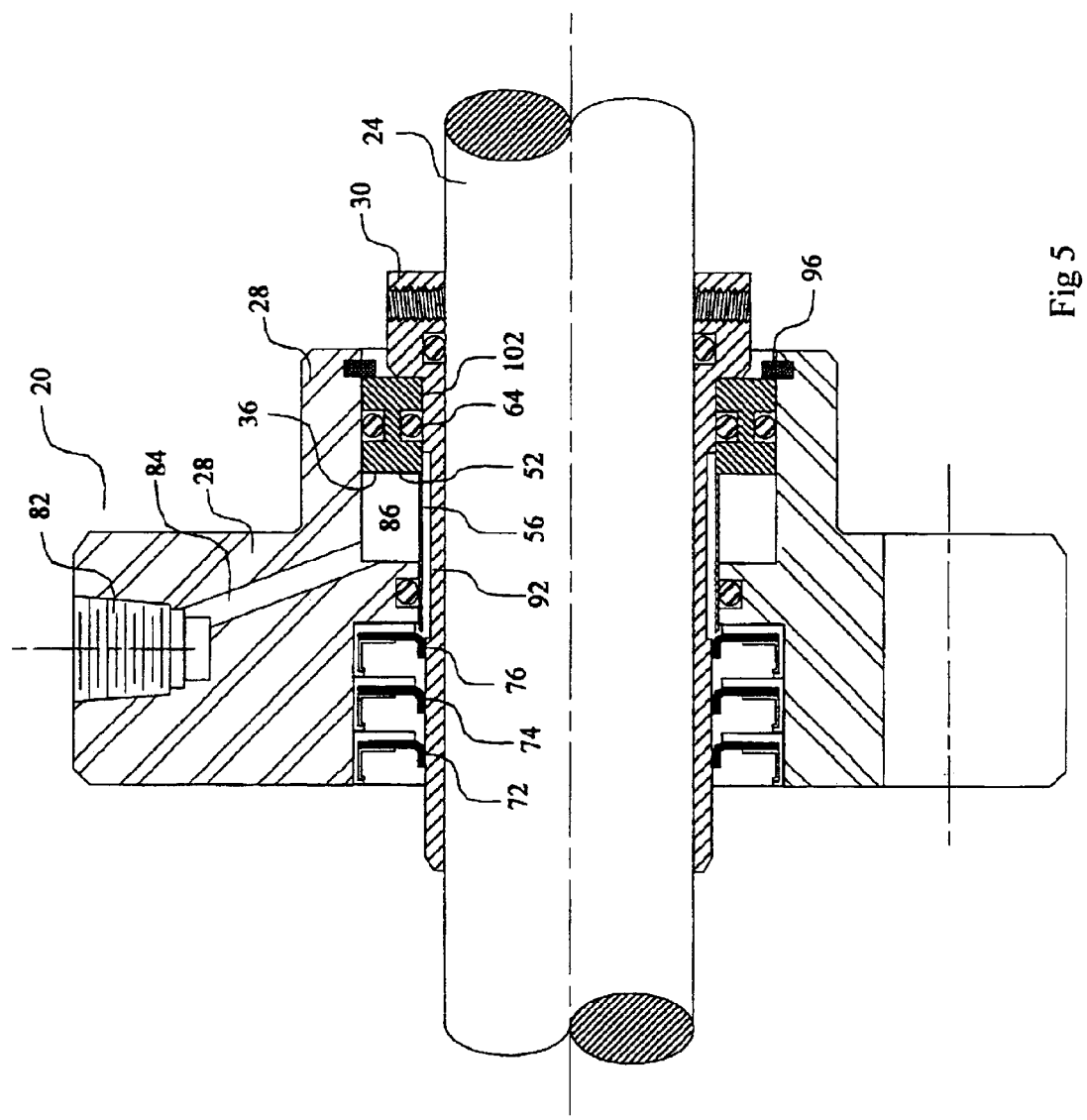
FIG. 5 is a diagrammatic sectional view of the sealing apparatus and shaft of FIG. 4 with the shaft sleeve disengaged from the shaft and inwardly positioned against the barrier sleeve, in a sealed shut down condition.

FIG. 5 illustrates an exemplary situation wherein all lip seals have failed. In this situation, the rotation at the shaft is halted, i.e., the fluid handling machine is shut down. The shaft sleeve 30 can be moved inwardly with the elastomer O-ring 64 sealing to an annular surface 102 of the shaft sleeve 30 to isolate any process fluid from leaking to atmosphere. The fluid handling machine can be idled in this sealed, shut down condition. The sealing apparatus 20 can then be repaired or replaced at the next convenient time. This procedure is particularly effective when the fluid handling machine is installed in a fluid circuit with redundant fluid handling machines, without means to isolate individual fluid handling machines to make repairs. The sealed shut down condition allows the circuit to remain operable without operating the otherwise leaking fluid handling machine, until the next fluid circuit scheduled downtime.

Figure 6:
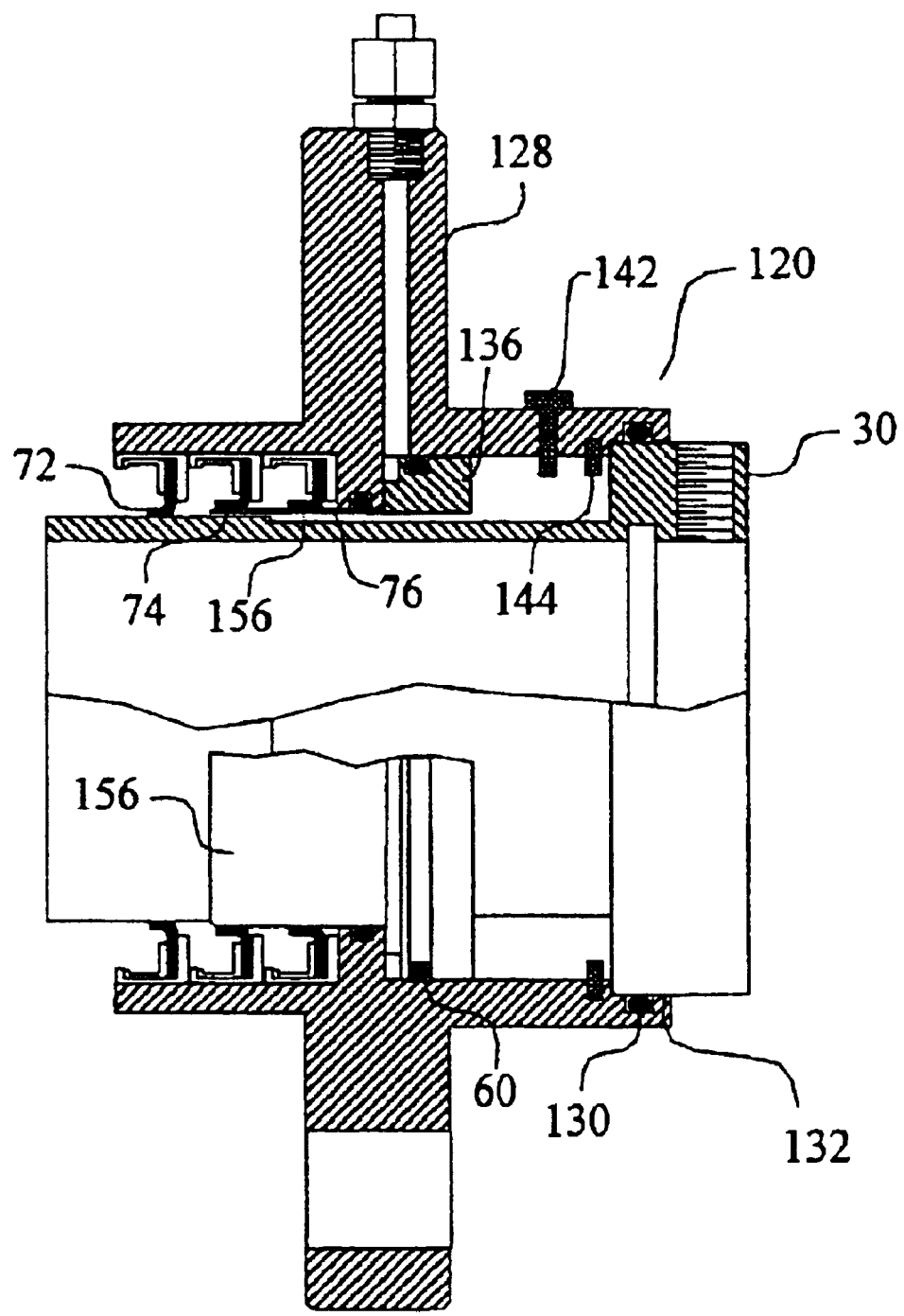
FIG. 6 is a diagrammatic sectional view of an alternate sealing apparatus according to the present disclosure in a pre-assembly, non-operating condition.
Figure 10:
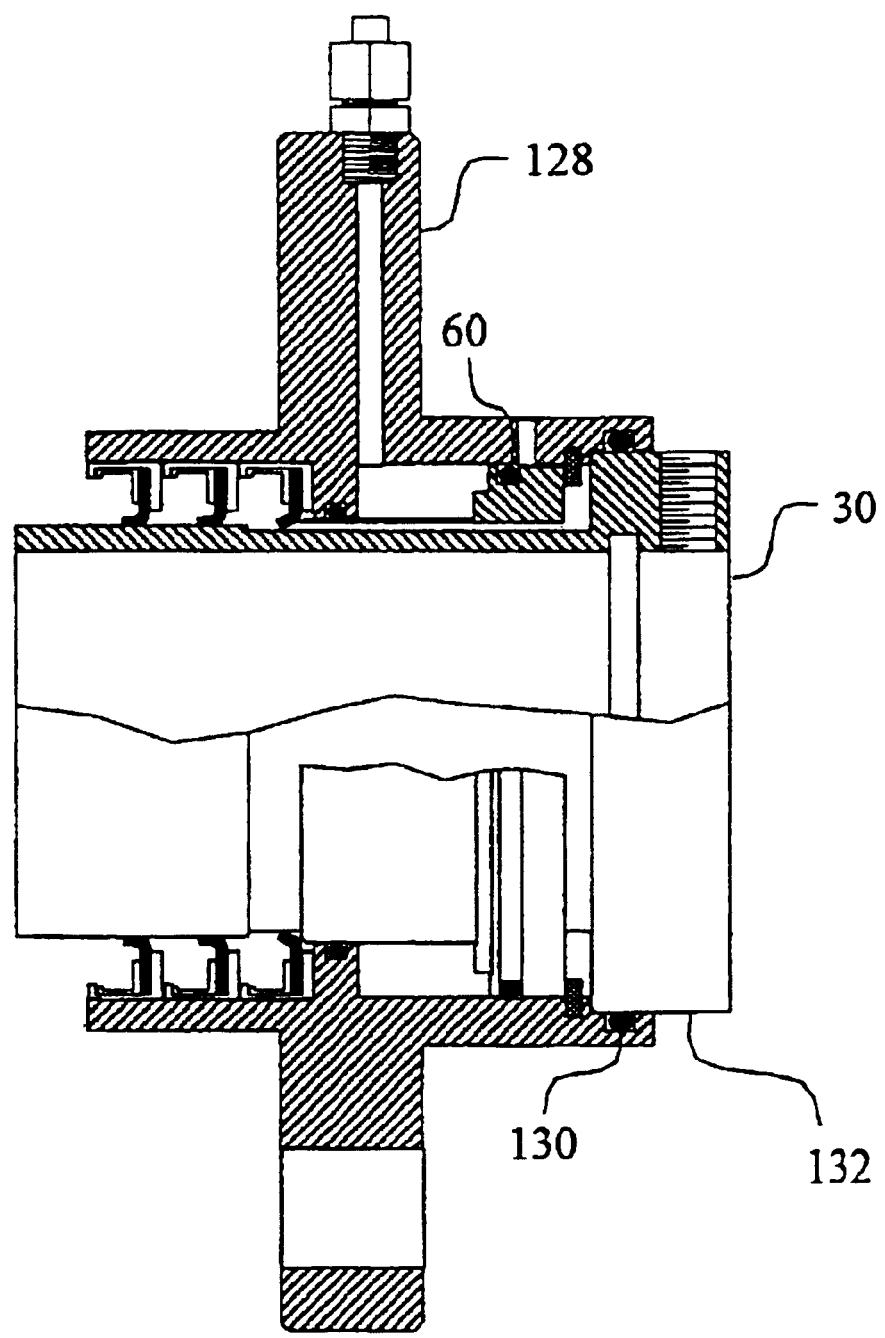
FIG. 10 is a diagrammatic sectional view of the sealing apparatus of FIG. 9 with the shaft sleeve retracted and inwardly positioned against the barrier sleeve, in a sealed, shut down condition.

FIG. 6 illustrates an alternative embodiment according to the present disclosure. The sealing apparatus 120 is identical to the first exemplary embodiment described hereinabove, i.e., sealing apparatus 20, except as noted in the description and/or the figures. The apparatus 120 is depicted in a preassembly, non-operating condition. In this alternative exemplary embodiment, a barrier sleeve 136 includes an outer O-ring 60, but not the inner O-ring 64 of the first embodiment. An alternat gland 128 includes an inner O-ring 130 that can be sealed against an outer surface 132 of the shaft sleeve 30, when the shaft sleeve is in the retracted position as shown in FIG. 10. The gland 128 includes one or more threaded stop pins 142 threaded through an annular wall 143 of the gland 128, and a stop ring 144.

Figure 7:
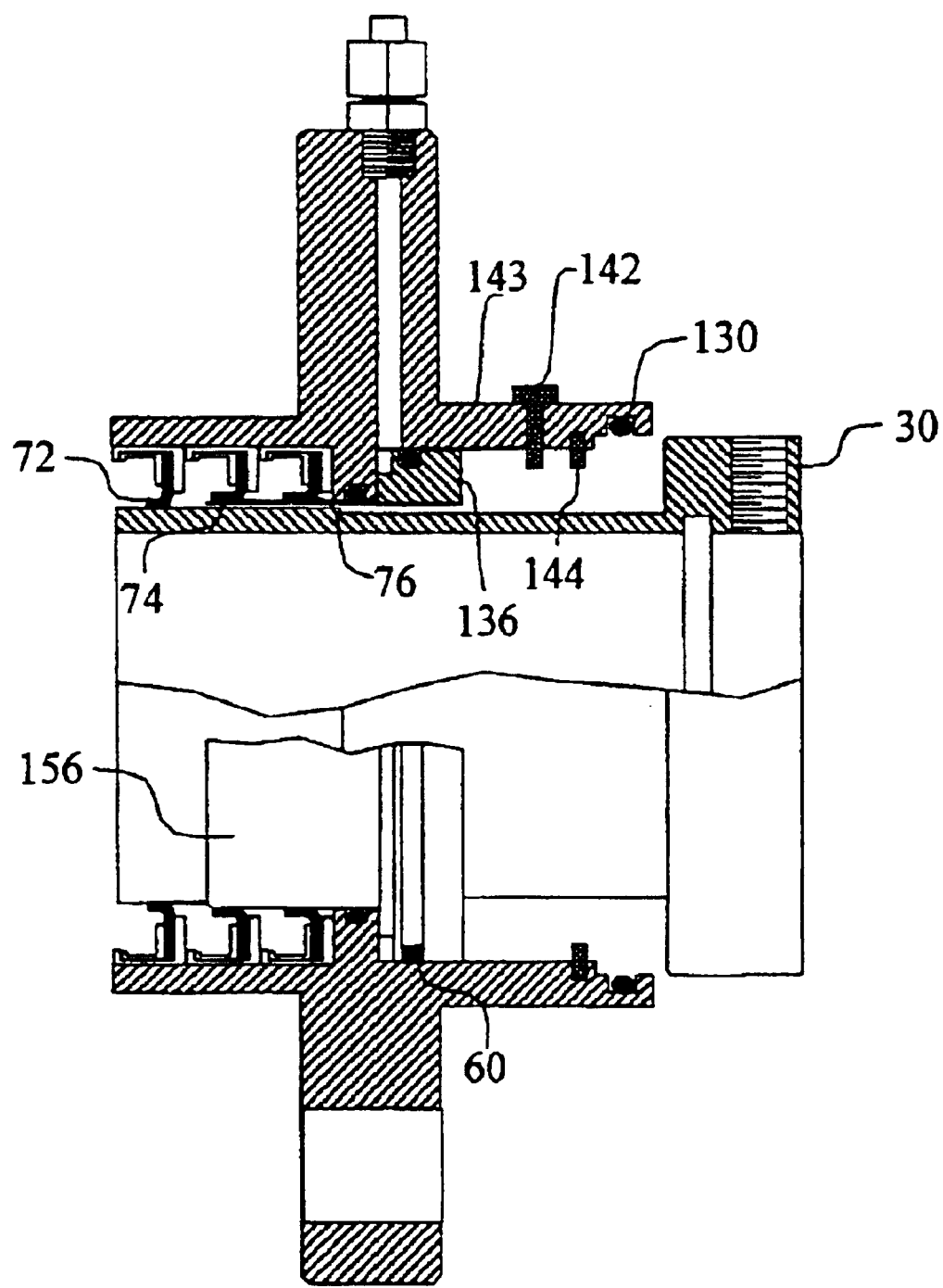
FIG. 7 is a diagrammatic sectional view of the sealing apparatus of FIG. 6 with a shaft sleeve shifted outwardly into an operating position.

FIG. 7 illustrates the sealing apparatus 120 in the assembled operating condition with the shaft sleeve 30 extending outwardly (to the right) to be secured to the shaft (not shown). The O-ring 130 is uncovered and decompressed.

Figure 8:
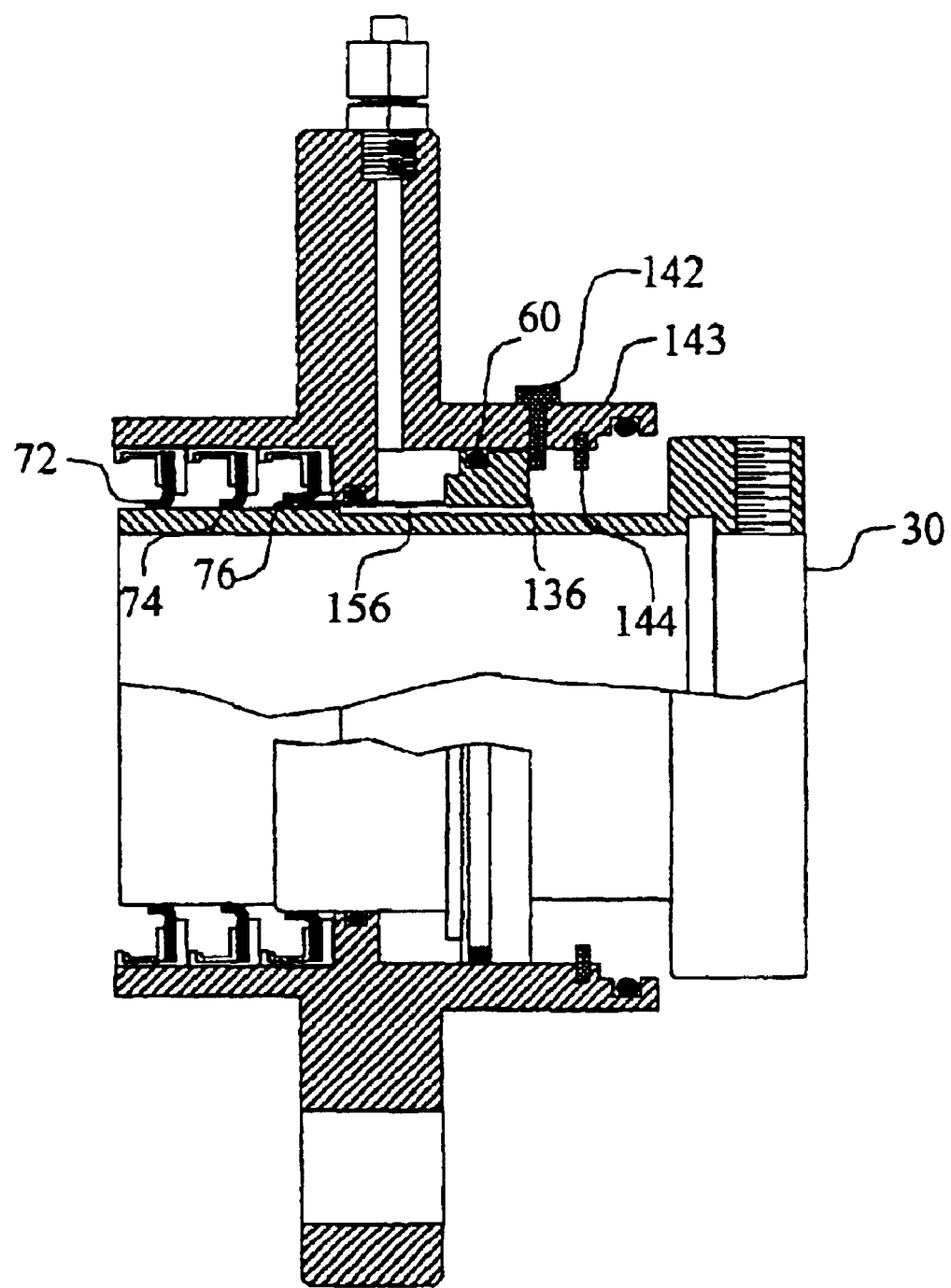
FIG. 8 is a diagrammatic sectional view of the sealing apparatus of FIG. 6 with a barrier sleeve shifted outwardly a first incremental distance.

FIG. 8 illustrates the barrier sleeve 136 shifted outwardly (to the right) until it contacts the stop pin 142. The position of the stop pin 142 corresponds to the position of a barrier cylinder 156 being withdrawn from beneath the intermediate lip seal 74, i.e., barrier cylinder 156 is no longer interposed between intermediate lip seal 74 and shaft sleeve 30. The intermediate lip seal 74 automatically decompresses, i.e., resiliently returns from its preloaded condition to a loaded condition, pressing against or sealingly engaging the shaft sleeve 30. The stop pin 142 prevents the barrier sleeve 136 from uncovering any further lip seals, such as the outer lip seal 76, until desired.

Figure 9:
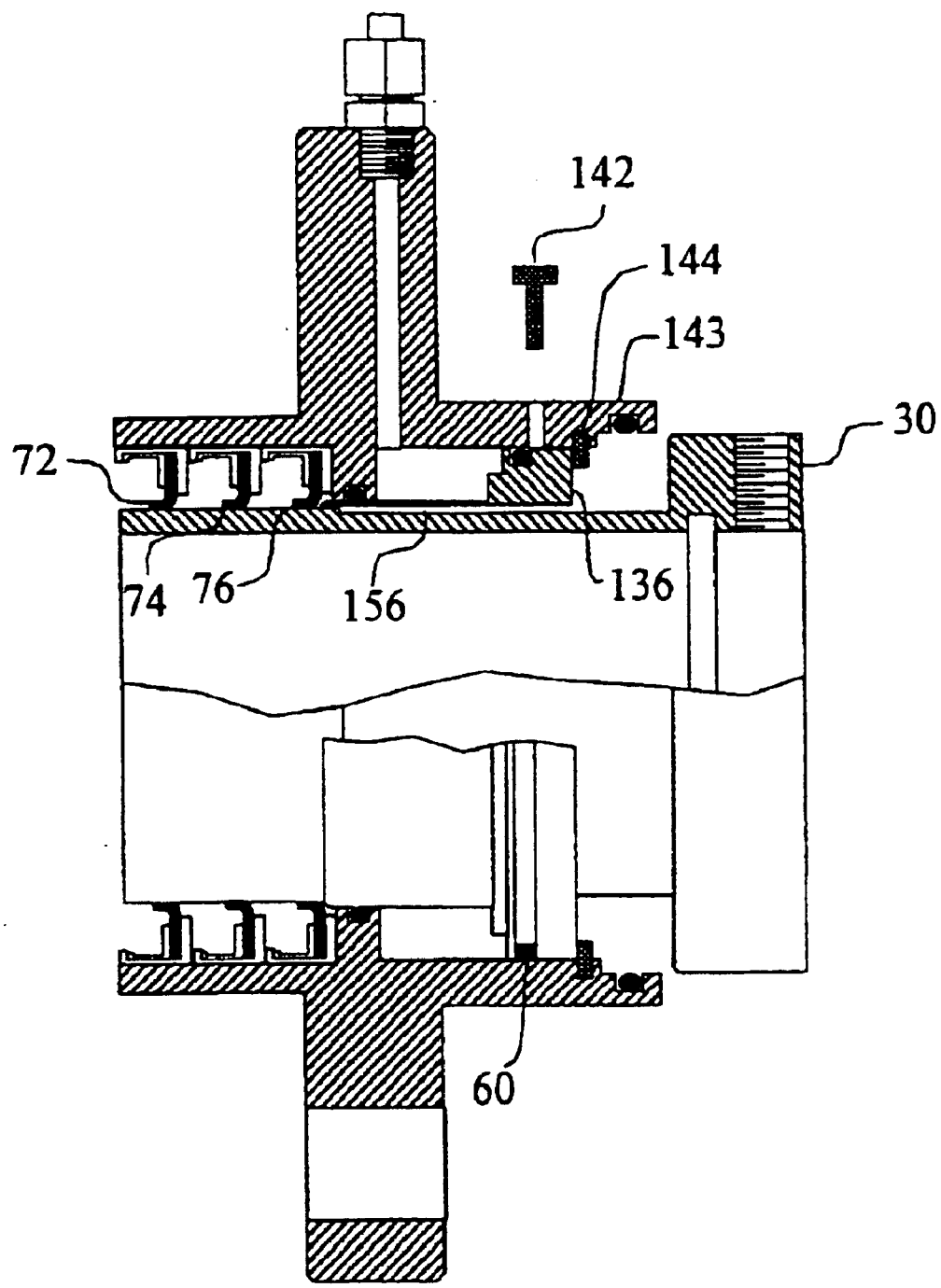
FIG. 9 is a diagrammatic sectional view of the sealing apparatus of FIG. 8 with the barrier sleeve shifted outwardly a second incremental distance.

If leakage thereafter develops, as illustrated in FIG. 9, the stop pin 142 can be removed by unthreading from the wall 143. The barrier sleeve 136 can then be shifted to the position shown in FIG. 9, wherein the barrier sleeve 136 contacts the stop ring 144. This position corresponds to a position wherein the barrier cylinder 156 has been withdrawn from beneath the outer lip seal 76. Once the barrier cylinder 156 is no longer interposed between outer lip seal 76 and shaft sleeve 30, the lip seal 76 automatically decompresses. i.e., resiliently returns from its preloaded condition to a loaded condition, press against or sealingly engaging the outer surface of the shaft sleeve 30.

If leakage thereafter once again develops, the fluid handling machine is stopped and, as shown in FIG. 10, the shaft sleeve 30 is loosened from the shaft (not shown) and retracted to the left until the annular surface 102 seals against the O-ring 130. The shaft sleeve 30 can then be tightly secured to the shaft. This sealed, shut down condition does not permit operation of the shaft, but does seal the shaft until the sealing apparatus 120 can be conveniently repaired, replaced or subject to appropriate maintenance.

Figure 11:
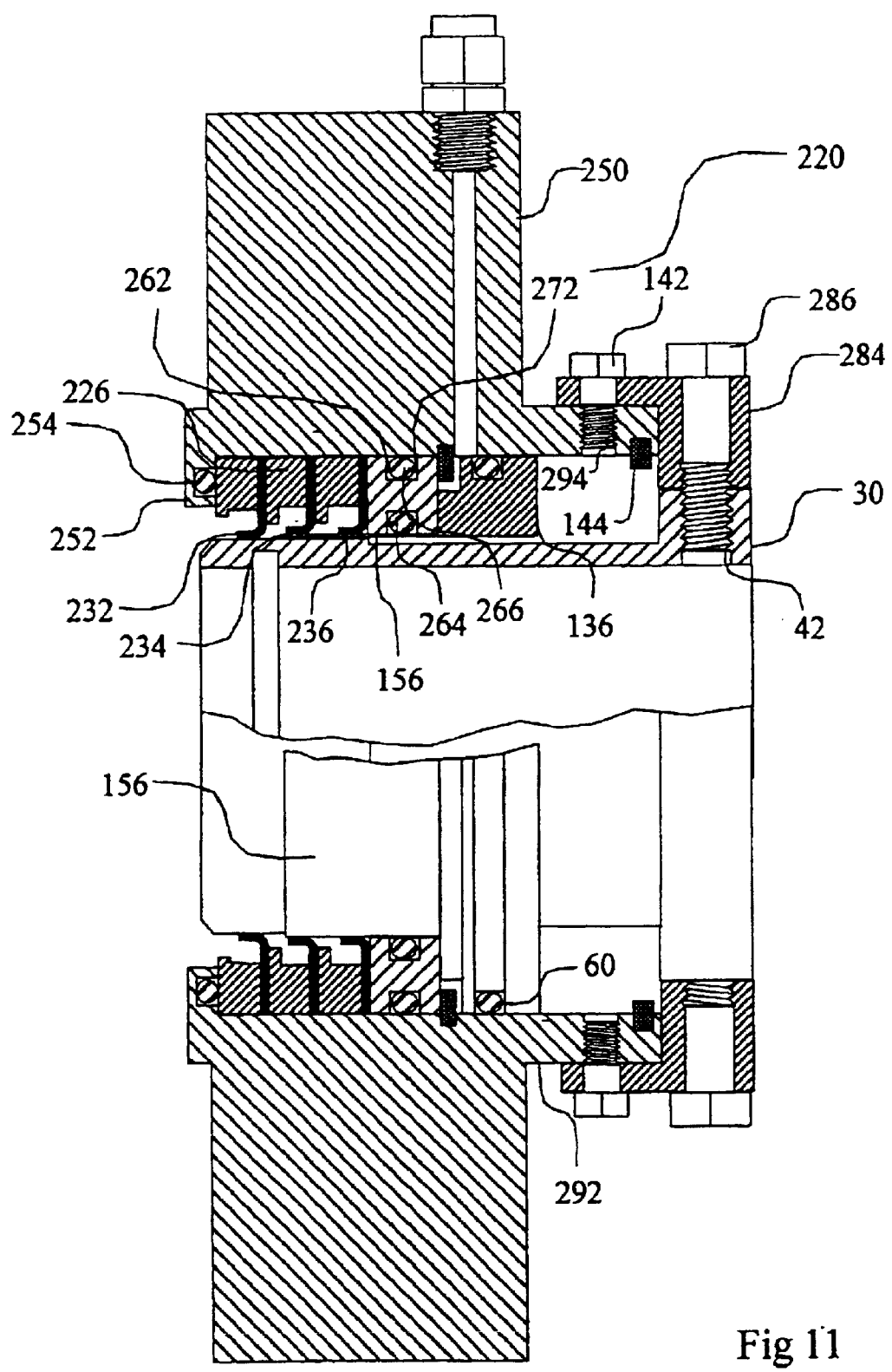
FIG. 11 is a diagrammatic sectional view of a further alternate sealing apparatus according to the present disclosure in a pre-assembly, non-operating condition.

FIG. 11 illustrates a further exemplary embodiment according to the present disclosure. The sealing apparatus 220 is identical to the first exemplary sealing apparatus 20, except as noted in the description and/or the figures. Sealing apparatus 220 includes a cluster 226 of three lip seals 232, 234, 236 held within a gland 250 by a gland lip 252 that holds an O-ring 254 which seals against the cluster 226. Outwardly of the cluster 226 is an O-ring channel 262 holding inner and outer O-rings 264, 266. The O-rings 264, 266 seal against an inside surface 272 of the gland 250 and an outside surface of the barrier ring 156 of the barrier sleeve 136, as previously described. The cluster 226, the channel 262 and the barrier sleeve 136 can be advantageously loaded into the gland from the right side, as a stack, during assembly.

Figure 12:
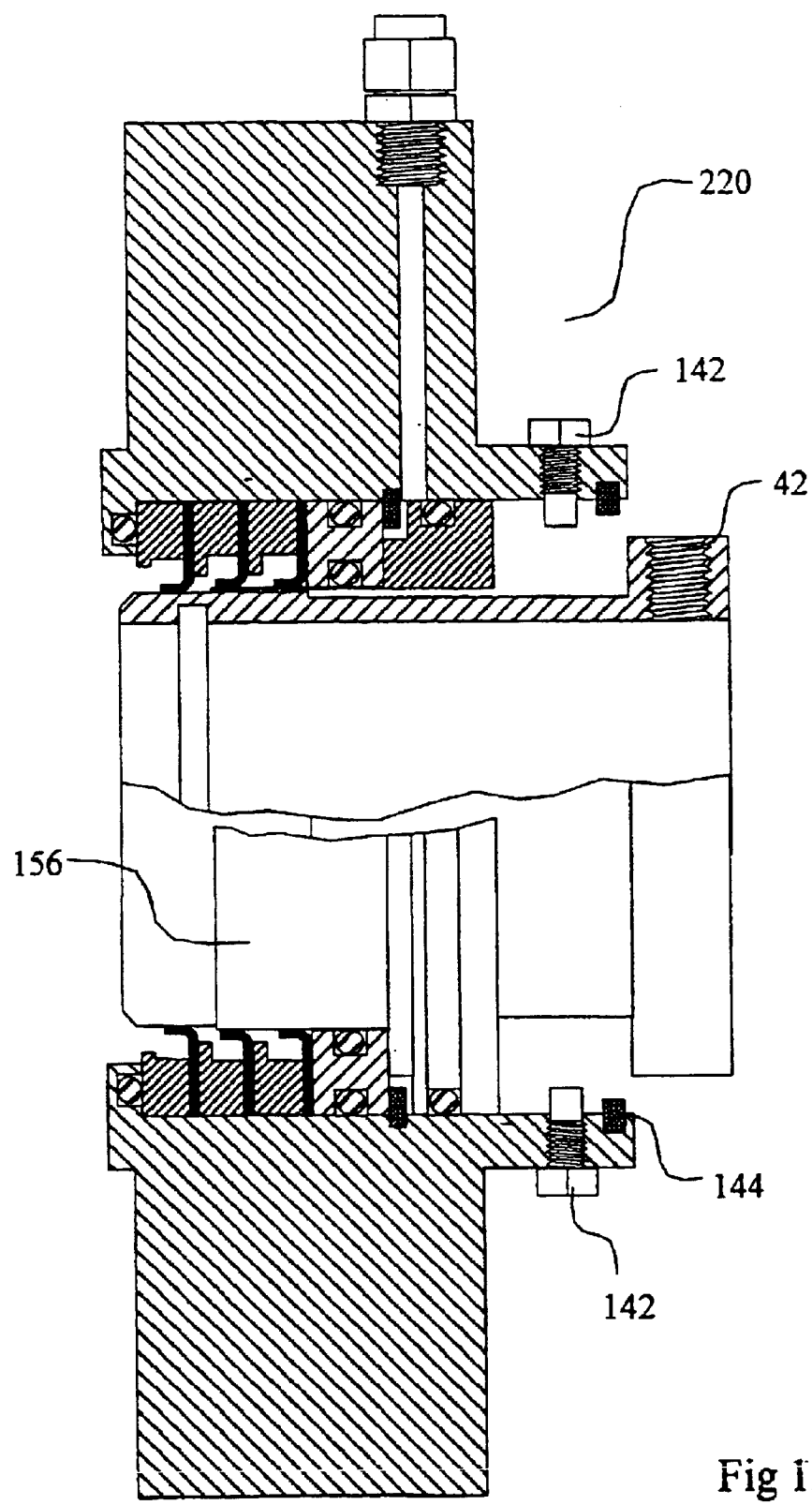
FIG. 12 is a diagrammatic sectional view of the sealing apparatus of FIG. 11 in an operating condition.

The shaft sleeve 30 is temporarily held to the gland 250 and aligned by a yoke 284 penetrated by a plurality of bolts 286, engaging the threaded bores 42 of the shaft sleeve. The yoke 284 is fastened to an annular wall 292 of the gland 250 using threaded bores 294. FIG. 12 illustrates sealing apparatus 220 in a condition wherein the yoke 284 has been removed and the bores 294 are now used for stop pins 142, as previously described.

Figure 13:
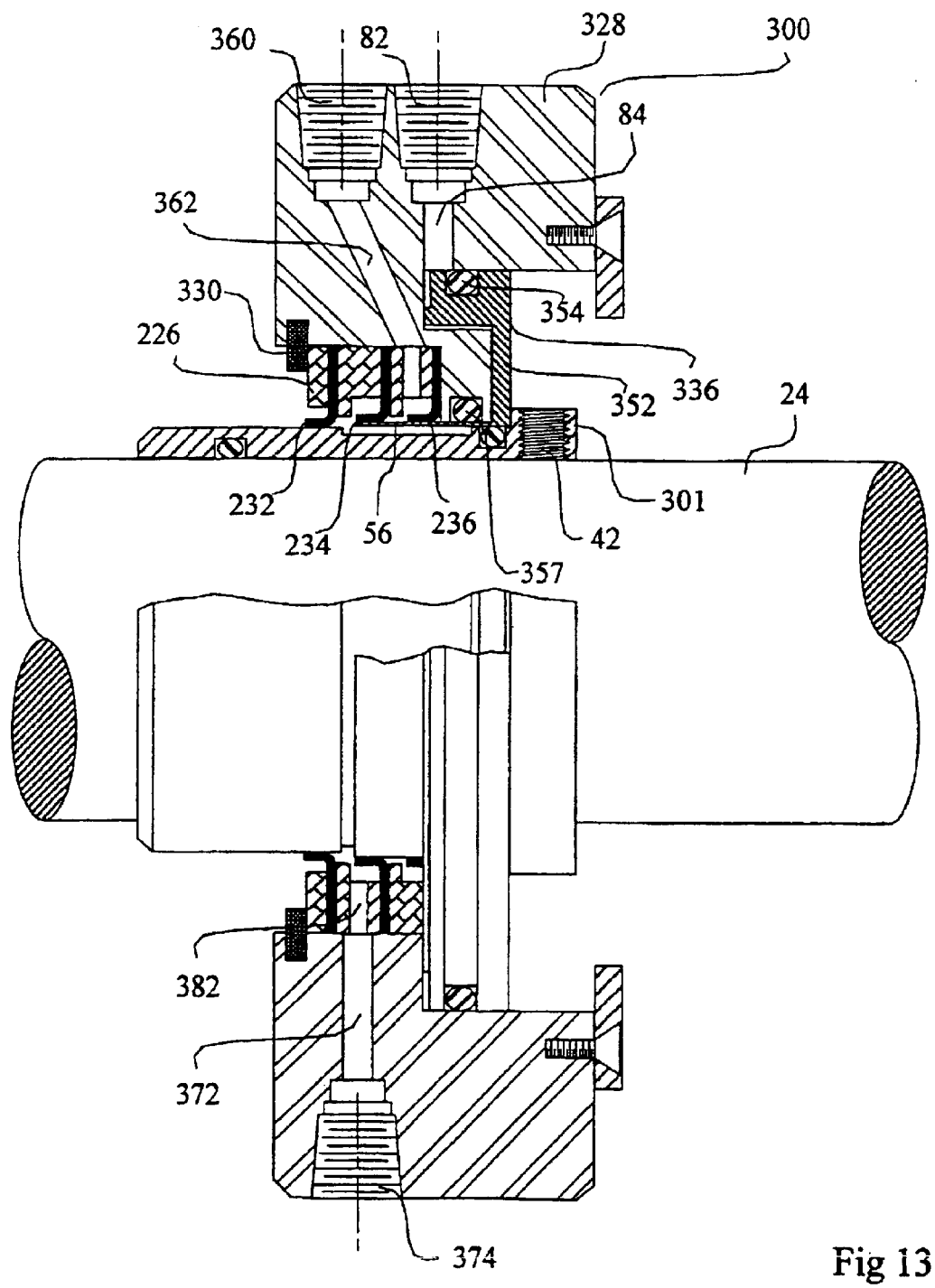
FIG. 13 is a diagrammatic sectional view of a further alternate sealing apparatus according to the present disclosure surrounding a shaft in a pre-assembly, non-operating condition.

FIG. 13 illustrates a further alternate embodiment according to the present disclosure. The sealing apparatus 300 is mounted around a shaft 24 in a pre-assembly, non-operating condition. Sealing apparatus 300 is similar to the previously described sealing apparatus embodiments, except as noted in the description and/or th figures. Thus, sealing apparatus 300 includes seal cluster 226 having three lip seals 232, 234, 236, as previously described. The s al cluster 226 is retained in a gland 328 by a lock ring 330.

The barrier sleeve 336 includes a piston 352 connected to the barrier sleeve 56. The piston 352 is sealed by an O-ring 354 to the gland 328. The piston 352 is responsive to pressurized fluid or gas from the port 82 and channel 84, as previously described. Between the first lip seal 232 and the second lip seal 234 is an annular channel 382 which is connected to a radial channel 372 and a threaded port 374. The annular channel 382, radial channel 372 and port 374 can be used to input a flushing, cooling, lubricating and/or barrier fluid between the lip seals.

Figure 14:
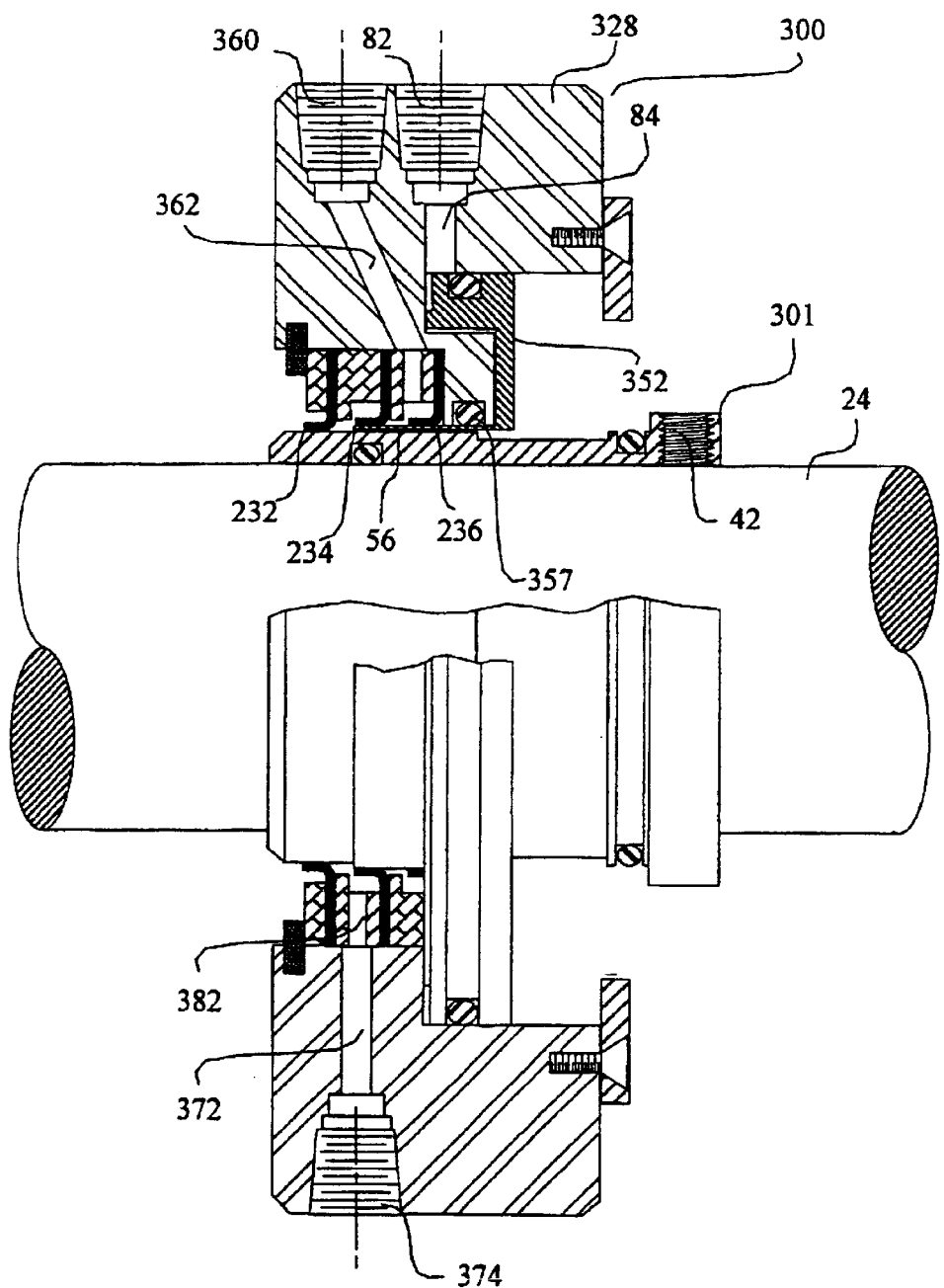
FIG. 14 is a diagrammatic sectional view of the sealing apparatus and shaft of FIG. 13 with a shaft sleeve shifted outwardly and fixed to the shaft.
Figure 15:
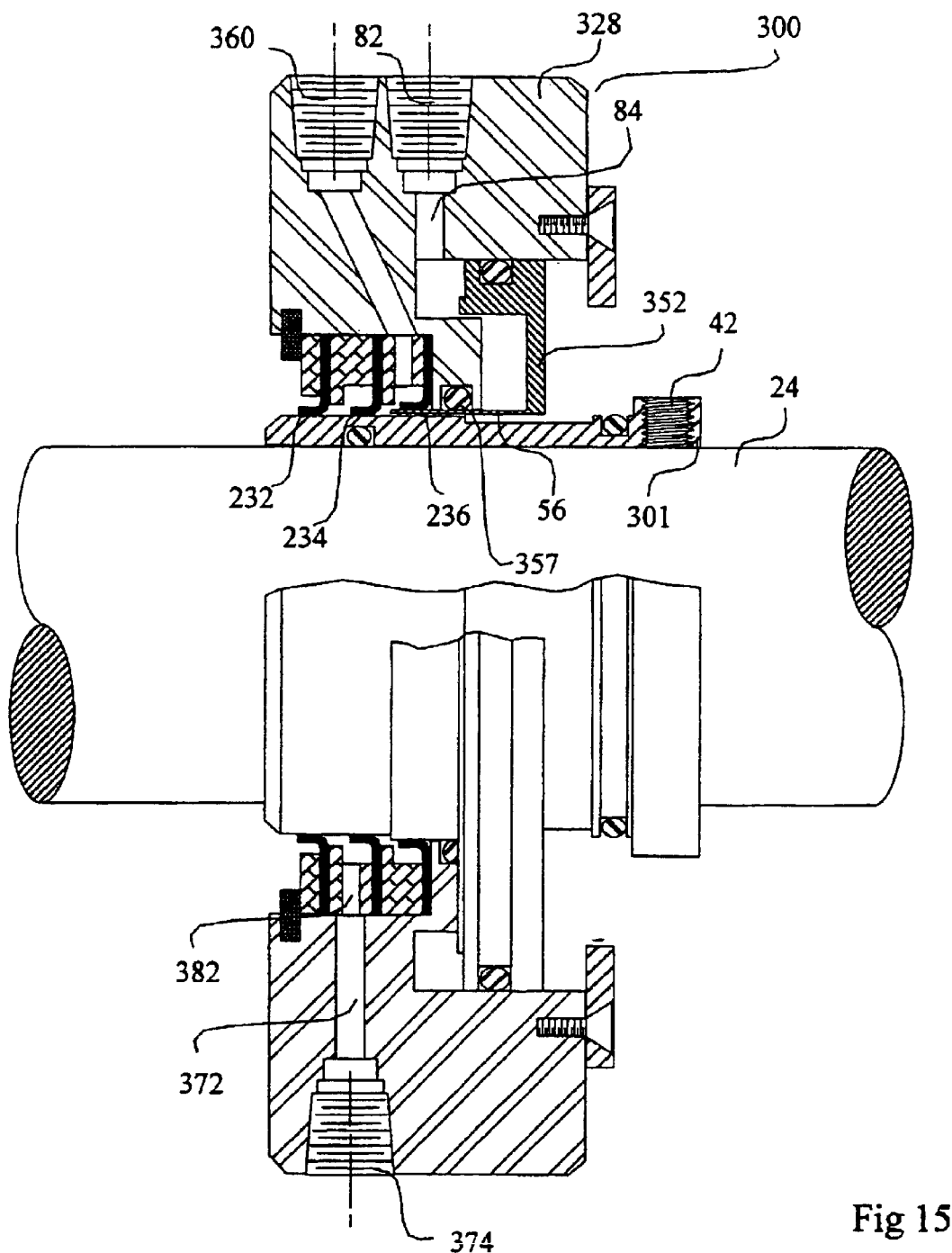
FIG. 15 is a diagrammatic sectional view of the sealing apparatus and shaft of FIG. 14 with a barrier sleeve shown partly shifted outwardly.
Figure 16:
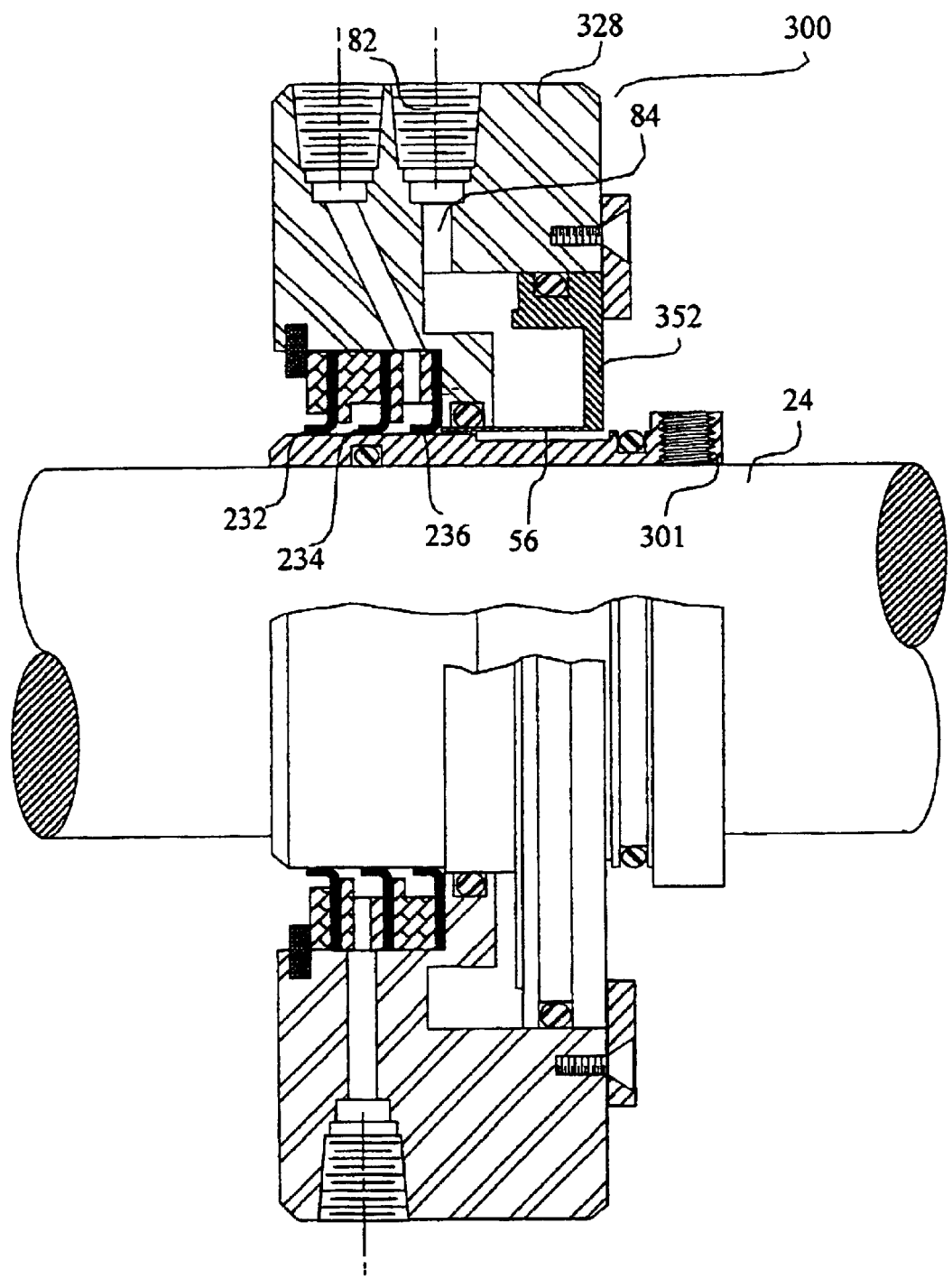
FIG. 16 is a diagrammatic sectional view of the sealing apparatus and shaft of FIG. 14 with the barrier sleeve shown fully shifted outwardly.

FIG. 14 illustrates the sealing apparatus 300 in an operable condition with the shaft sleeve 301 shifted outwardly and fixed to the shaft 24. FIG. 15 illustrates the movement of the barrier sleeve 56 to release the second lip seal 234 to seal against the shaft sleeve 301. Thus, barrier sleeve 56 is no longer interposed between second lip seal 234 and shaft sleeve 301, and second lip seal 234 resiliently returns from a preloaded condition, i.e., the condition effected through interaction with barrier sleeve 56, and a loaded condition in sealing engagement with shaft sleeve 301. FIG. 16 illustrates the further movement of the barrier sleeve 56 to release the third lip seal 236 to seal against the shaft sleeve 301, i.e., to resiliently translate from a preloaded to a loaded condition.

Figure 17:
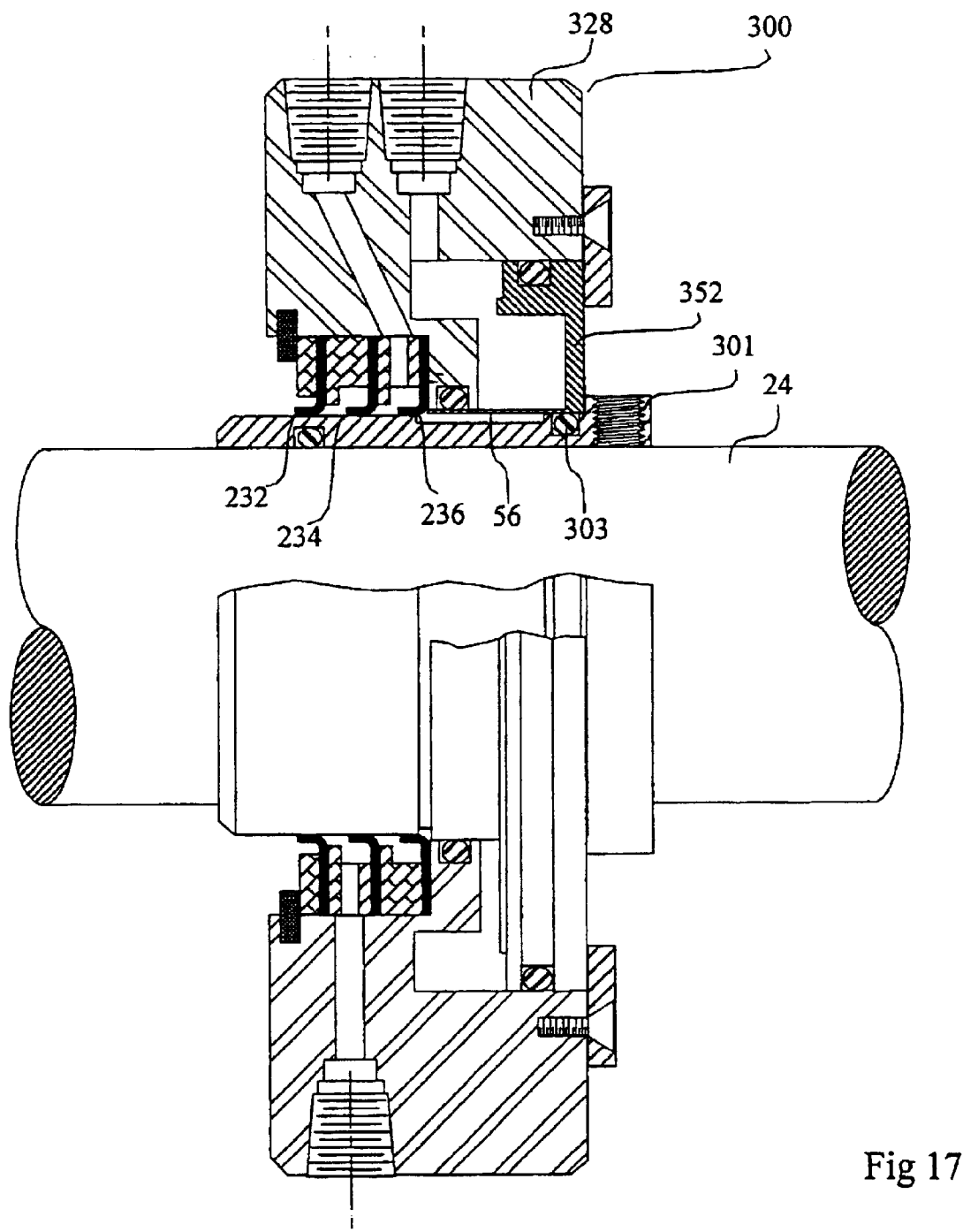
FIG. 17 is a diagrammatic sectional view of the sealing apparatus and shaft of FIG. 16 with the shaft sleeve disengaged from the shaft and inwardly positioned against the barrier sleeve, in a sealed, shut down condition.

FIG. 17 illustrates the condition of sealing apparatus 300 after all the lip seals have failed and the shaft sleeve is loosened from the shaft. After loosening, the shaft sleeve is retracted inwardly to seal the barrier sleeve 56 to an O-ring 303 carried by the shaft sleeve 301. In this condition, th fluid-handling machine is shut down awaiting repair of the sealing apparatus 300.

Figure 18:
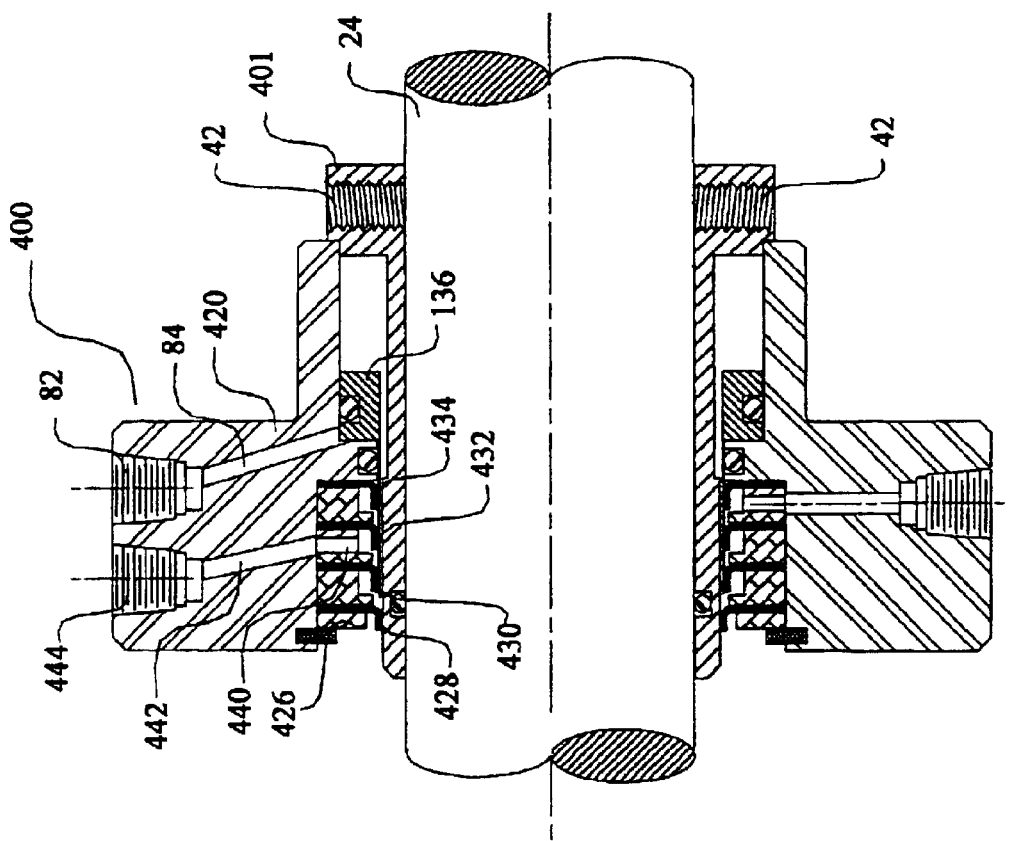
FIG. 18 is a diagrammatic sectional view of a further alternate sealing apparatus according to the present disclosure surrounding a shaft in a pre-assembly, non-operating condition.

FIG. 18 illustrates a further alternate embodiment of the present disclosure, wherein sealing apparatus 400 surrounds a shaft sleeve 401 fixed on a shaft 24, shown in a pre-assembled, non-operating condition. The sealing apparatus 400 of this further exemplary embodiment is similar to the previously described embodiments, except as noted in the description and/or the figures. The sealing apparatus 400 includes a gland 420 holding a seal lip cluster 426, having four lip seals 428, 430, 432, 434. This embodiment 400 is similar to the embodiment of FIGS. 6–9, except that an annular channel 440 is arranged between the second and third lip seals 430, 432. Annular channel 440 is connected to a radial channel 442 and a port 444, and is used to input flushing, cooling, lubricating and/or barrier fluid between the second and third lip seals 430, 432. Likewise, an annular channel 450, a radial channel 452 and a port 454 are provided between the third and fourth lip seals 432, 434, and used to input a flushing, cooling, lubricating and/or barrier fluid between such lip seals.

Figure 19:
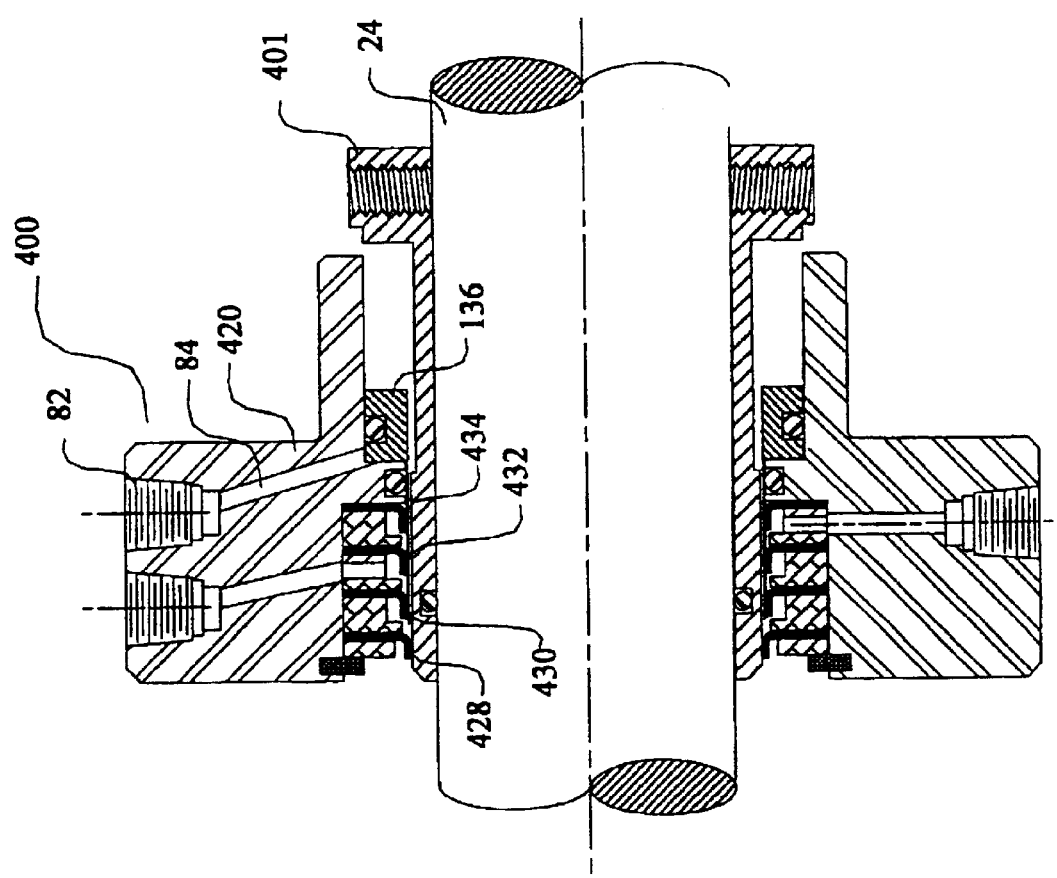
FIG. 19 is a diagrammatic sectional view of the sealing apparatus of FIG. 18 with a shaft sleeve shifted outwardly and fixed to the shaft.
Figure 20:
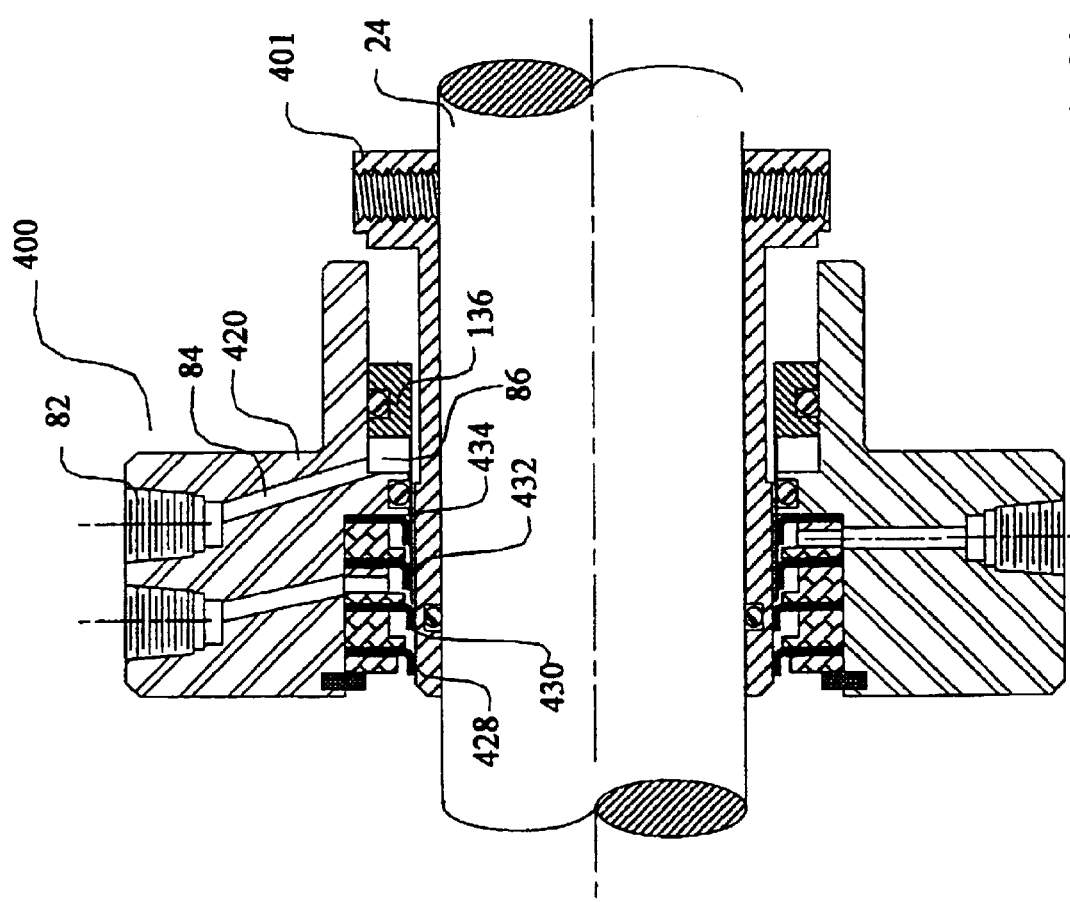
FIG. 20 is a diagrammatic sectional view of the sealing apparatus of FIG. 19 with a barrier sleeve shifted outwardly a first incremental distance.

FIG. 19 illustrates the sealing apparatus 400 in an assembled, operable condition with only the first lip seal 428 sealed against the shaft sleeve 401. FIG. 20 illustrates the incremental movement of the barrier sleeve 136 under pressure from pressurized fluid or gas from the port 82, channel 84 and chamber 86, as previously described. As shown in FIG. 20, barrier sleeve 136 is no longer interposed between second lip seal 430 and shaft sleeve 401, thereby permitting the second lip seal 430 to resiliently return from a preloaded condition (shown in FIG. 19) to a loaded condition. The second lip seal 430 is thus released to seal against the shaft sleeve 401.

Figure 21:
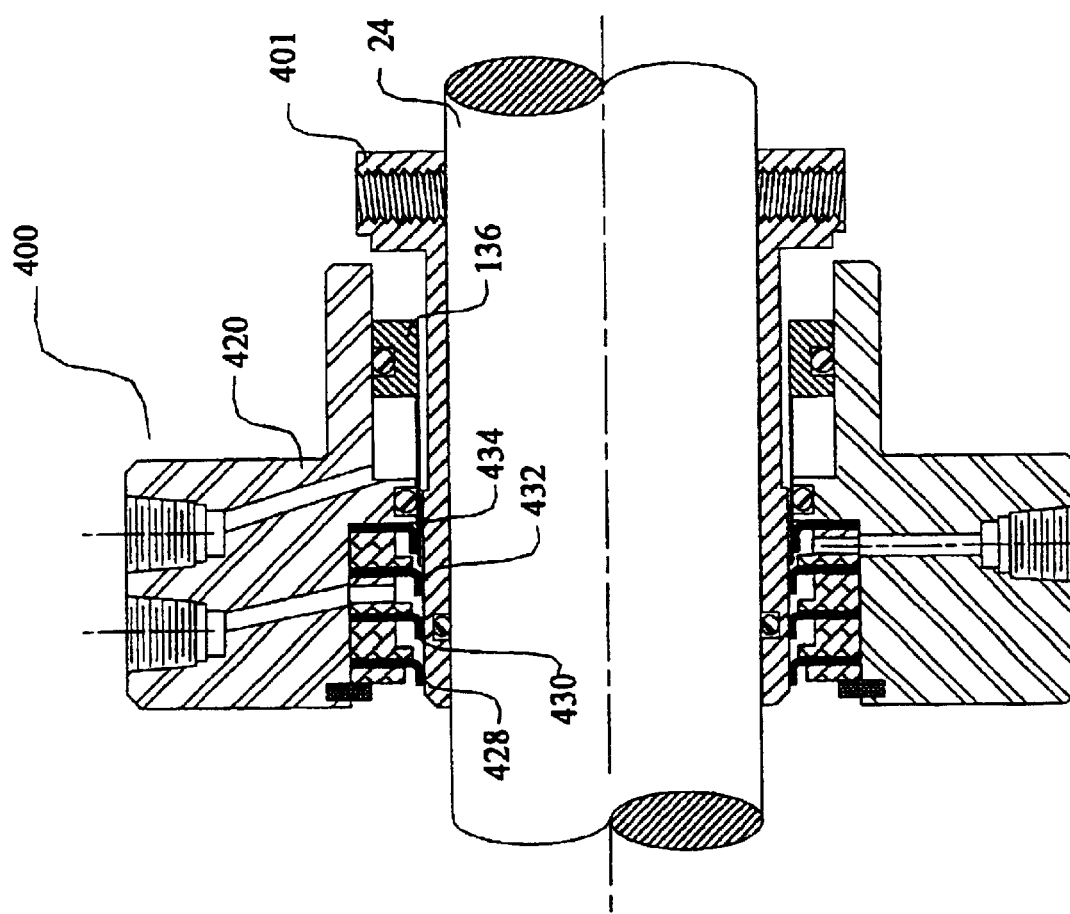
FIG. 21 is a diagrammatic sectional view of the sealing apparatus of FIG. 20 with the barrier sleeve shifted outwardly a second incremental distance.
Figure 22:
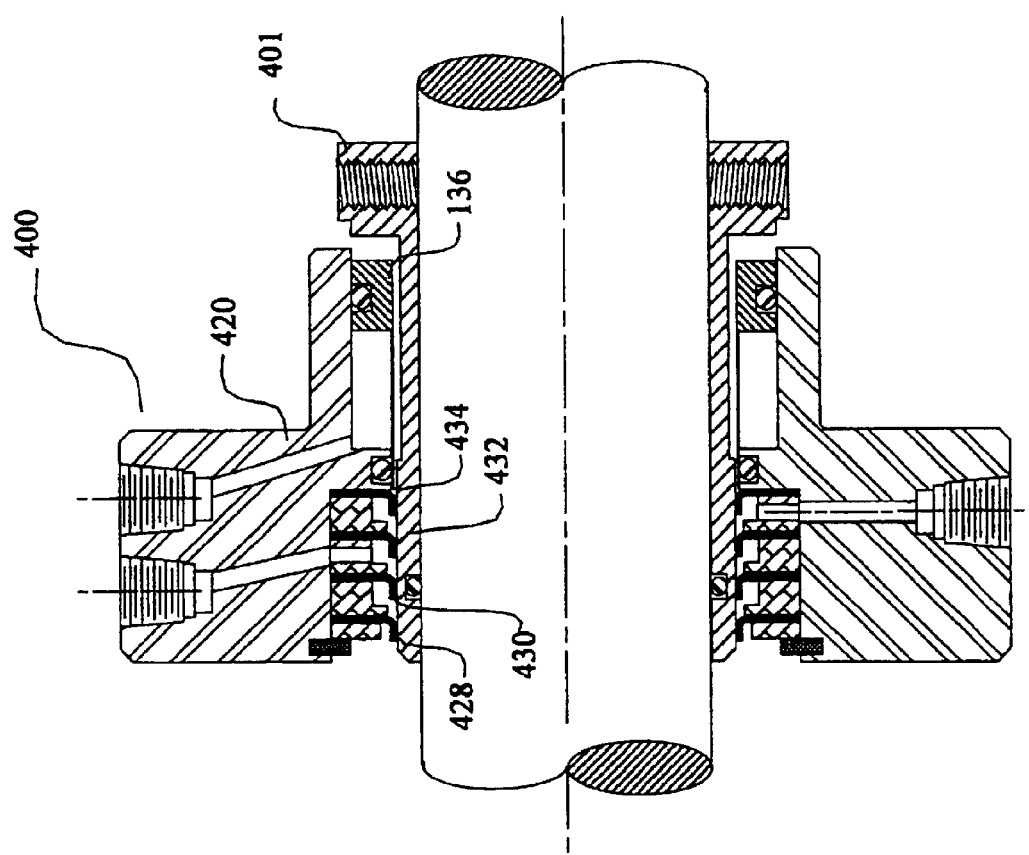
FIG. 22 is a diagrammatic sectional view of the sealing apparatus of FIG. 21 with the barrier sleeve shifted outwardly a third incremental distance.

FIG. 21 illustrates the further incremental movement of the barrier sleeve 136 under pressure from pressurized fluid or gas communicated from port 82, through channel 84 and into chamber 86, as previously described. Barrier sleeve 136 is no longer interposed between the third lip seal 432 and shaft sleeve 401, and the third lip seal 432 is thus released to seal against the shaft sleeve 401. FIG. 22 illustrates the further movement of barrier sleeve 136, as fourth lip seal is freed from interaction with barrier sleeve 136 and permitted to resiliently translate from a preloaded condition to a loaded condition in sealing engagement with shaft sleeve 401.

As shown in the sequential movements of FIGS. 19, 20 and 21, the lip seals 430, 432, 434 are sequentially released through movement of barrier sleeve 136 to sealingly engage shaft sleeve 401. As each additional lip seal is released by barrier sleeve 136, the first lip seal 428 and any previously released lip seal(s) remain in a loaded condition, thereby such lip seal(s) are able to continue contributing to the sealing functionality of sealing apparatus 400. In this regard, the previously released seal(s) serve as upstream, preliminary restrictors on leakage pressure passing to the latest deployed seal and thus afford pressure drops enroute to the acting seal. Accordingly, a notable characteristic of the inventive sealing apparatus is that it may be expected that the wear life of each successively deployed lip seal will be longer than that of the previously released seal, all things being equal. Although worn lip seals may be ineffective to prevent leakage from sealing apparatus 400, such worn lip seals continue to contribute sealing functionality through their interaction with shaft sleeve 401 throughout the operative life of sealing apparatus 400.

Figure 23:
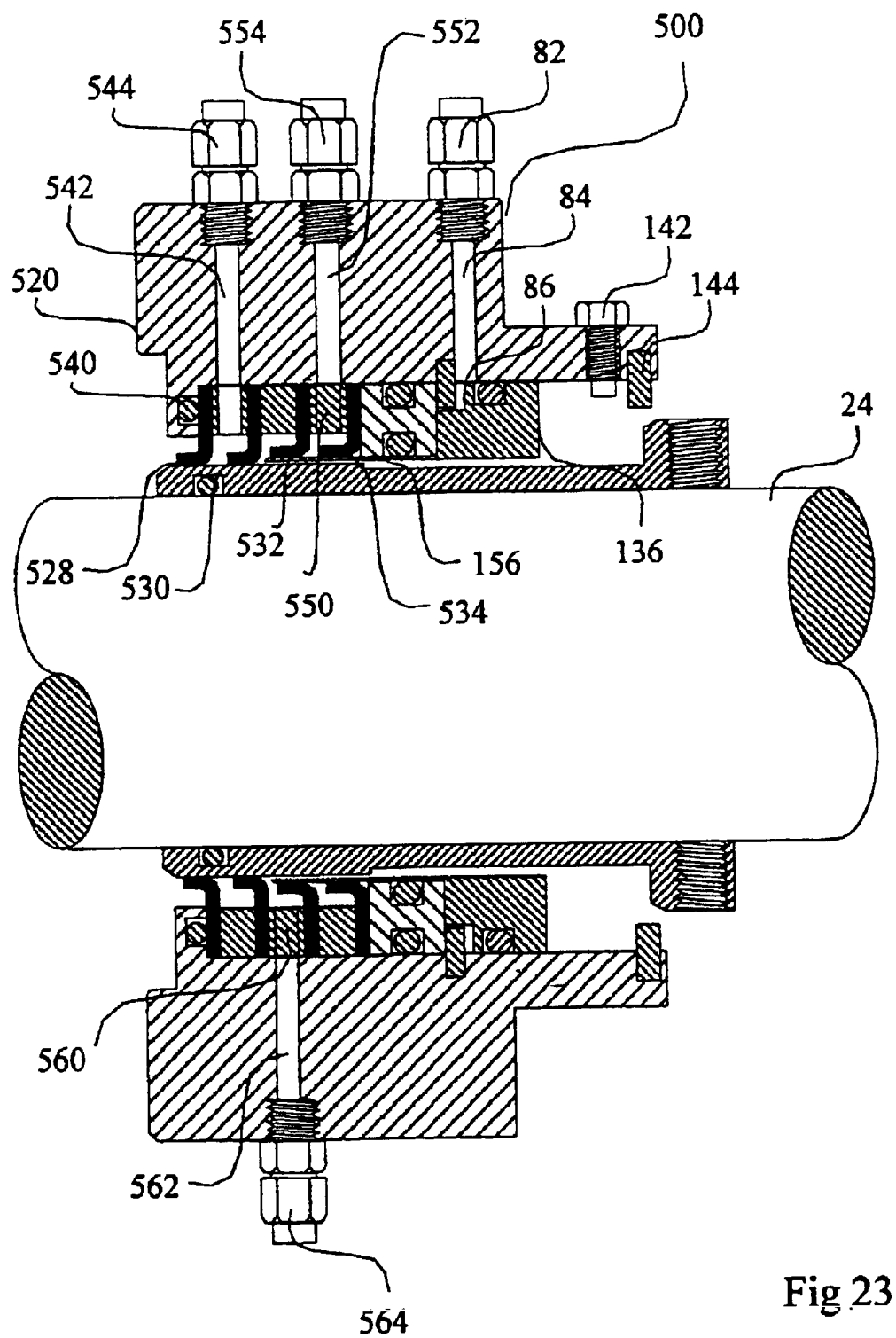
FIG. 23 is a diagrammatic sectional view of a further alternate sealing apparatus according to the present disclosure surrounding a shaft in an operating condition.

FIG. 23 illustrates a further exemplary embodiment according to the present disclosure, in which sealing apparatus 500 surrounds a shaft 24. This additional exemplary embodiment is similar to the embodiment illustrated in FIGS. 11 and 12, except that a gland 520 holds four lip seals 528, 530, 532, 534. The first and second lip seals 528, 530 are the primary lip seals, and the third and fourth lip seals 532, 534 are back-up lip seals. An annular channel 540 is arranged between the first and second lip seals 528, 530, in fluid communication with a radial channel 542, and a port 544. The annular channel 540, the radial channel 542 and the port 544 can be used to communicate a flushing liquid between the lip seals 528, 530, or to inject a cooling, lubricating and/or barrier fluid between the lip seals 528, 530.

An annular channel 560 is arranged between the second and third lip seals 530, 532, in fluid communication with a radial channel 562 and a port 564. The annular channel 560, the radial channel 562 and the port 564 can be used to communicate a flushing liquid between the lip seals 530, 532, or to inject a cooling, lubricating and/or barrier fluid between the lip seals 530, 532. An annular channel 550 is also arranged between the third and fourth lip seals 532, 534, in fluid communication with a radial channel 552 and a port 554. The annular channel 550, the radial channel 552 and the port 554 can be used to communicate a flushing liquid between the lip seals 532, 534, or to inject a cooling, lubricating and/or barrier fluid between the lip seals 532, 534.

Figure 24:
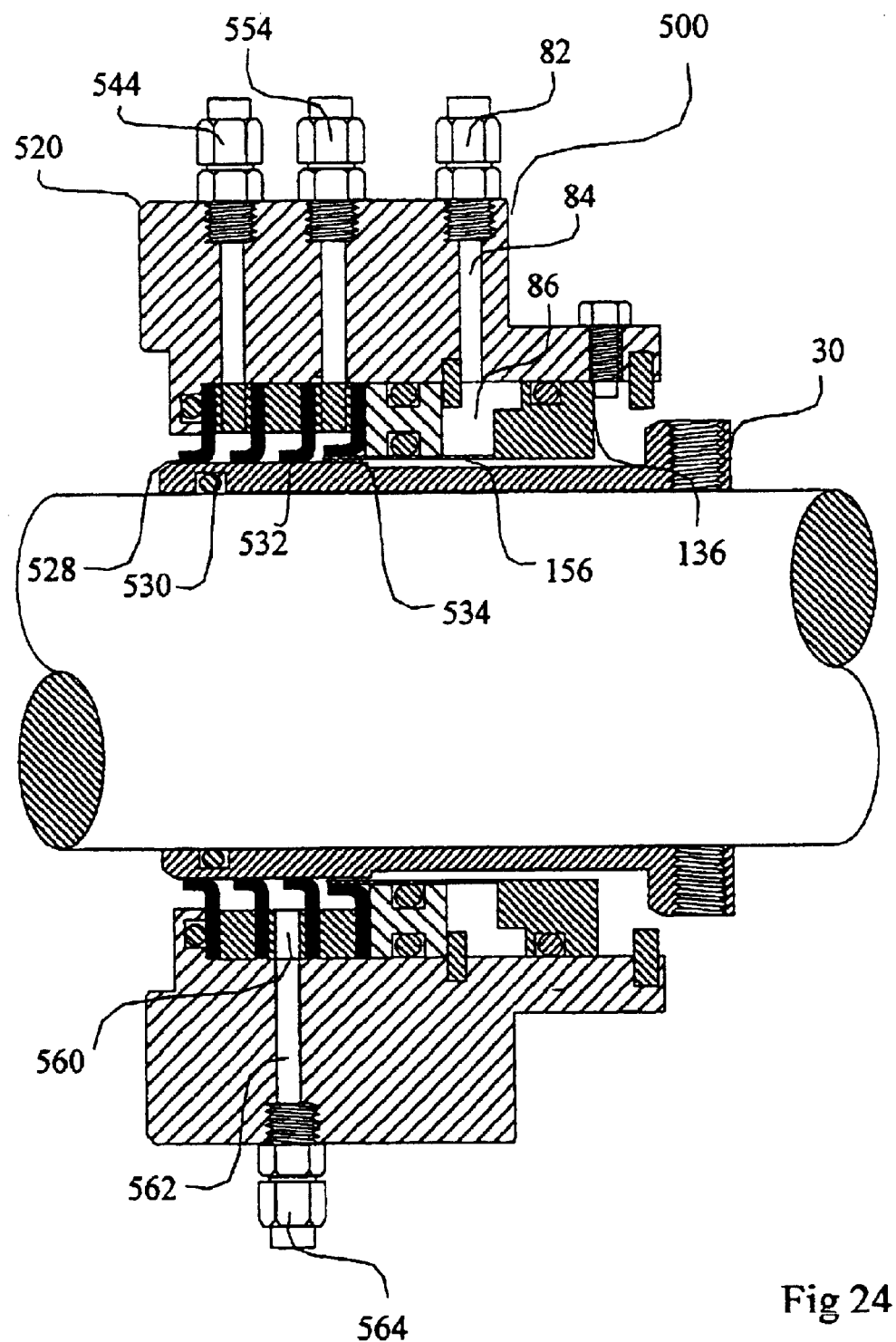
FIG. 24 is a diagrammatic sectional view of the sealing apparatus of FIG. 23 with a barrier sleeve shifted outwardly a first incremental distance.
Figure 25:
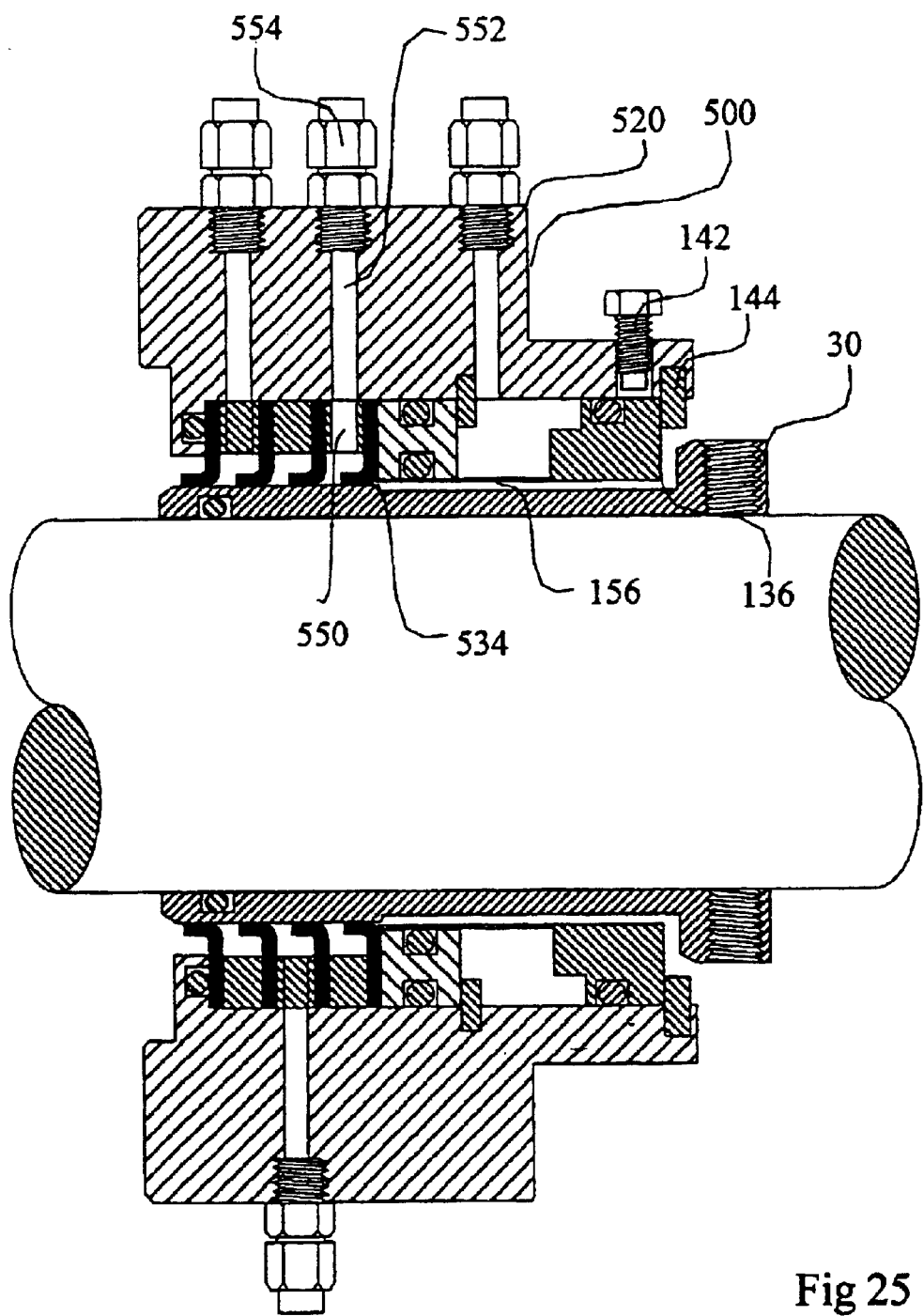
FIG. 25 is a diagrammatic sectional view of the sealing apparatus of FIG. 24 with the barrier sleeve shifted outwardly a second incremental distance.

FIG. 24 illustrates the barrier sleeve 136 moved incrementally to the right by a predetermined distance that corresponds to release of one lip seal from a preloaded condition, i.e., a condition in which barrier sleeve 136 is interposed between third lip seal 532 and shaft sleeve 30, thereby releasing the third lip seal 532 to sealingly engage against the shaft sleeve 30. FIG. 25 illustrates the barrier sleeve 136 moved incrementally to the right by an additional predetermined distance to release the fourth lip seal 534 to seal against the shaft sleeve 30.

Figure 26:
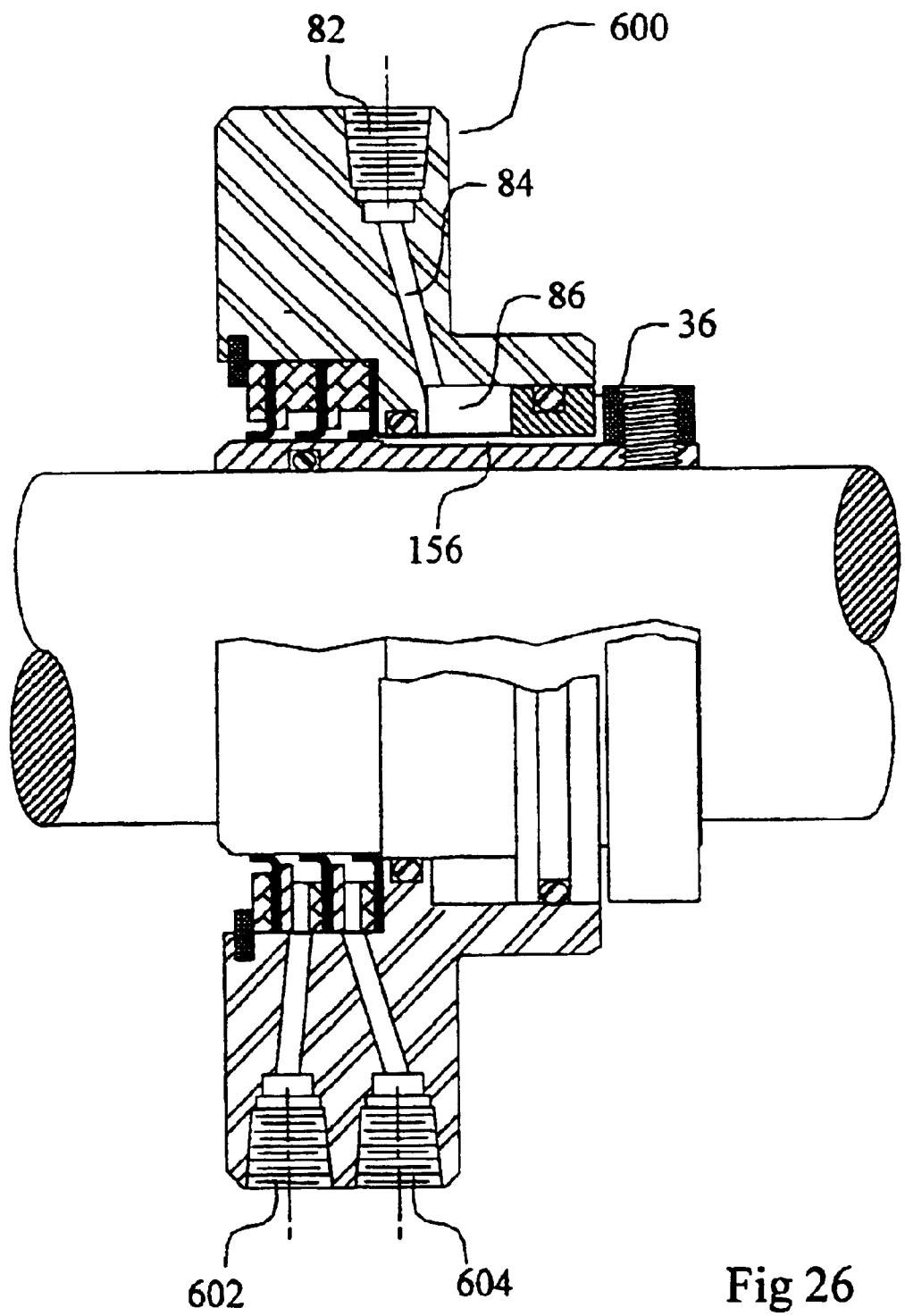
FIG. 26 is a diagrammatic sectional view of a further alternate sealing apparatus according to th present disclosure surrounding a shaft, shown in an operating condition with a barrier sleeve shifted completely to an outward limit.

FIG. 26 illustrates a further exemplary embodiment according to the present disclosure, in which sealing apparatus 600 represents a modification of the embodiment shown in FIGS. 11–12. In this alternative embodiment, channeling and ports, indicated generally at 603 and 604, are arranged between the first and second lip seals and the second and third lip seals. The channeling and ports are typically configured and arranged in the manner described, for example, with respect to the embodiment of FIG. 13.

Figure 27:
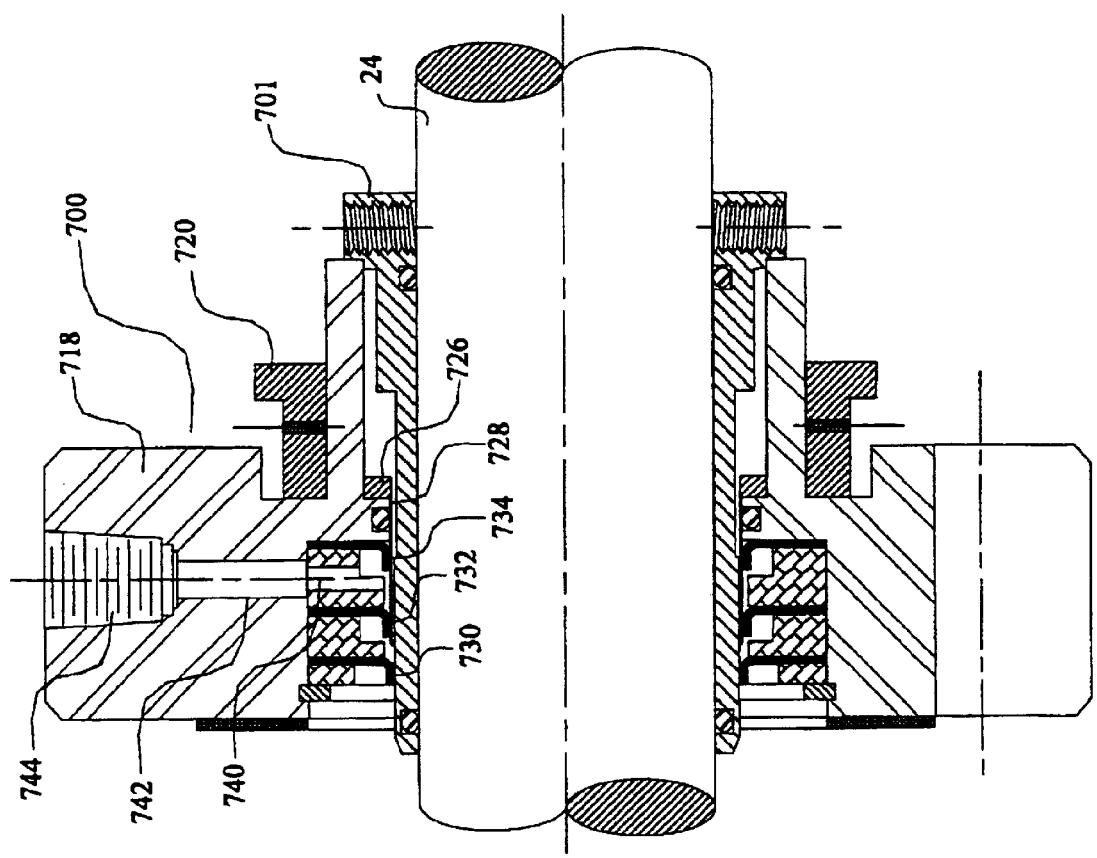
FIG. 27 is a diagrammatic sectional view of a further alternate sealing apparatus according to the present disclosure surrounding a shaft in a pre-assembly, non-operating condition.

FIG. 27 illustrates a further alternate embodiment according to the present disclosure. The sealing apparatus 700 includes a gland 718 surrounding a shaft sleeve 701 fixed to a shaft 24. The sealing apparatus 700 is depicted in a pre-assembly, non-operating condition. According to this embodiment, a manually actuable external lug or ring 720 is connected to a barrier sleeve 726. The barrier sleeve 726 includes a barrier cylinder 728 which can be withdrawn from beneath preloaded back-up lip seals 732, 734 to deploy the lip seals into sealing engagement with the rotating or reciprocating shaft sleeve 701. An annular channel 740 arranged between the back-up lip seals 732, 734 is in fluid communication with a radial channel 742 and a port 744. The annular channel 740, radial channel 742 and port 744 can be used to inject a flushing, cooling, lubricating, and/or barrier fluid between the lip seals.

Figure 28:
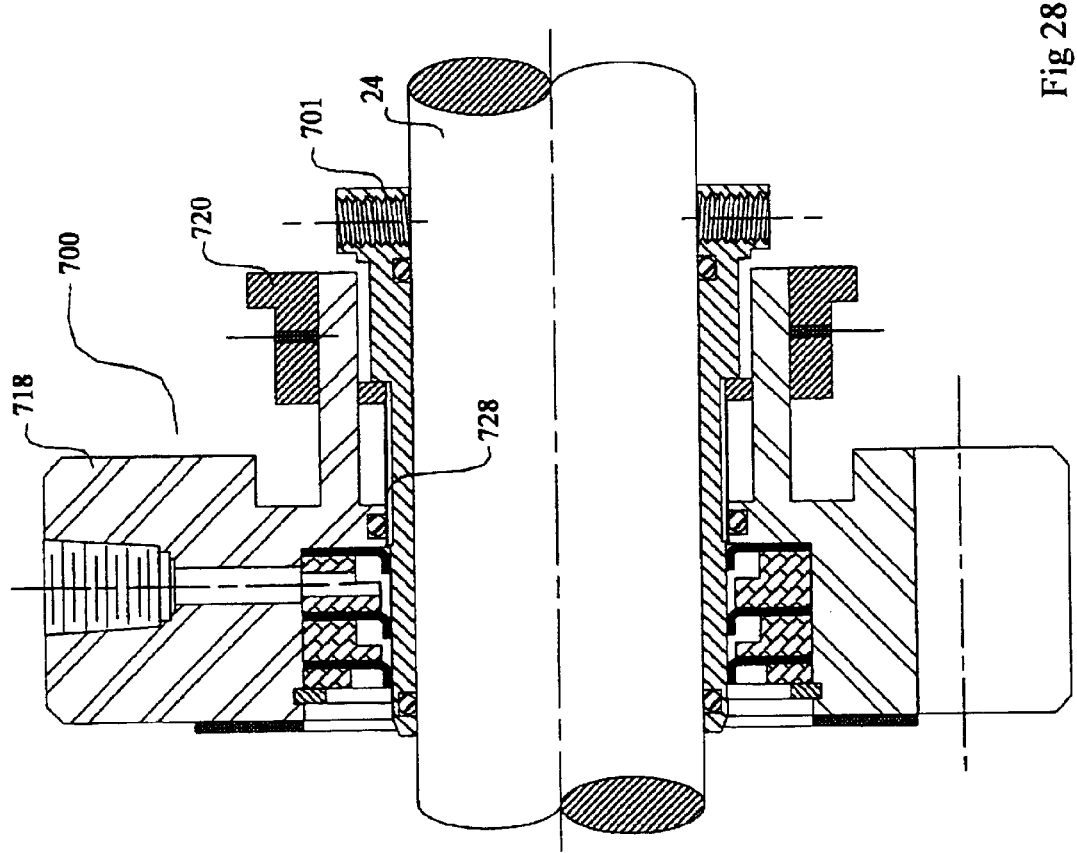
FIG. 28 is a diagrammatic sectional view of the sealing apparatus of FIG. 27 in an initial stage of assembly, with the barrier sleeve shown fully shifted outwardly, and the shaft sleeve shifted outwardly and fixed to the shaft.
Figure 29:
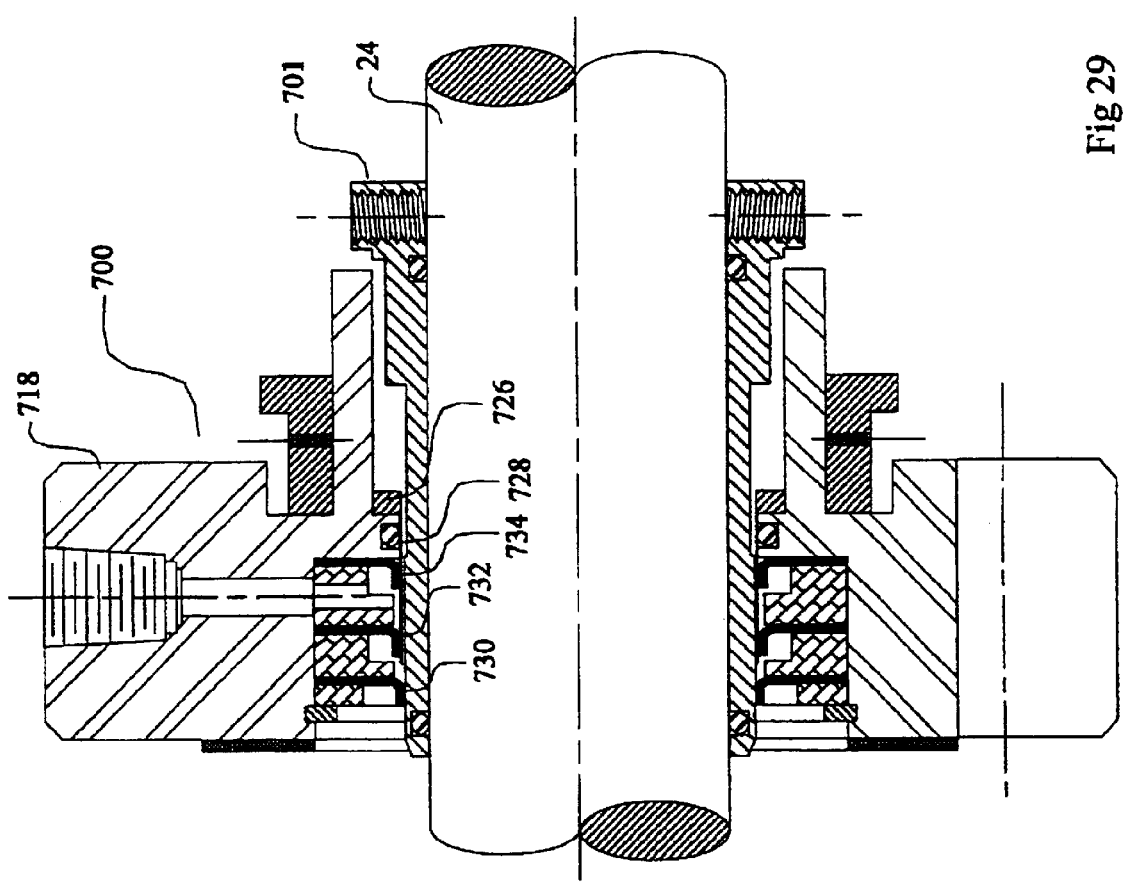
FIG. 29 is a diagrammatic sectional view of the sealing apparatus of FIG. 28 in an operating condition, with the barrier sleeve shown fully retracted inwardly.

FIG. 28 illustrates the sealing apparatus 700 in an assembled state on the shaft sleeve 701. The barrier sleeve 726 is completely retracted, i.e., withdrawn so as not to be interposed between lip seals 732, 734 and shaft sleeve 701. The shaft sleeve 701 is completely extended and fixed to the shaft 24. FIG. 29 illustrates the sealing apparatus 700 operable on the shaft sleeve 701, with the barrier cylinder 728 placed or interposed beneath the second and third lip seals 732, 734 to preload the lip seals 732, 734 and separate the lip seals 732, 734 from engagement with the rotating shaft sleeve 701.

Figure 30:
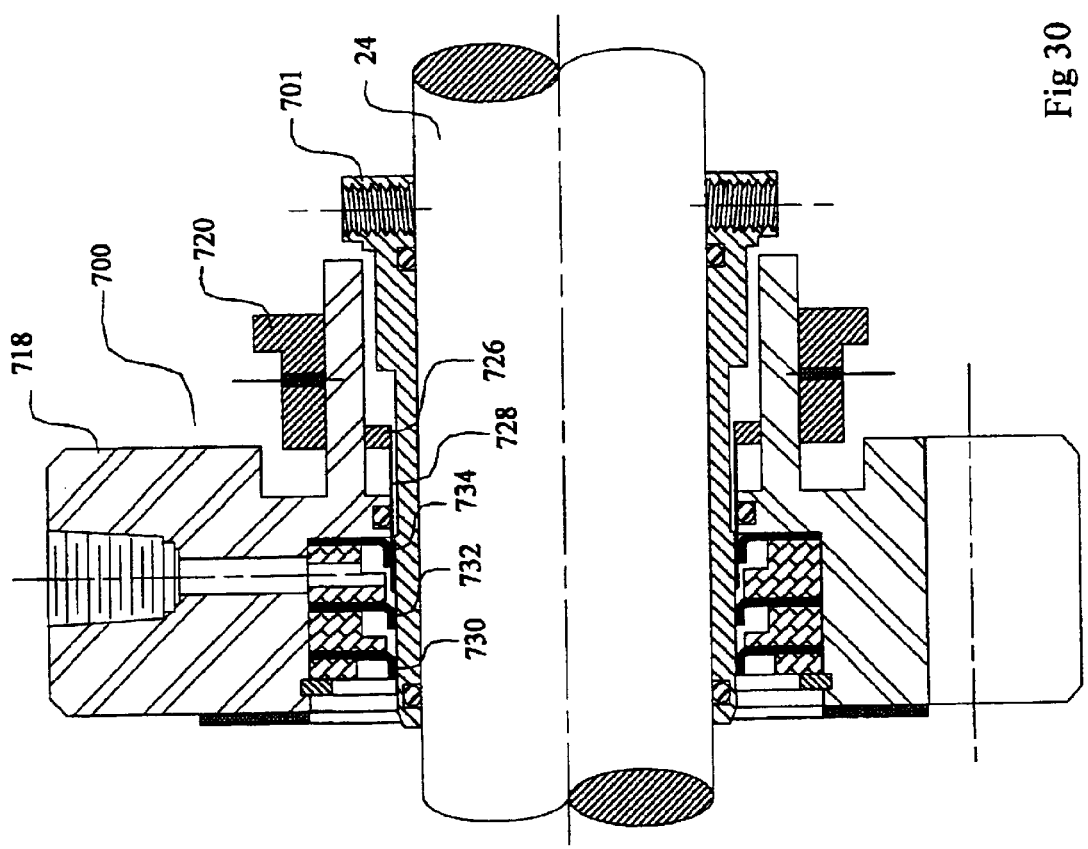
FIG. 30 is a diagrammatic sectional view of the sealing apparatus of FIG. 29 with the barrier sleeve shifted outwardly a first incremental distance.

FIG. 30 illustrates the barrier cylinder 728 shifted one incremental distance outwardly to deploy the first back-up lip seal, i.e., second lip seal 732. FIG. 31 illustrates the barrier cylinder 728 shifted outwardly a second incremental distance to deploy the second back-up lip seal, i.e., third lip seal 734. FIG. 32 illustrates an end view of the sealing apparatus 700.

Figure 33:
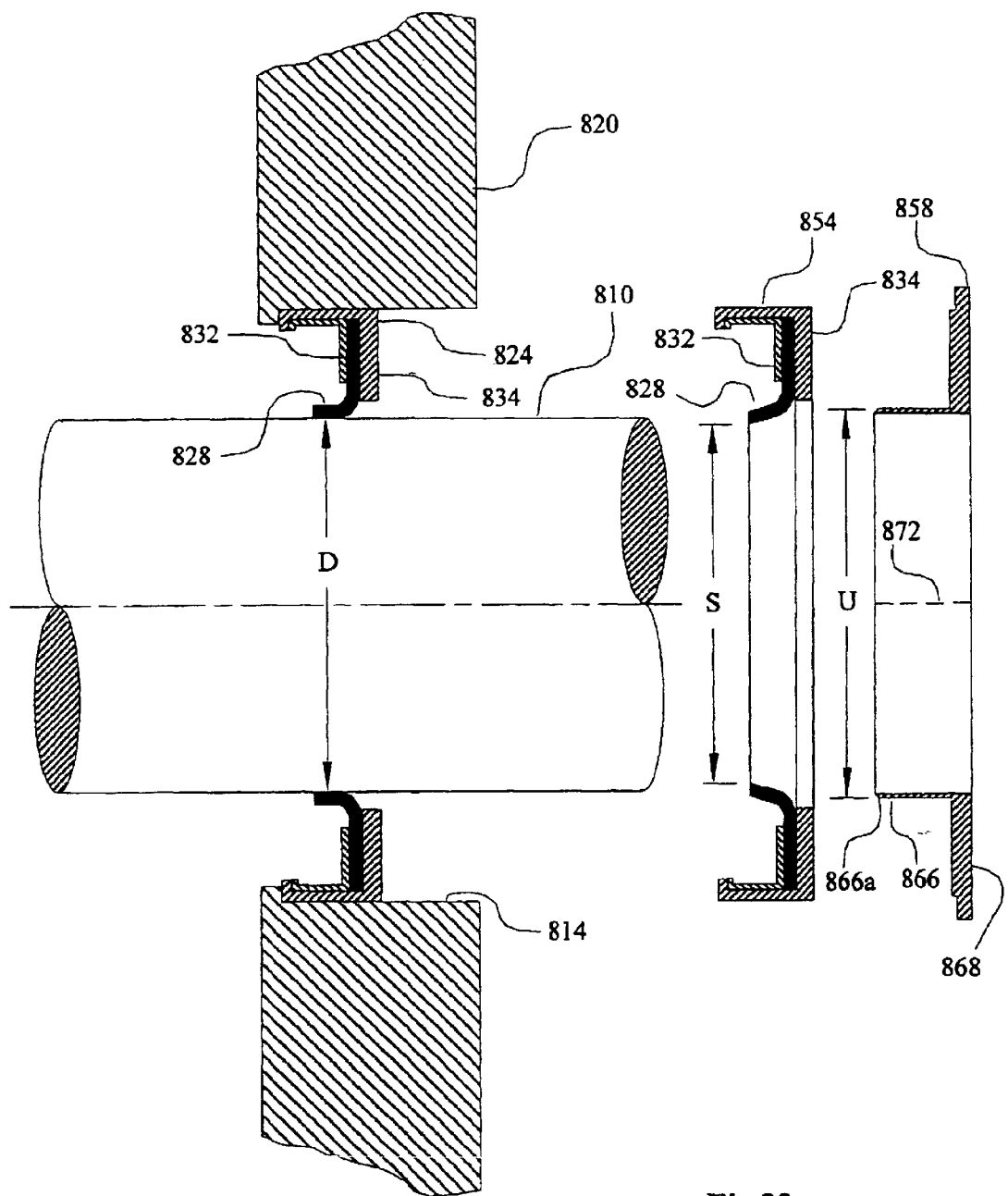
FIG. 33 is a diagrammatic sectional view of a further alternate sealing apparatus according to the present disclosure.
Figure 34:
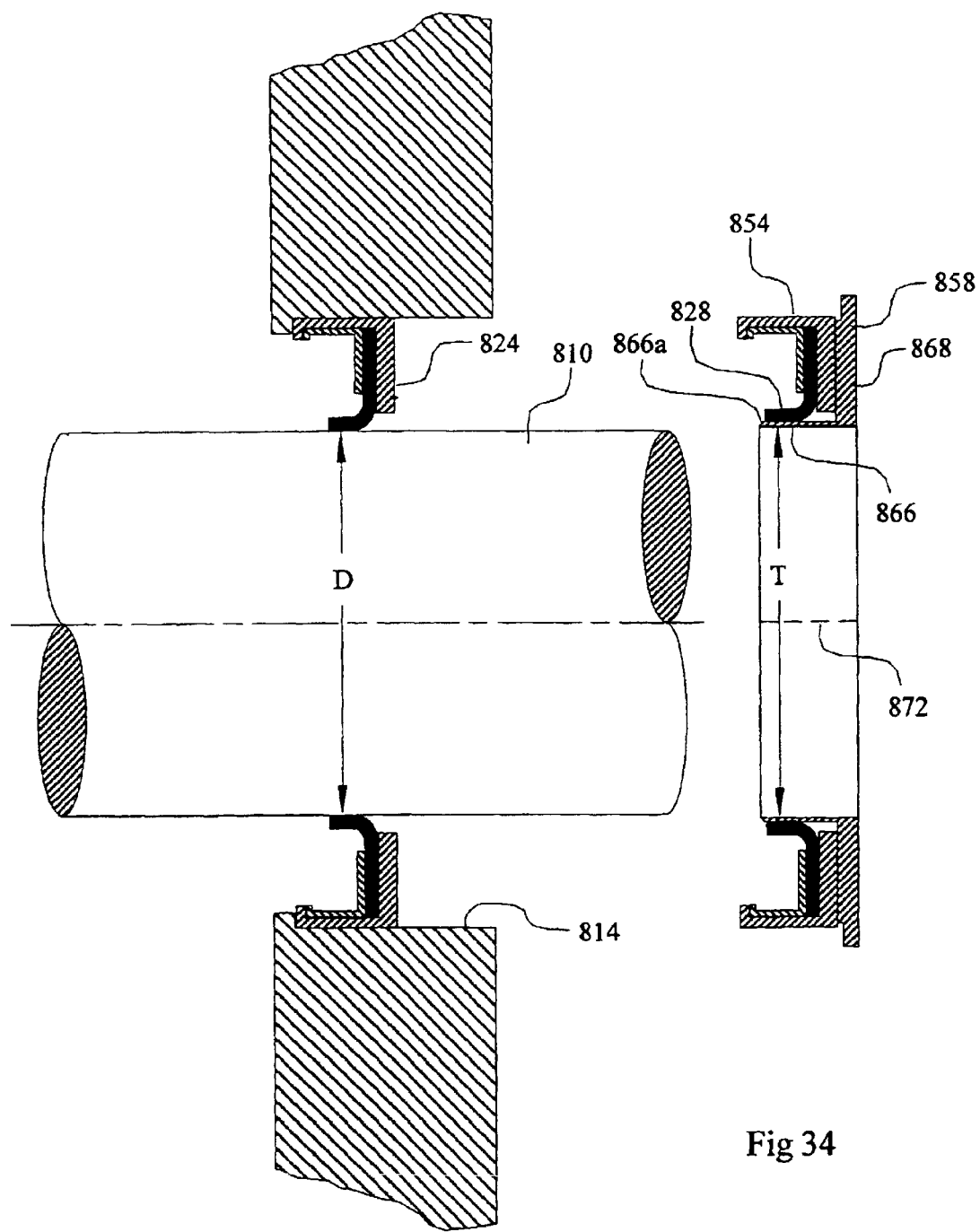
FIG. 34 is a diagrammatic sectional view of the sealing apparatus of FIG. 33.
Figure 35:
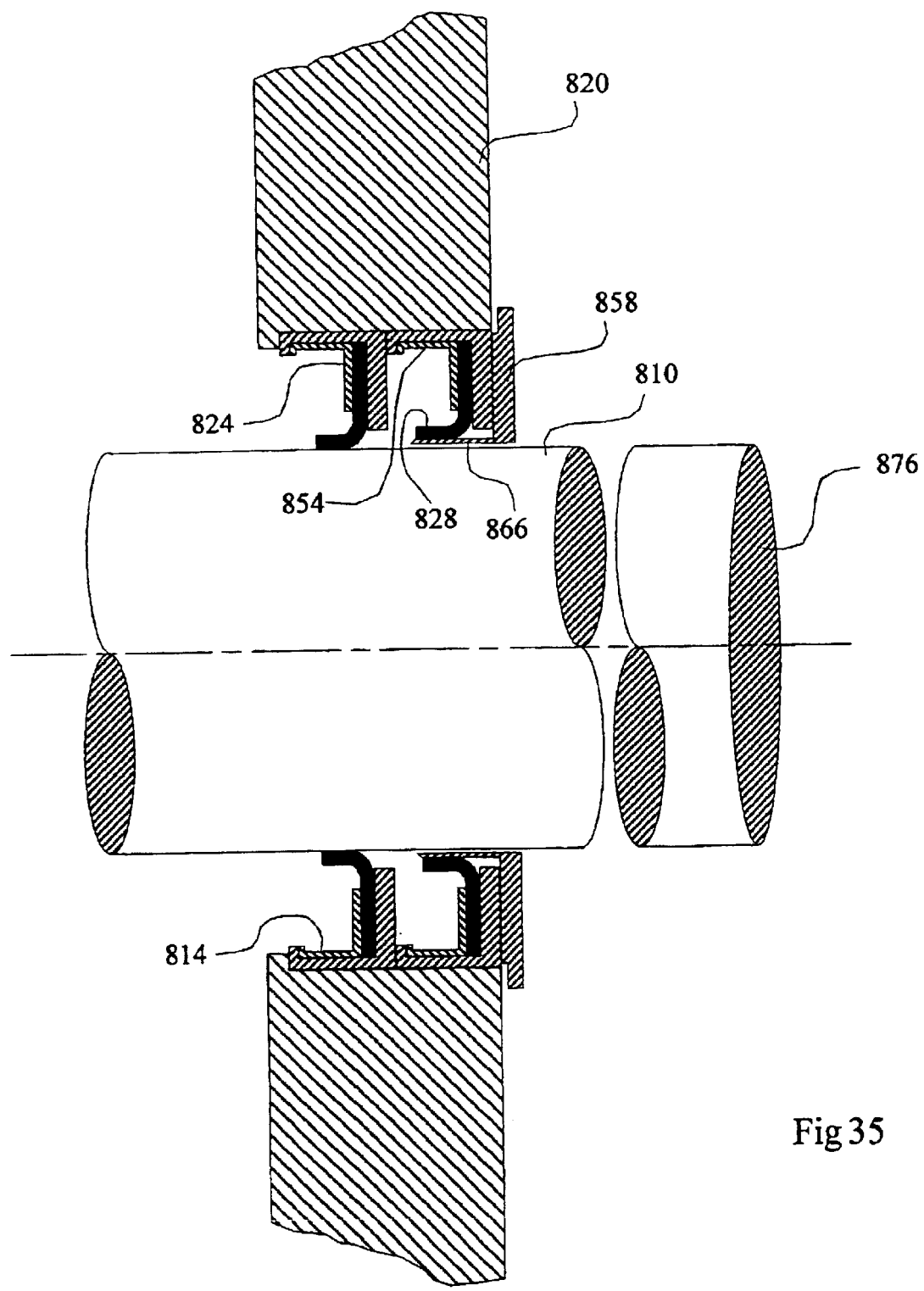
FIGS. 35 and 35a are further diagrammatic sectional views of the sealing apparatus of FIG. 33.

FIGS. 33–35 illustrate a further embodiment of the present disclosure. With reference to FIG. 33, a shaft 810 operates to rotate or reciprocate within a penetration opening 814 of a housing, casing, gland or other stationary structure 820. In the exemplary embodiment of FIGS. 33–35, the shaft 810 may be a rotating shaft in an automotive apparatus, such as an engine, a transmission, a transaxle, or a gear box. In such design, the structure 820 may be the case or casing for such an automotive apparatus.

A primary lip seal assembly 824 is held by the structure 820. The primary assembly 824 includes a flexible lip seal 828 held by inner and outer retainer rings 832, 834. The lip seal 828 has a general L-shaped profile and an inside diameter selected to be smaller (in a relaxed state) than an outside diameter D of the shaft 810. The assembly 824 is fixedly held by the structure 820 to prevent relative rotation therebetween, by conventional means, such as pins, fasteners, press fitting, etc. (not shown).

A secondary seal assembly 854 having substantially identical elements 828, 832, 834 is provided with a barrier sleeve 858. The barrier sleeve 858 is preferably composed of a plastic material suitably selected for the operating condition of the apparatus. The barrier sleeve 858 comprises a central tube 866 and an end flange 868. The central tube 866 includes one or more axial lines of weakness or fracture zones 872. The fracture zone 872 can be formed by a discontinuous through-cut, or an elongated notch forming a reduced wall thickness, or by a line of perforation, or by another known method.

As illustrated in FIGS. 33 and 34, the secondary seal assembly 854 is mounted on the barrier sleeve 858. The corresponding lip seal 828 has a relaxed inside diameter S smaller than the outside diameter D of the shaft, and an outside diameter U of the central tube 866. The corresponding lip seal 828 is slightly resiliently opened up, i.e., placed in a preloaded condition, to fit over the central tube 866 of th barrier sleeve 858. The central tube 866 has a beveled leading edge 866a to assist opening up the lip seal 828. The central tube 866 has an inside diameter T greater than the outside diameter D of the shaft 810 to provide a running clearance.

As further illustrated in FIG. 35, the secondary lip seal assembly 854 with the barrier sleeve 858 is inserted between shaft 810 and the structure 820, abutting the primary lip seal assembly 824. To slip the assembly 854 and the barrier sleeve 858 onto the shaft 810, a free end 876 of the shaft 810 is made available at that stage of the assembly. The central tube 866 of the barrier sleeve 858 is automatically centered by the lip seal assembly 854, and more particularly by the resilient gripping of the lip seal 828 of the assembly 854, provided that the shaft 810 itself is centered within the shaft penetration opening 814 of the structure 820.

The interposition of central tube 866 prevents the lip seal 828 of the secondary lip seal assembly 854 from touching or sealingly engaging the shaft 810. The secondary lip assembly 854 is held within the opening 814 of the structure 820 in the same fashion as that described for the primary lip seal assembly 824. The barrier sleeve 858 is held in place by conventional means, such as fasteners or clips (not shown). Alternatively, the barrier sleeve 858 may be held in place merely by a frictional gripping by the lip seal 828.

Figure 35A:
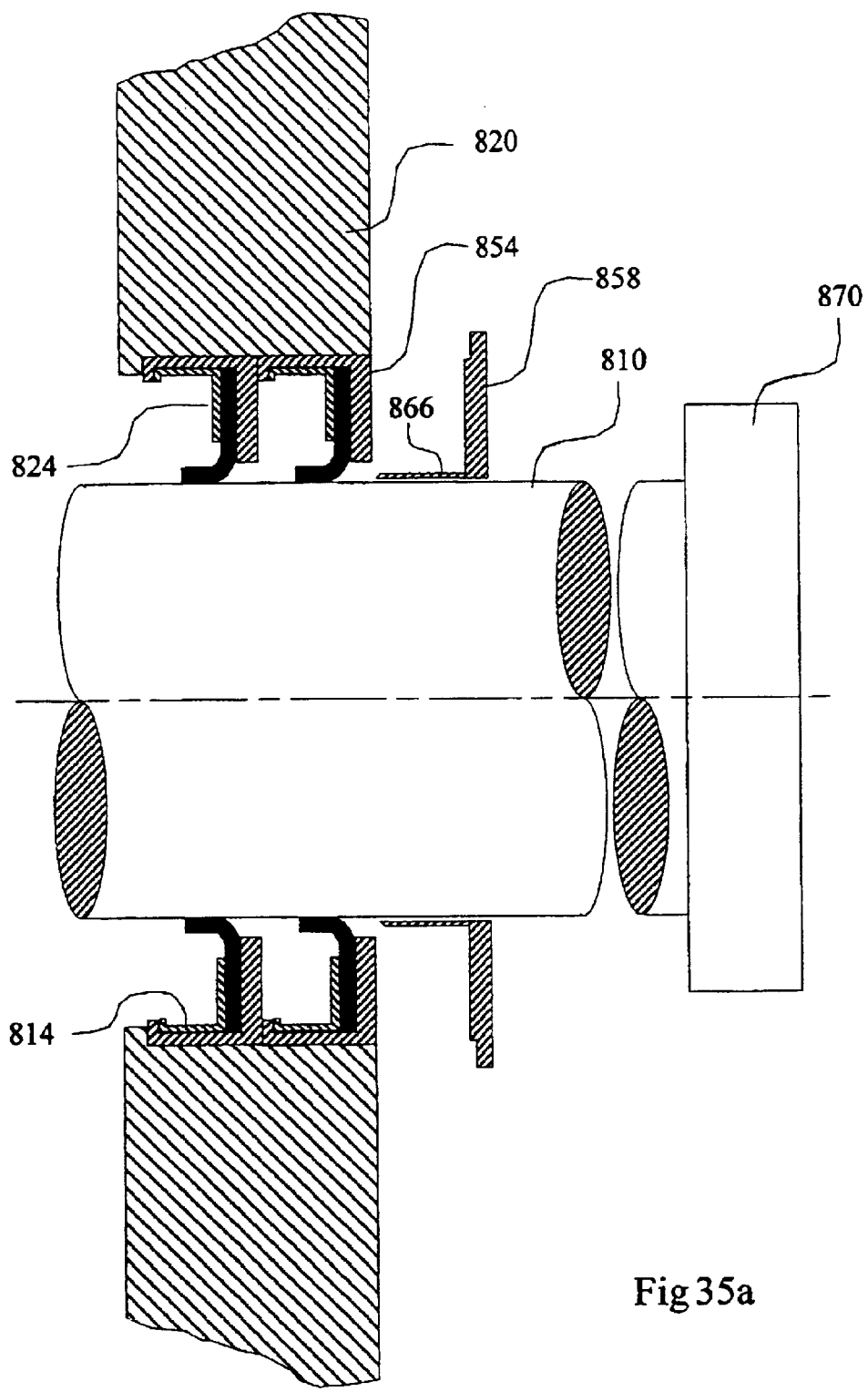

FIG. 35a illustrates the secondary lip seal assembly 854 in its sealingly engaged deployment, i.e., the interposition of central tube 866 has been eliminated and lip seal 828 has been translated from a preloaded to a loaded condition in sealing engagement with shaft 810. For example, if leakage through the primary lip seal assembly 824 is detected, the barrier sleeve 858 can be withdrawn, i.e., moved axially relative to shaft 810 and thereby separated from the lip seal 828 of the secondary lip seal assembly 854. The lip seal 828 thus deforms under resilient restoration force to contact the shaft 810 in sealing fashion.

As a further advantageous attribute associated with the configuration depicted in FIG. 35a, both seal assemblies 824, 854 are deployed, i.e., resiliently extended toward shaft 810. Notwithstanding the fact that primary lip seal assembly 824 is ineffective to establish a stand-alone seal with shaft 810, primary lip seal assembly is nonetheless still effective to some extent to inhibit leakage, and its effectiveness enhances the effectiveness of the deployed secondary seal assembly 854. For example, a pressure drop is created by primary seal assembly 824, thereby contributing to the leak resistance of secondary seal assembly 854. The extent of the pressure drop is dependent on several factors, including the effective flow clearance between primary lip seal assembly 824 and shaft 810.

The barrier sleeve 858, in the position depicted in FIG. 35a, can then be broken along the one or more fractures zones 872 to be removed from the shaft 810 and discarded. This fracture/removal capability is particularly important when a connected or adjacent apparatus 870 (shown schematically) would otherwise prevent the slipping of the barrier sleeve 858 over a free end of the shaft 810.

The use of the selectively deployable secondary seal assembly 854 with the barrier sleeve 858 advantageously simplifies seal replacement in that the apparatus 870 need not be disconnected from the shaft 810 to deploy the secondary lip seal 828. The barrier sleeve 858 is preferably relatively compact in axial dimension for use in a confined space.

The use of the secondary lip seal assembly 854 and barrier sleeve 858 is particularly effective when installed by the original equipment manufacturer as a means to increase the life of a seal system. For example, if a seal is expected to last 50,000 miles or other such number, the total life of the dual lip seals 824, 854 may advantageously extend the life of the seal system to 100,000 miles or more. Also, the secondary seal assembly 854 can be an effective retrofit component for adding to an existing primary seal assembly 824.

Figure 36:
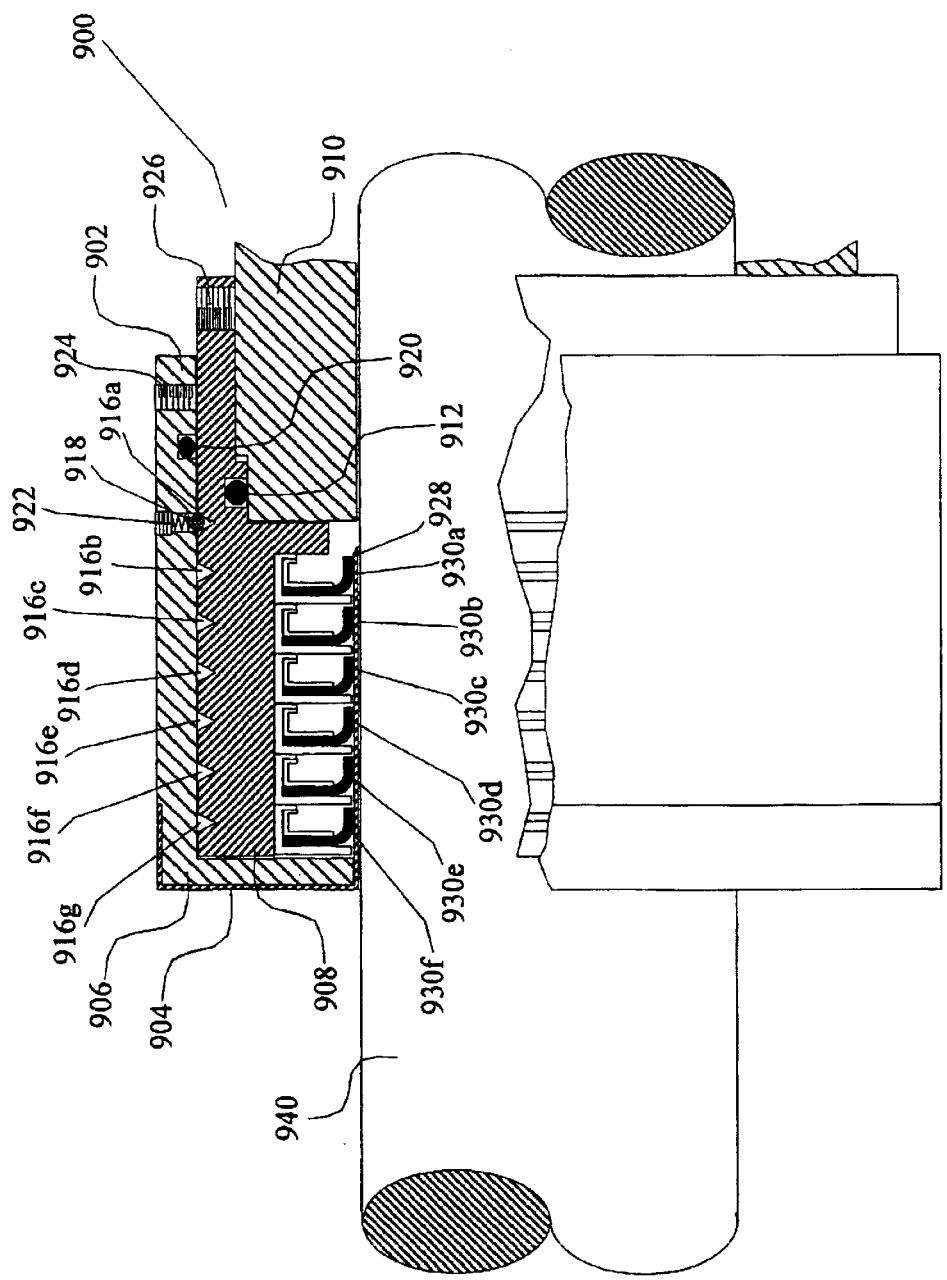
FIG. 36 is a diagrammatic sectional view of a further alternate sealing apparatus according to the present disclosure.

A further exemplary embodiment according to the present disclosure is schematically depicted in FIGS. 36–42. With reference to FIG. 36, seal apparatus 900 includes a barrier sleeve 902 that is made up of two principal parts, inner sleeve 904 and outer sleeve 906. Inner sleeve 904 may be fabricated by a deep drawing process to provide a relatively thin member, e.g., 0.010 inches in thickness. Inner sleeve 904 is generally joined or fitted to outer sleeve 902 by welding, shrink fitting or other conventional means. Inner sleeve 904 is advantageously fabricated from a strong and robust material, e.g., 316 stainless steel or the like, so as to ensure sufficient structural integrity to function as described herein, despite its relatively thin thickness.

Seal apparatus 900 includes a plurality of resilient seal members 930. Each seal member depicted in FIG. 36 is a lip seal and is initially positioned such that barrier sleeve 902 is interposed between such lip seal 930 and piston rod 940. Thus, each resilient lip seal 930 is initially in a preloaded condition, i.e., each lip seal 930 is positioned inside inner sleeve 904 in such a manner as to slightly stretch the resilient lip seals 930. This small radial preload allows the sealing elements to collapse onto the shaft of piston rod 940 once the lip seals 930 are in a service position outside of (i.e., independent of) the retaining inner sleeve 904. The clearance 928 between the inside diameter of inner sleeve 904 and the shaft of piston rod 940 is typically small, e.g., on the order of 0.008 inches.

Although the exemplary embodiment of FIGS. 36–42 depicts seal apparatus 900 in use with piston rod 940 that is adapted for rotational motion relative to a stationary housing, the disclosed seal apparatus 900 is not limited thereto. Rather, seal apparatus 900 may be applied to linear motion shafts as would be found in a piston pump, a compressor (where the shaft to be sealed may be a piston rod), a hydraulic ram, an air ram, an actuator, or the like.

As further shown in FIG. 36, a cartridge 908 is installed onto unit 910 and sealed by elastomer 912 (e.g., an O-ring) and retained in position by screw 914. Sleeve 902 is located and positioned by a detent mechanism that includes ball 918 and spring 922. An elastomeric member 920 (e.g., an O-ring) seals the detent mechanism, and screw 924 holds the detent mechanism in place. In the position shown in FIG. 36, spring 922 biases ball 918 into vee-shaped notch 916a. With ball 918 positioned within notch 916a, none of the lip seals 930 is in sealing position, i. ., each lip seal is in a preloaded condition and none is in sealing engagement with piston rod 940.

Figure 37:
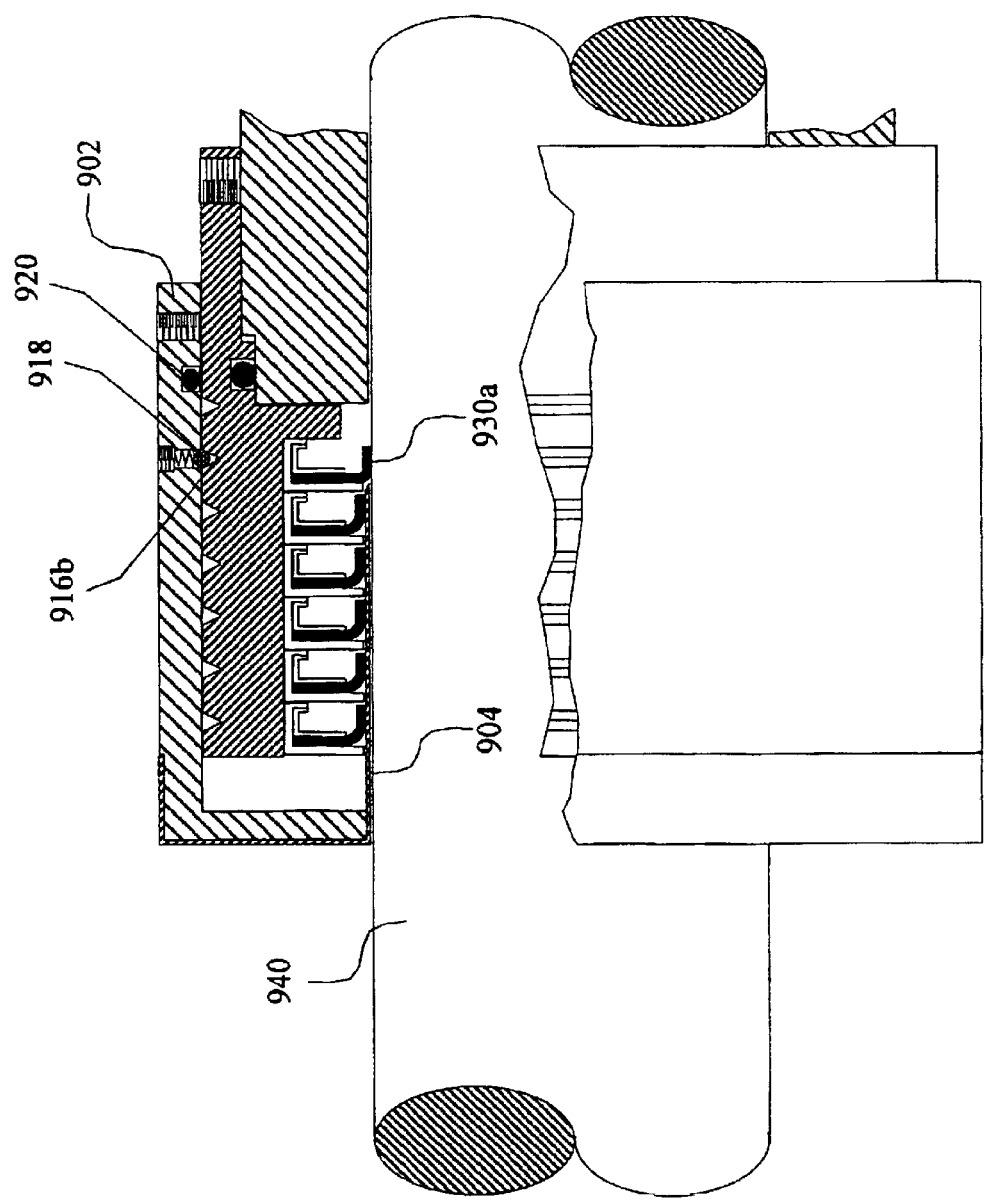
FIGS. 37–42 are further diagrammatic sectional views of the sealing apparatus of FIG. 36.

With reference to FIG. 37, barrier sleeve 902 has been moved axially relative to piston rod 940. Ball 918 is now positioned in notch 916b, having moved upward against the bias of spring 922 to facilitate axial movement of barrier sleeve 902, and th n downward under the bias of spring 922 into notch 916b. In the position depicted in FIG. 37, inner sleeve 904 of barrier sleeve 902 has released lip seal 930a, which has resiliently moved into sealing engagement with the shaft of piston rod 940. The positioning of ball 918 in notch 916b corresponds to release of lip seal 930a into sealing engagement with piston rod 940 (with the remaining lip seals 930 held out of sealing engagement by barrier sleeve 902).

Figure 38:
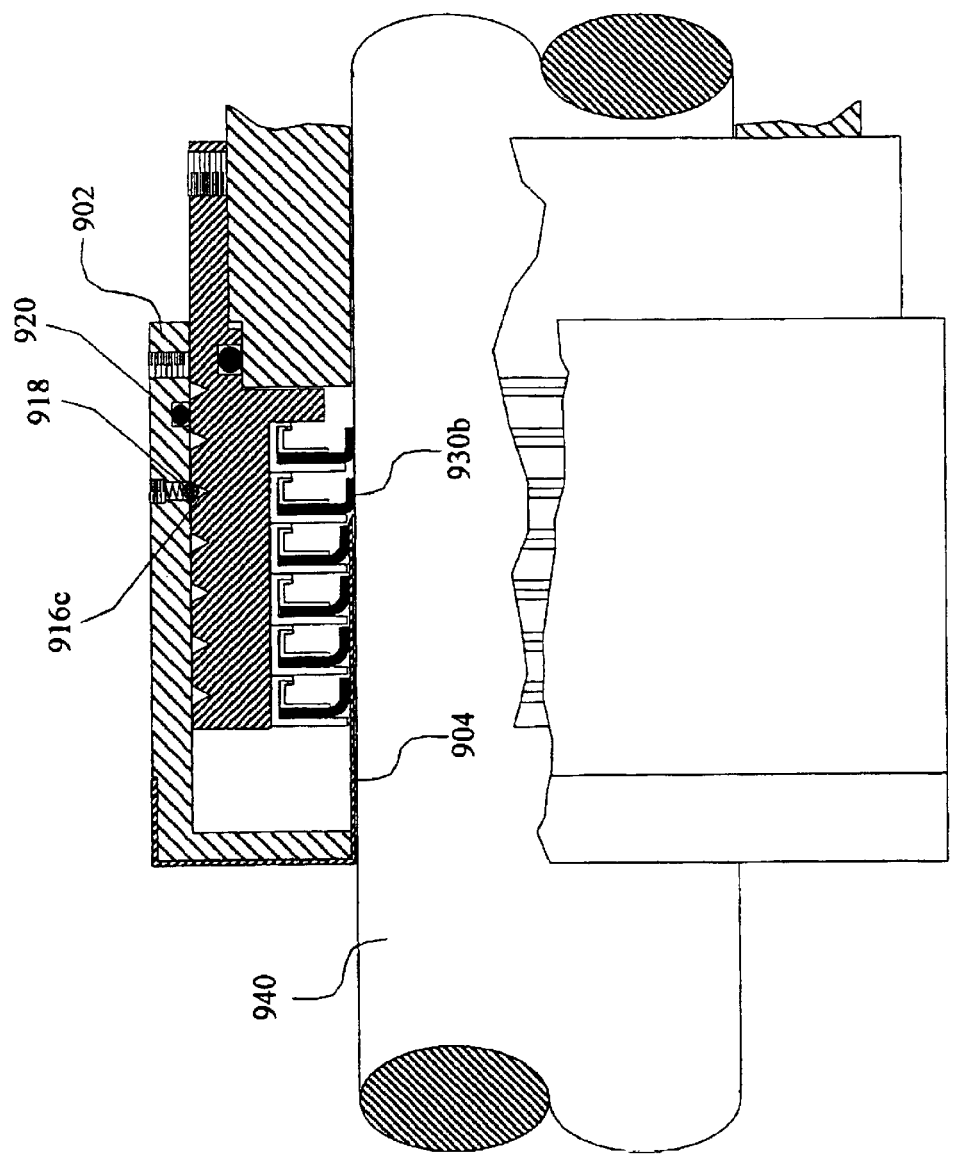
Figure 39:
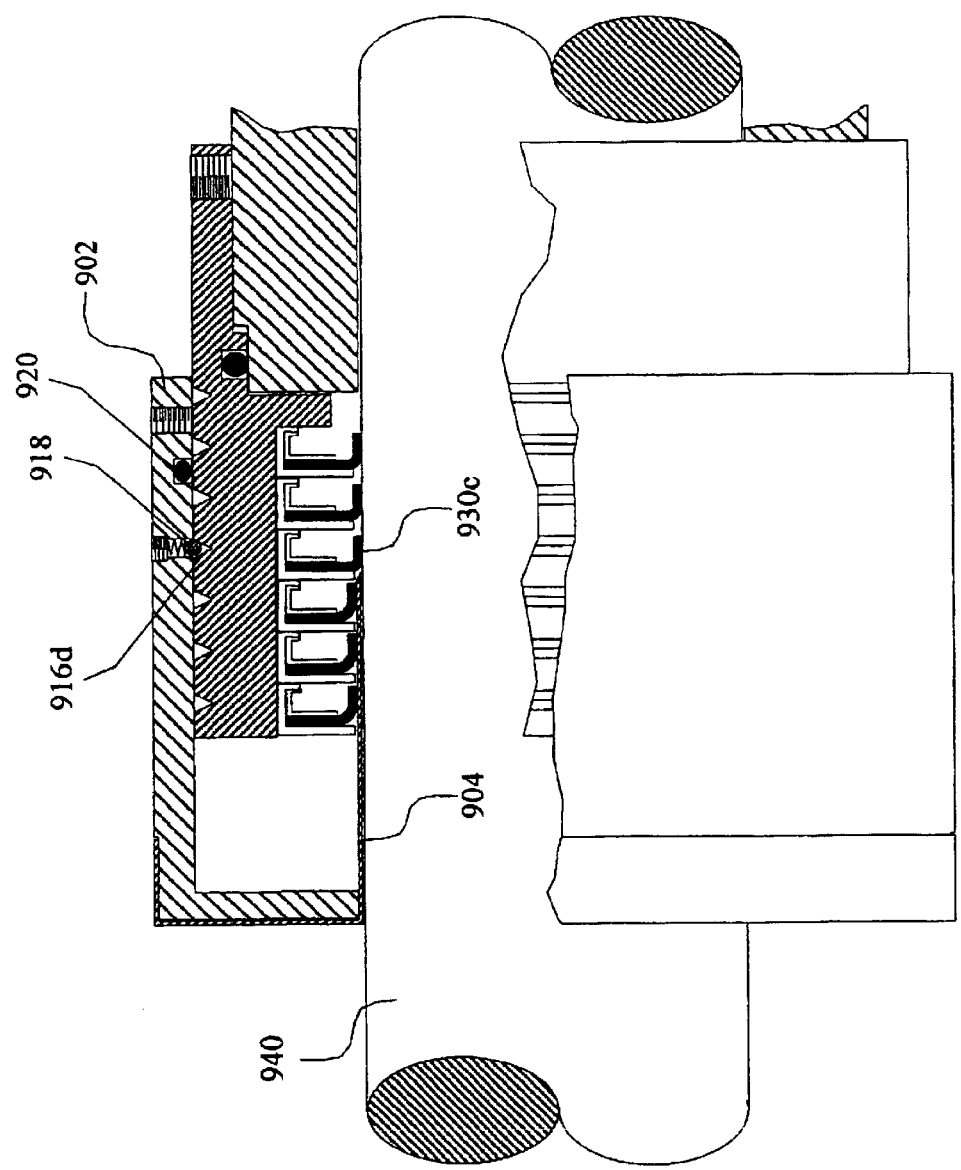
Figure 40:
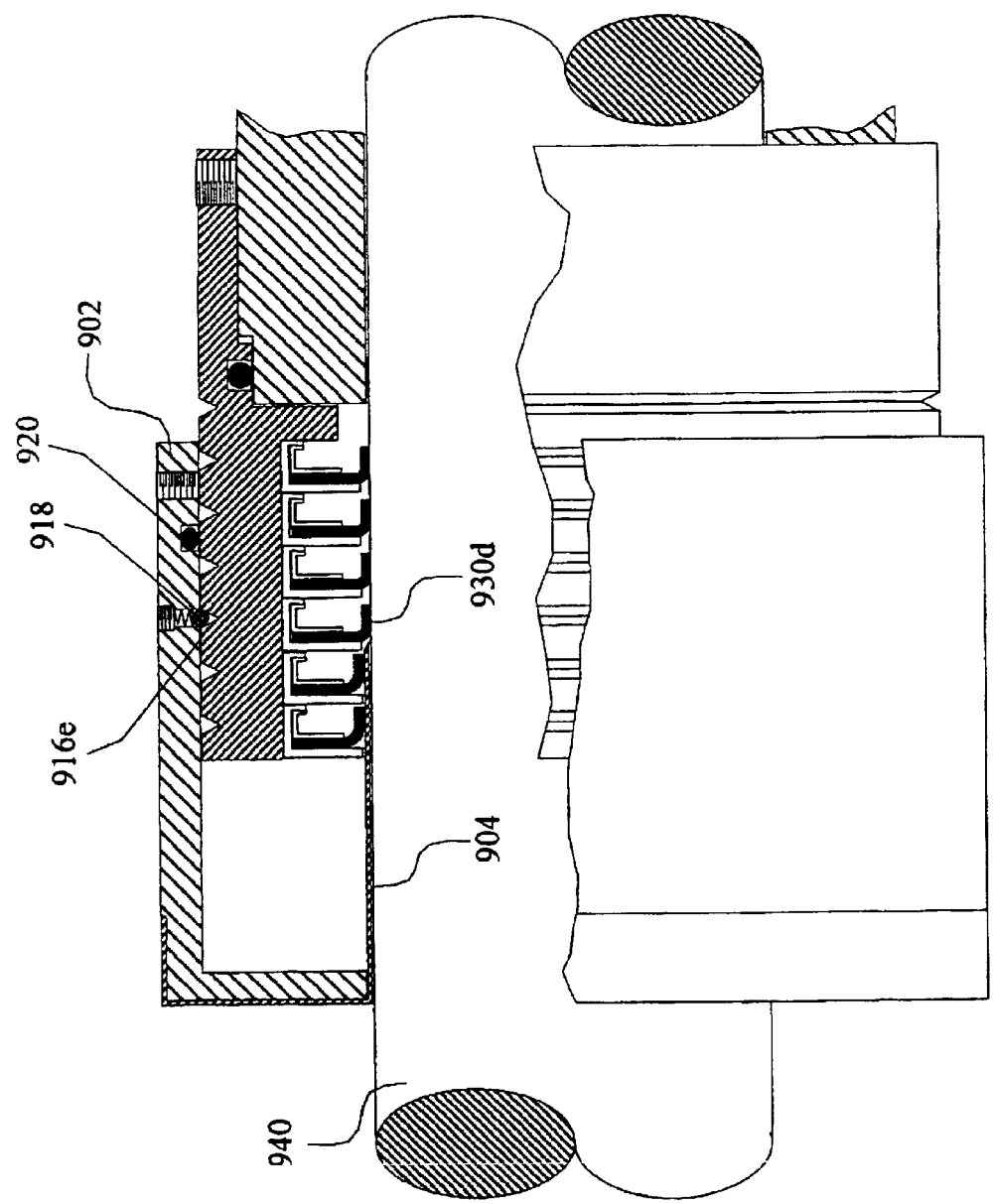
Figure 41:
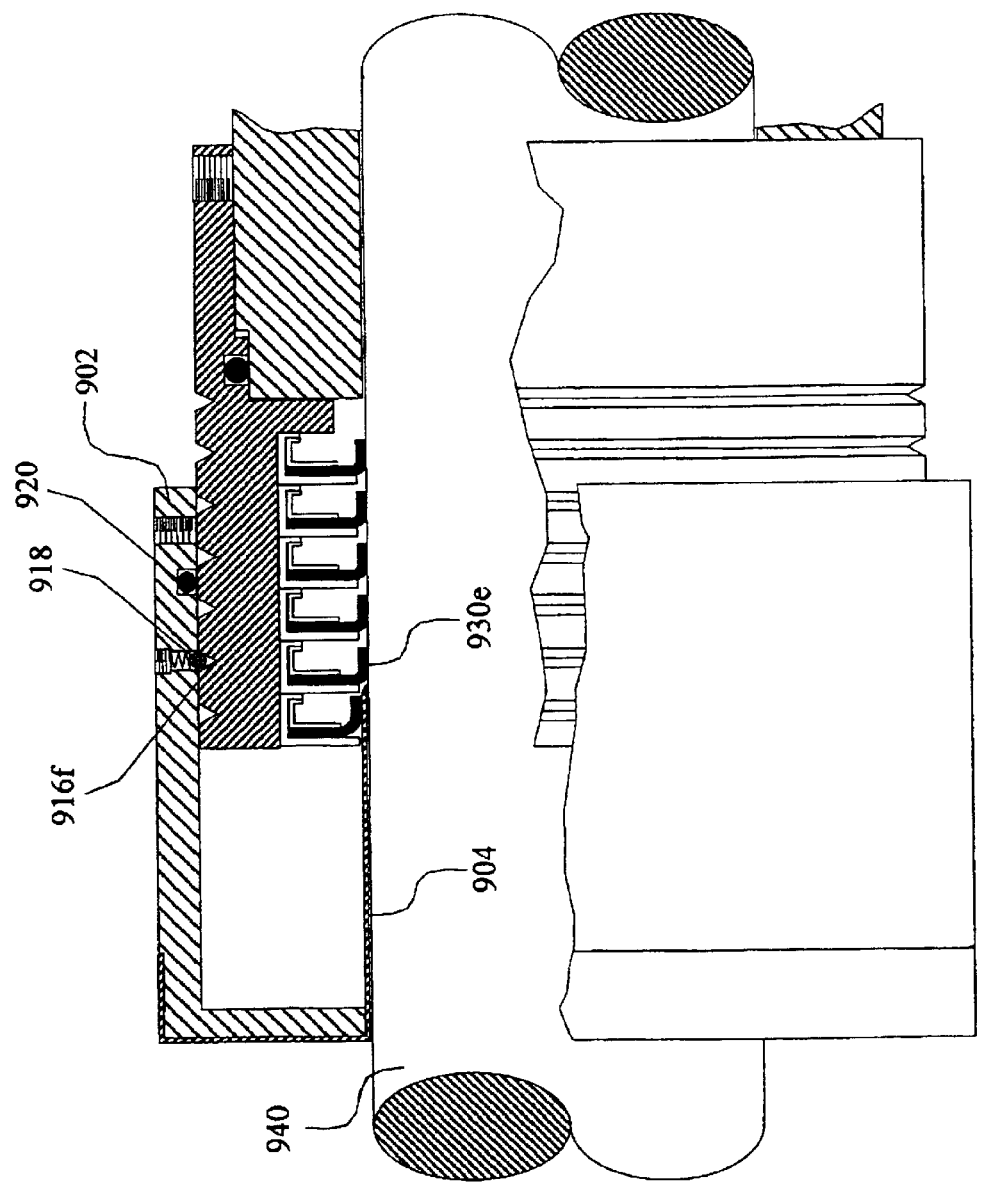
Figure 42:
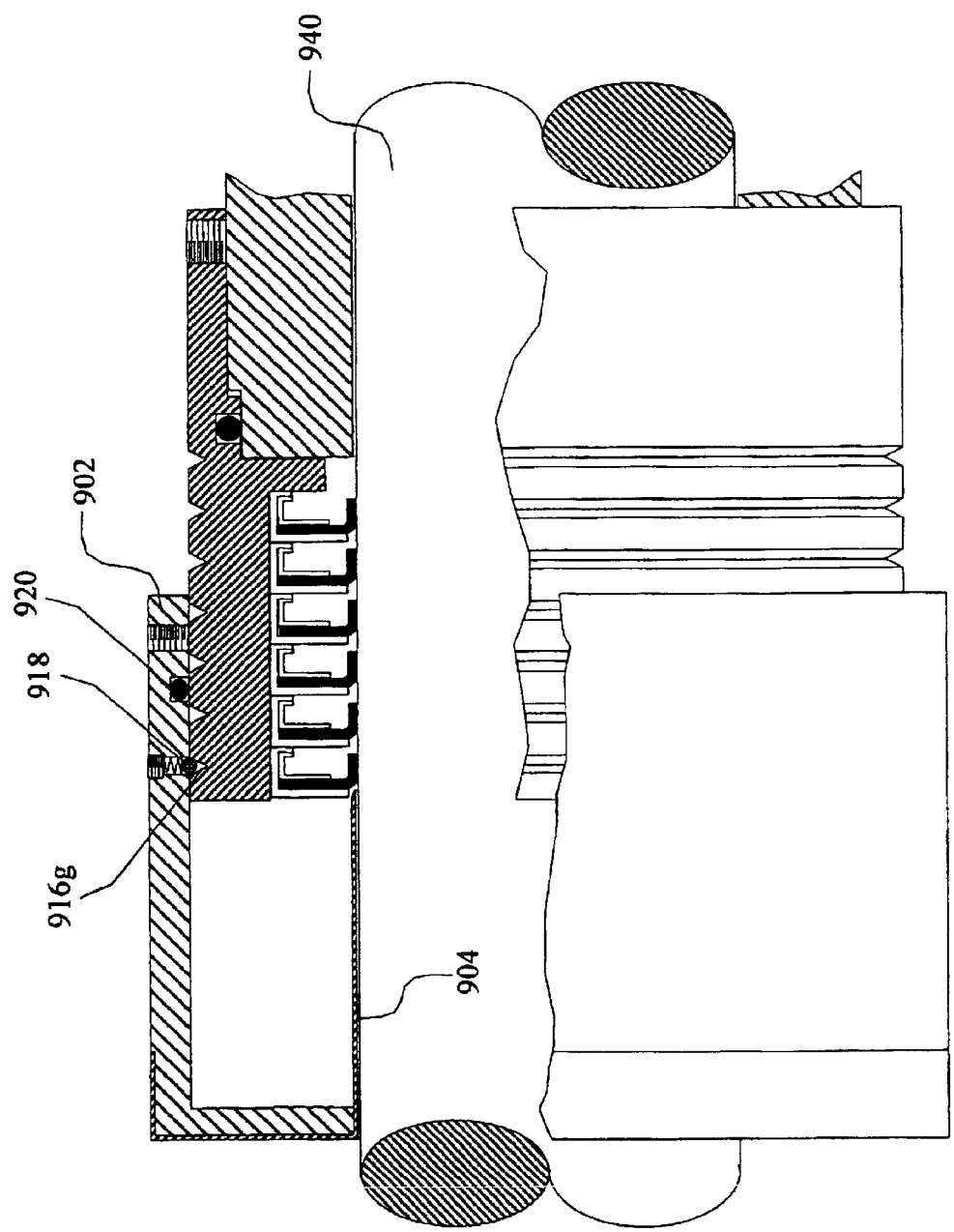

FIG. 38 depicts a further movement of barrier sleeve 902, e.g., when lip seal 930a fails and process fluids are now leaking past lip seal 930a. Barrier sleeve 902 is moved to a position such that lip seal 930b is released and resiliently engages piston rod 940. In such position, ball 918 is positioned in notch 916c and lip seal is released to seal the shaft of piston rod 940. Of note, the sealing elements 930 that are not in use and are being stored in retention, i.e., with barrier sleeve 902 interposed between such lip seals 930 and piston rod 940, cannot be contaminated either by way of the process leakage (as they seal themselves) or by way of the atmosphere, because elastomeric O-ring 920 is always in a sealing position.

FIGS. 38–42 show the sequential movement of barrier sleeve 902 as each sealing element, i.e., lip seal 930, fails. Of particular note, as each sealing element 930 fails, the next sequential sealing element 930 brought into sealing engagement with piston rod 940 will not encounter the same pressure or volume as the one before. This advantageous result is due to the fact that each sealing element that has failed will still serve to seal in a limited sealing capacity, causing a pressure drop from one failed seal to the next, and so on.

It should also be noted that screw 924 is positioned so as not to interfere with any of the notches 916 that have been cut around the diameter of cartridge 908, and elastomeric O-ring 920 seals at all times when the barrier sleeve 902 is located in a desired position. The sealing of O-ring 920 is achieved through appropriate dimensioning such that O-ring 920 engages a non-notched surface on cartridge 908 when ball 918 falls within a notch 916. Barrier sleeve 902 moves squarely in relation to the outside diameter of cartridge 908, which itself is square to the center line of the shaft of piston rod 940. Based on these structural relationships, the clearance between the inside diameter of inner sleeve 904 and the shaft of piston rod 940 is very small and contact between the two members should never take place, regardless of the barrier sleeve 902 position. Of note, barrier sleeve 902 may be moved relative to piston rod 940 at any time, even when piston rod 940 is in service and being sealed by sealing apparatus 900.

Figure 43:
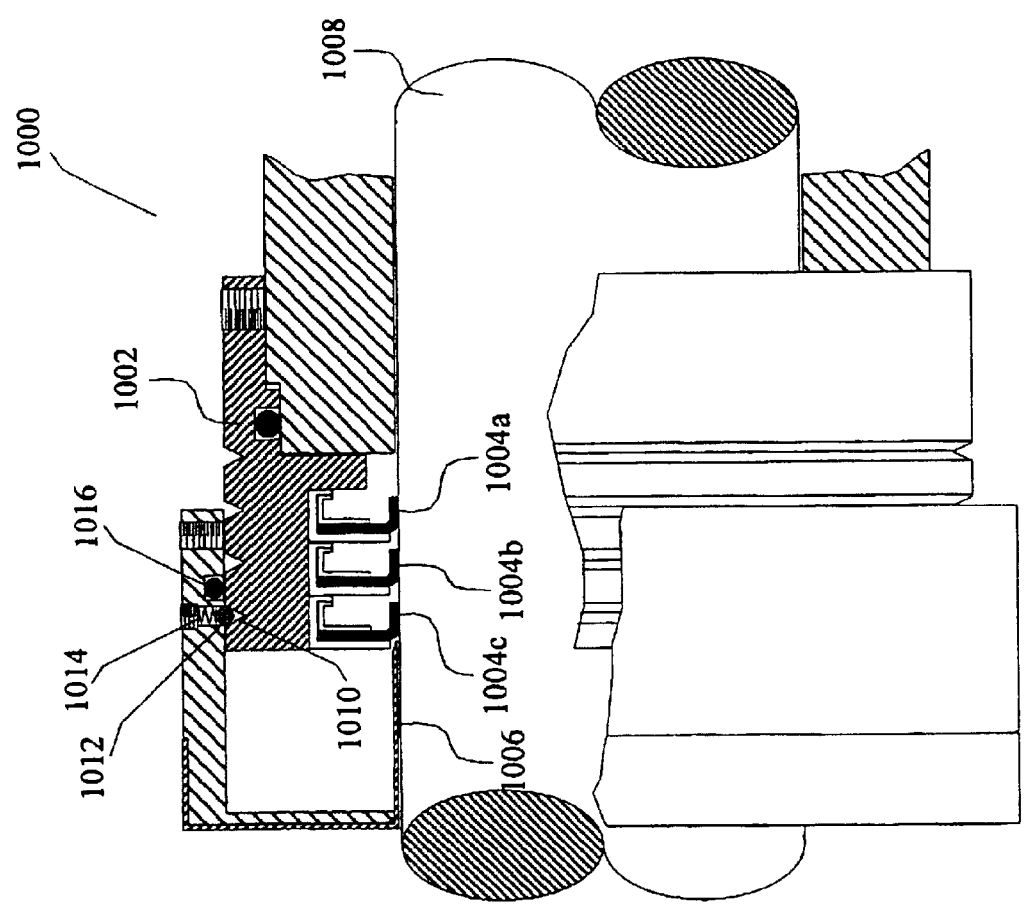
FIG. 43 is a diagrammatic sectional view of a further alternate sealing apparatus according to the present disclosure.

FIG. 43 depicts a further alternate embodiment according to the present disclosure in which sealing apparatus 1000 includes a cartridge 1002 in which are installed three sealing elements 1004, i.e., lip seals 1004a, 1004b, 1004c. As depicted in FIG. 43, barrier sleeve 1006 has moved to a point at which all three lip seals 1004 are in sealing engagement with shaft 1008. A detent mechanism is defined by cartridge 1002 and barrier sleeve 1006 such that ball 1010 is biased within notch 1012 by spring 1014. An O-ring 1016 seals cartridge 1002 relative to barrier sleeve 1006. Of note, barrier sleeve 1006 may be moved relative to shaft 1008 at any time, even when shaft 1008 is in service and being sealed by sealing apparatus 1000.

Figure 44:
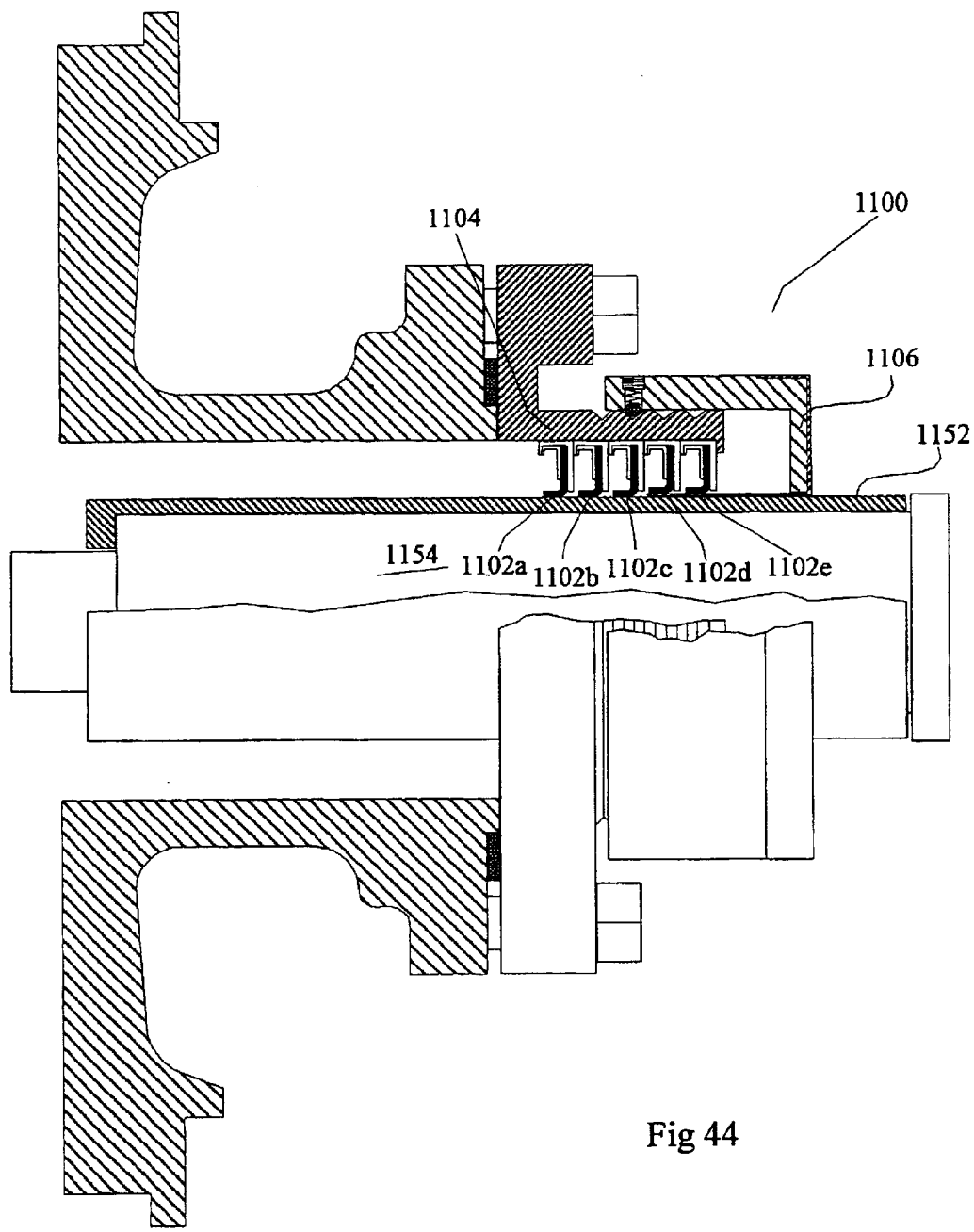
FIG. 44 is a diagrammatic sectional view of a further alternate sealing apparatus according to the present disclosure.

FIG. 44 shows a further alternate embodiment of the present disclosure in which sealing assembly 1100 is installed on a pump 1150. Five sealing elements 1102 are mounted in a cartridge 1104 for sealing a sleeve 1152 mounted to the pump shaft 1154. As shown in FIG. 44, three sealing elements 1102a, 1102b, 1102c have been released by barrier sleeve 1106 to sealingly engage sleeve 1152. Barrier sleeve 1106 remains interposed between the remaining sealing elements 1102d, 1102e and sleeve 1152 of pump 1150. A detent mechanism structurally similar to the detent mechanisms described with reference to previous embodiments is formed between cartridge 1104 and barrier sleeve 1106.

Figure 45:
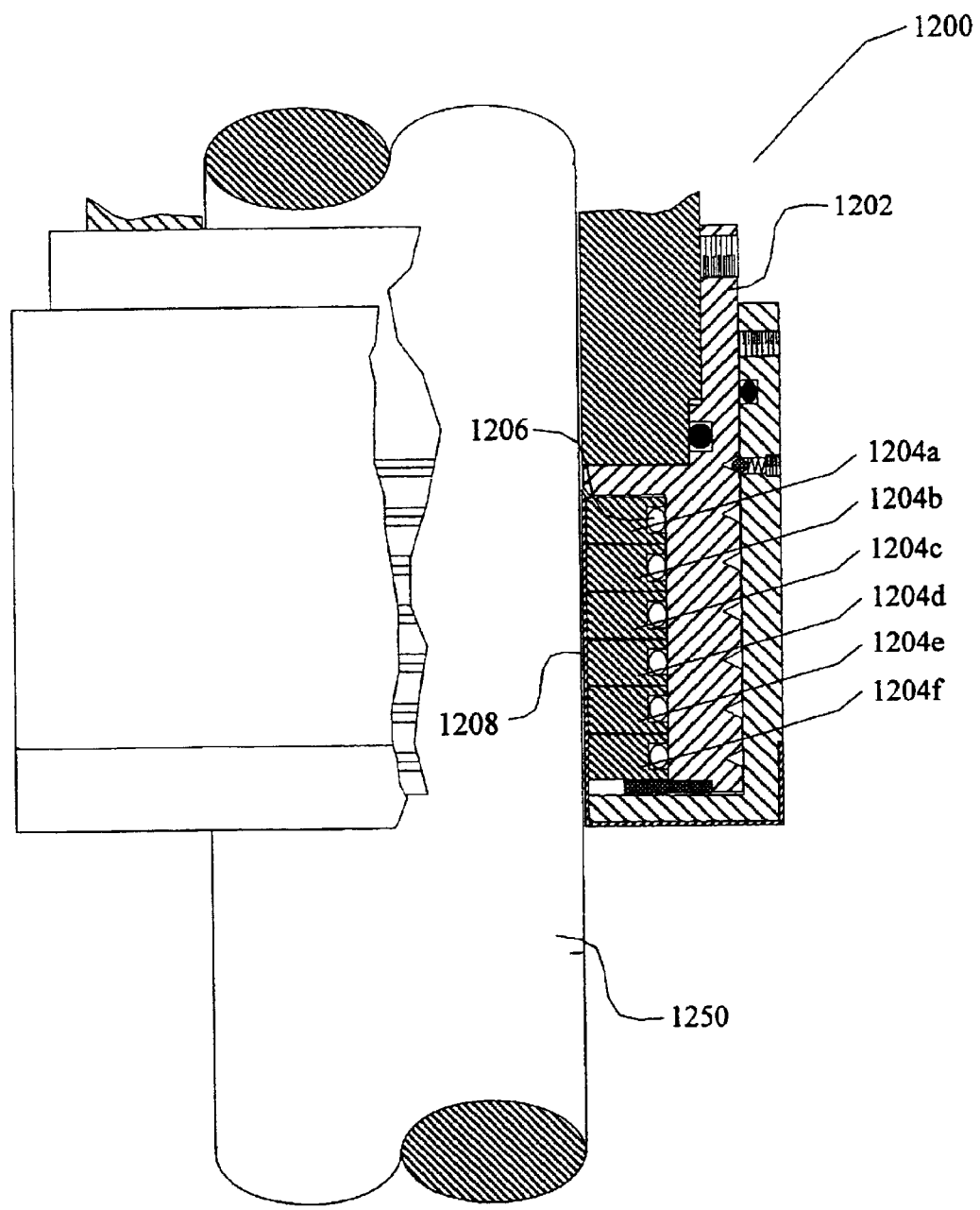
FIG. 45 is a diagrammatic sectional view of a further alternate sealing apparatus according to the present disclosure.

FIG. 45 depicts a further embodiment according to the present disclosure, in which seal assembly 1200 includes a cartridge 1202 that is in use in a gaseous system, i.e., the processed fluid to be sealed is gaseous. The sealing elements are segmented gas packing rings 1204. Rings 1204 are generally formed in three segments and are held together by way of spring garters 1206. Spring garters 1206 also function to hold gas packing rings 1204 tightly against piston rod 1250 of a compressor shaft or a like shaft to be sealed. Packing rings 1204 are generally fabricated from a material such as cast iron, carbon or a combination of carbon and Teflon. The packing rings are typically positioned one on top of the other (or side by side), and the pressure of the gas to be sealed generally determines the number of packing rings to be placed in usage.

Figure 46:
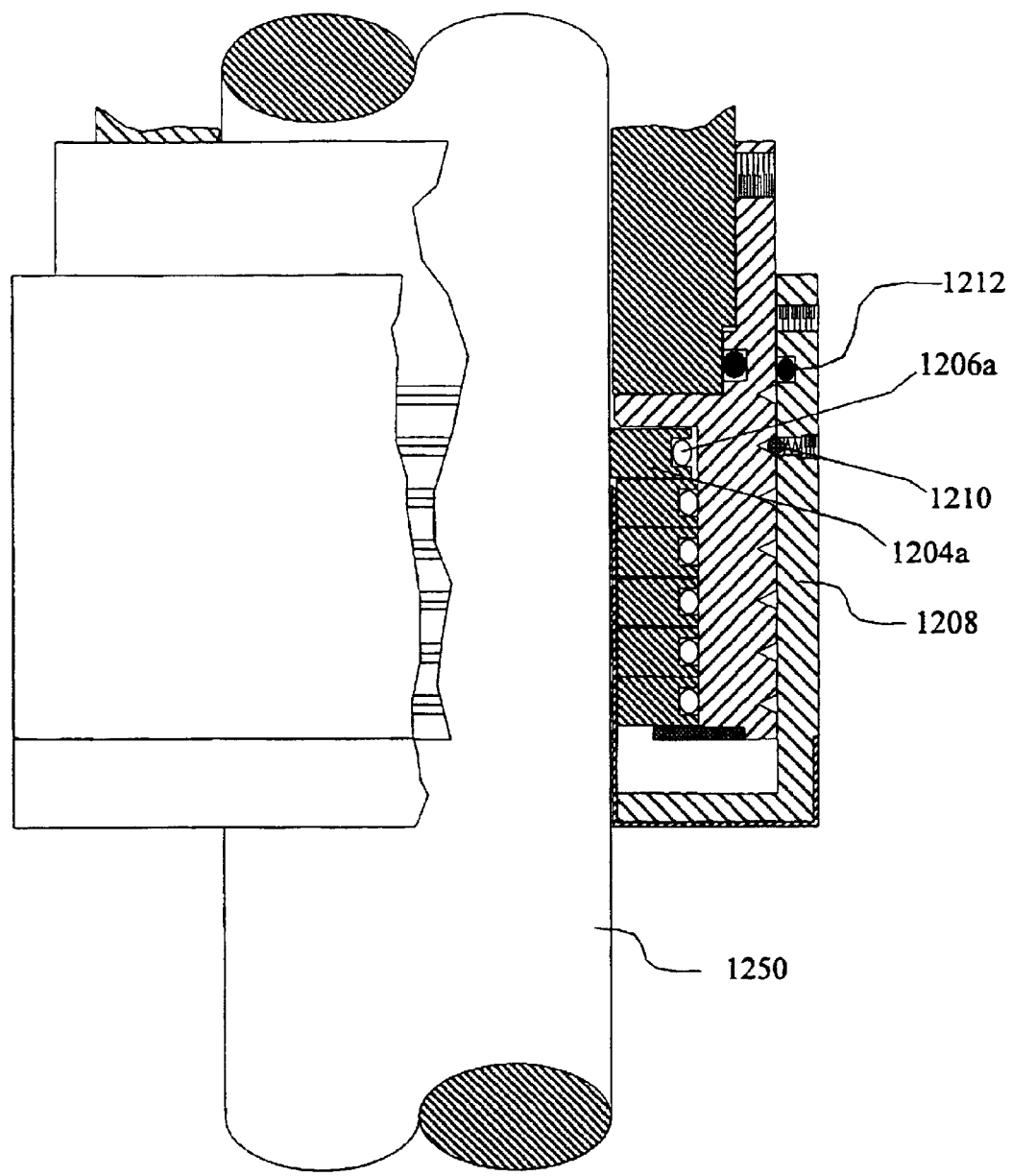
FIGS. 46–51 are further diagrammatic sectional views of the sealing apparatus of FIG. 45.
Figure 47:
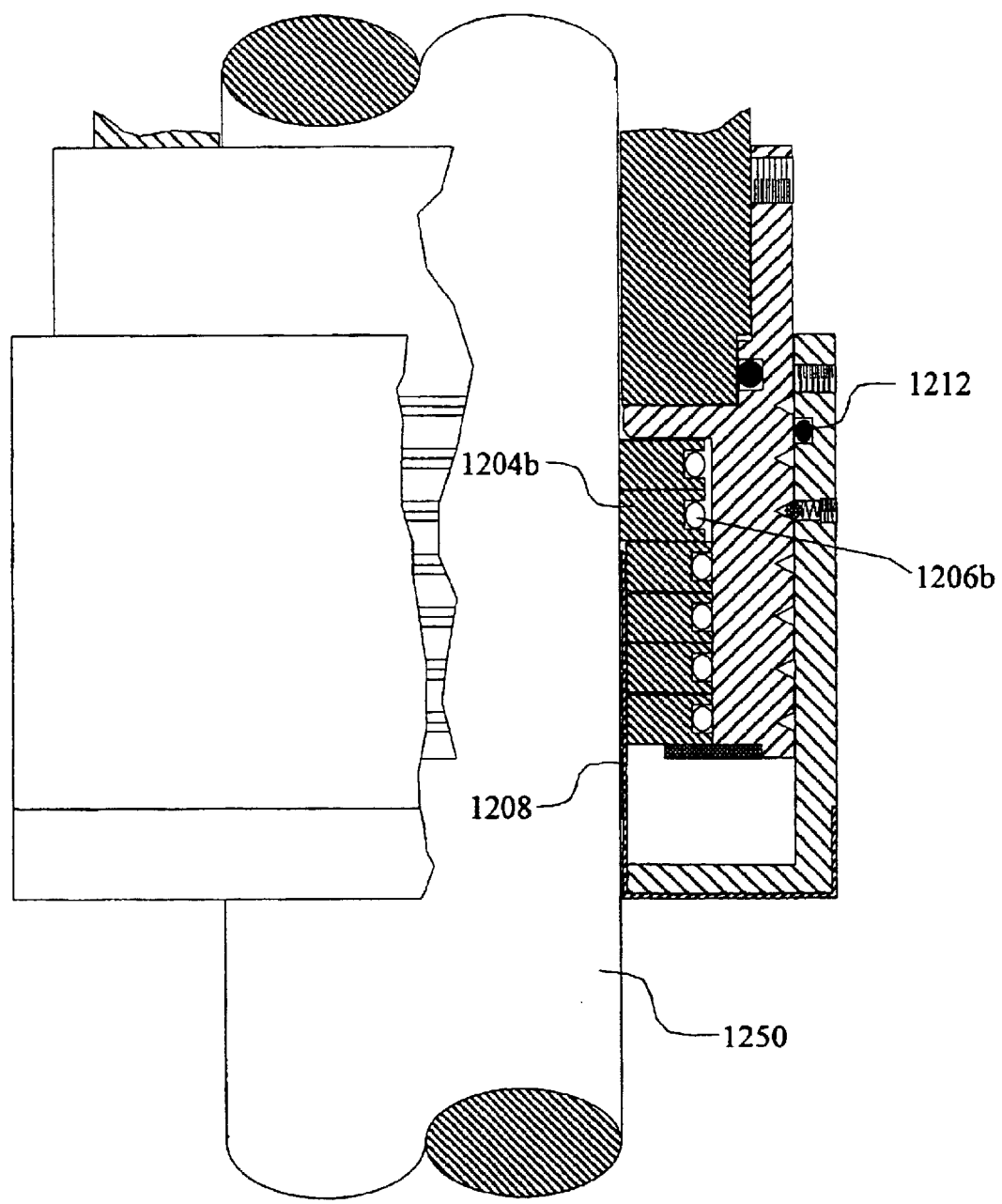
Figure 48:
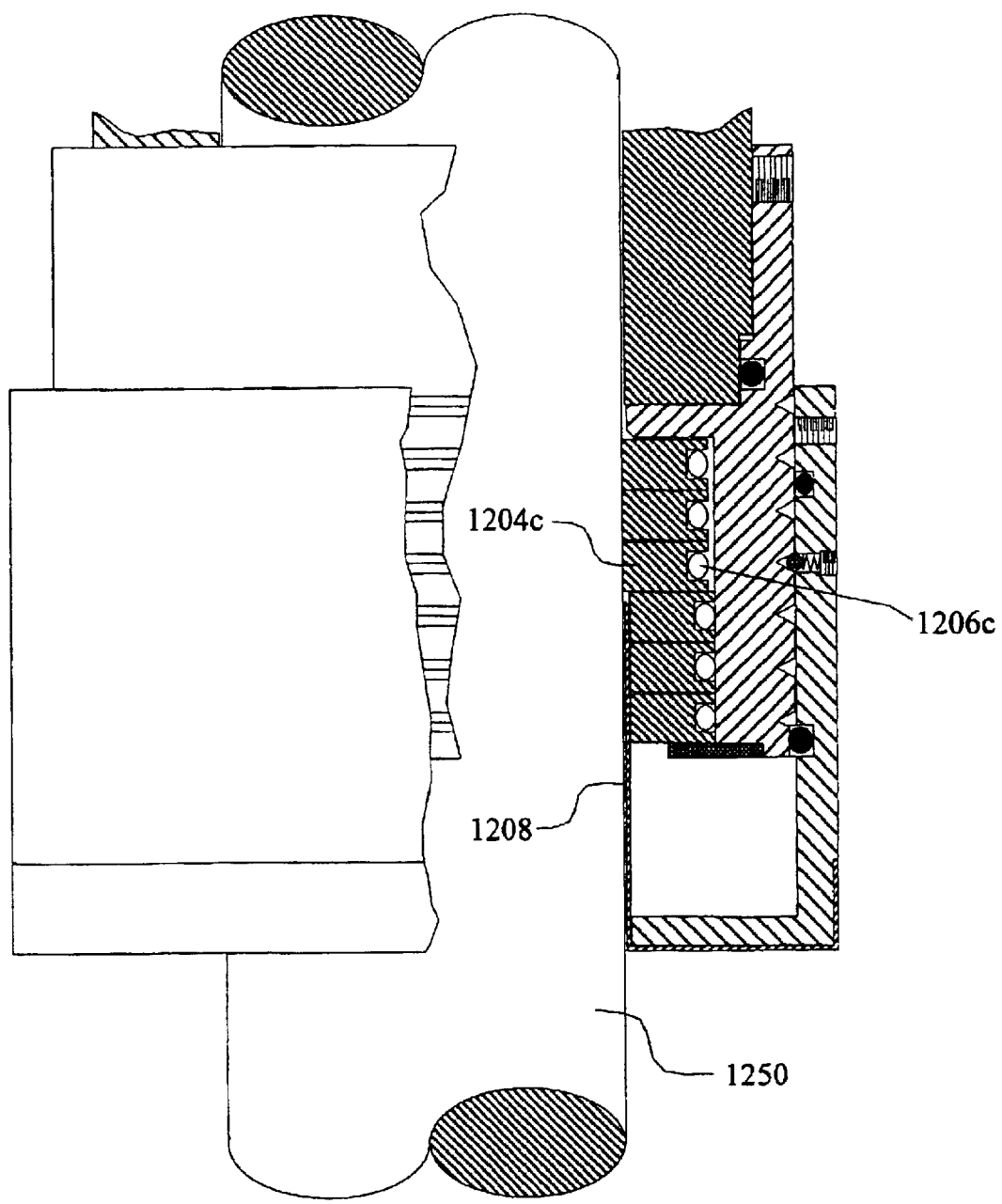
Figure 49:
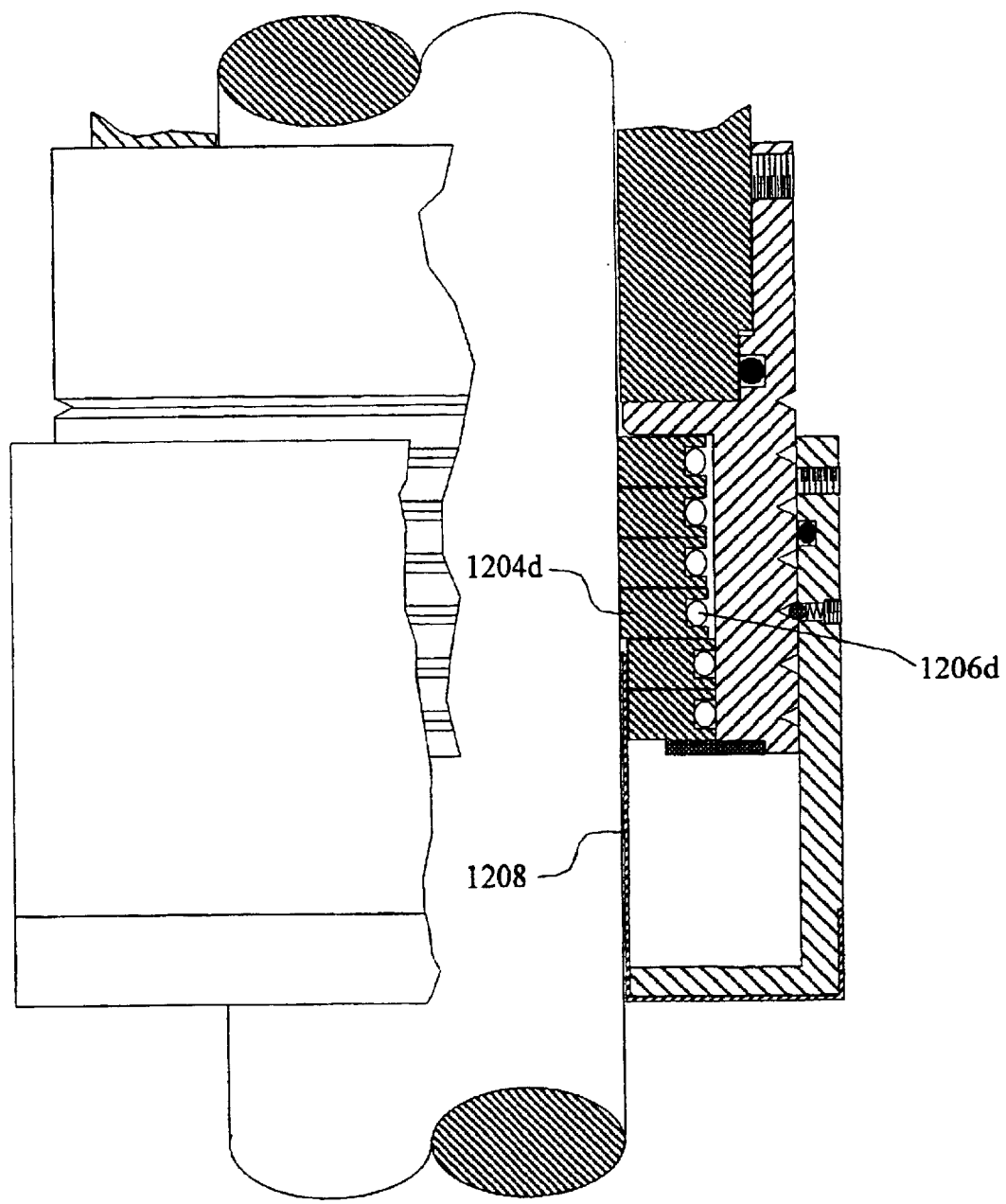
Figure 50:
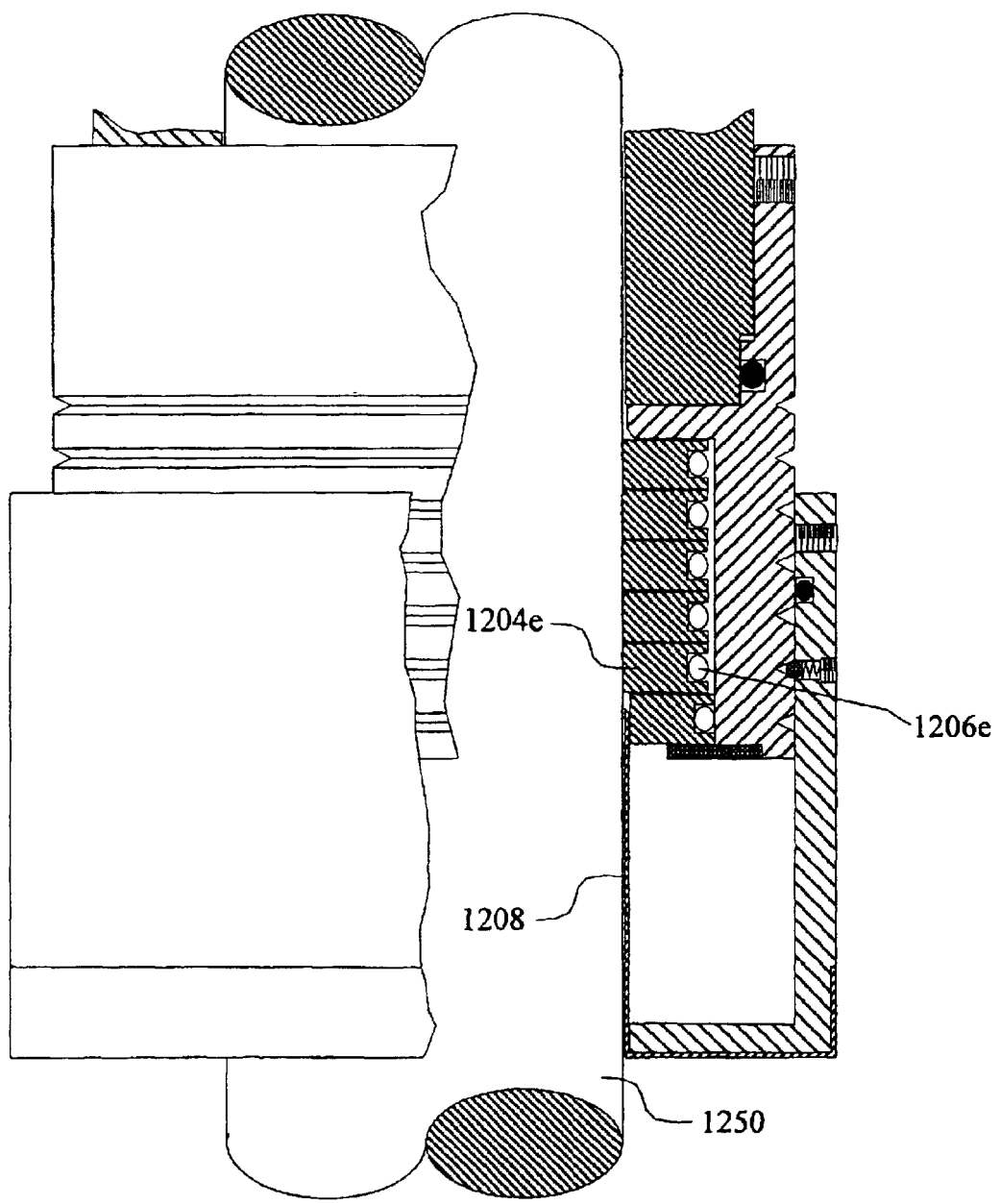

As depicted in FIG. 45, all of the packing rings 1204 are being retained and stored inside inner barrier sleeve 1208. Thus, the packing rings 1204 are in a preloaded condition, biased toward piston rod 1250 by garter springs 1206. With reference to FIG. 46, barrier sleeve 1208 has been moved relative to piston rod 1250, thereby allowing packing ring 1204a to sealingly engage piston rod 1250 under the bias of garter spring 1206a. Detent mechanism 1212 temporarily secures barrier sleeve 1208 in the desired position relative to piston rod 1250, i.e., with packing ring 1204a sealingly engaging piston rod 1250 and the remaining packing rings prevented from interaction with piston rod 1250 due to the interposition of barrier sleeve 1208.

Thus, the remaining packing rings 1204b, 1204c, 1204d, 1204e, 1204f are retained inside inner barrier sleeve 1208 in a slightly stretched, i.e., preloaded condition. Once released from inner barrier sleeve 1208, the associated garter spring 1208 loads or biases the packing ring onto and around the shaft of piston rod 1250, in a service position outside of the barrier sleeve 1208. Sealing O-ring 1210 provides a sealing function comparable to O-rings described with reference to previous embodiments herein.

Figure 51:
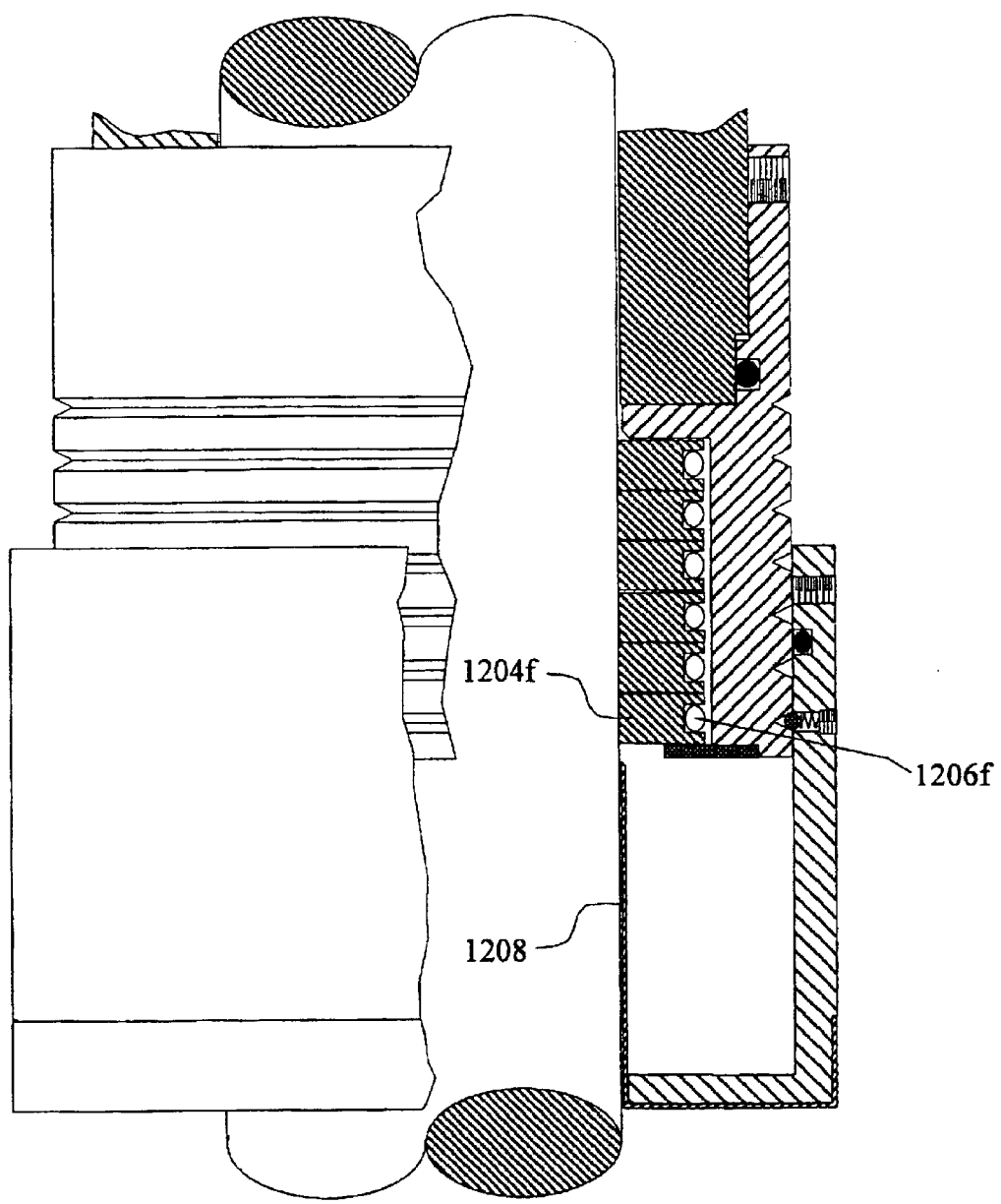

FIGS. 47–51 depict the movement of barrier sleeve 1208, in sequence, as each successive sealing element, i.e., packing ring 1204, begins to leak and the next packing ring is brought on line. In FIG. 51, all sealing elements are now in contact with the shaft of piston rod 1250. Of note, barrier sleeve 1208 may be moved relative to the shaft of piston rod 1250 at any time, even when piston rod 1250 is in service and being sealed by sealing apparatus 1200.

Figure 53B:
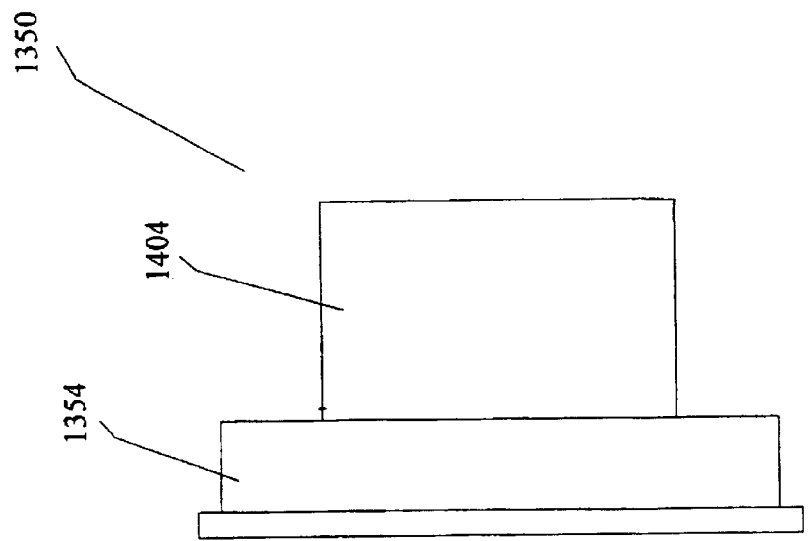
Figure 53A:
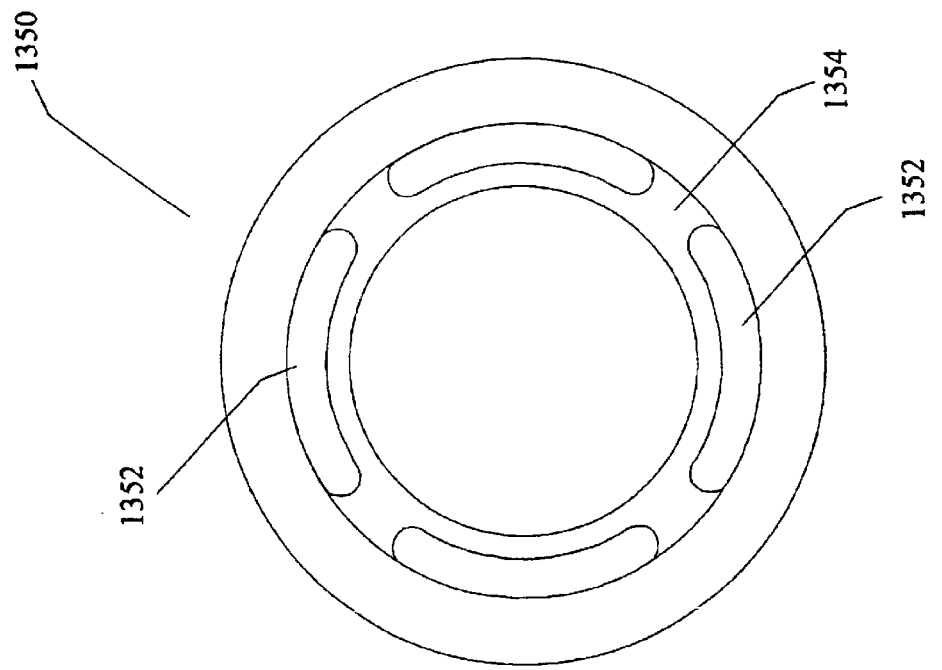

With reference to FIGS. 52–53, preferred aspects of a further exemplary embodiment according to the present disclosure are depicted. Initially, with reference to FIGS. 52a and 52b, front and side views of a gland 1300 are provided, in which four finger portions 1302 from a flange 1304. With further reference to FIGS. 53a and 53b, front and side views of a preferred sleeve 1350 are provided. Sleeve 1350 includes four spaced apertures 1352 formed in sleeve body 1354. Thus, finger portions 1302 are configured to provide a sliding bearing relationship with sleeve 1350 by passing through spaced apertures 1352, in a male-female relationship. Thus, sleeve 1350 is allowed to slide over finger portions 1302 of gland 1300 in a male-female relationship, with barrier sleeve 1404 extending therefrom.

Figure 54:
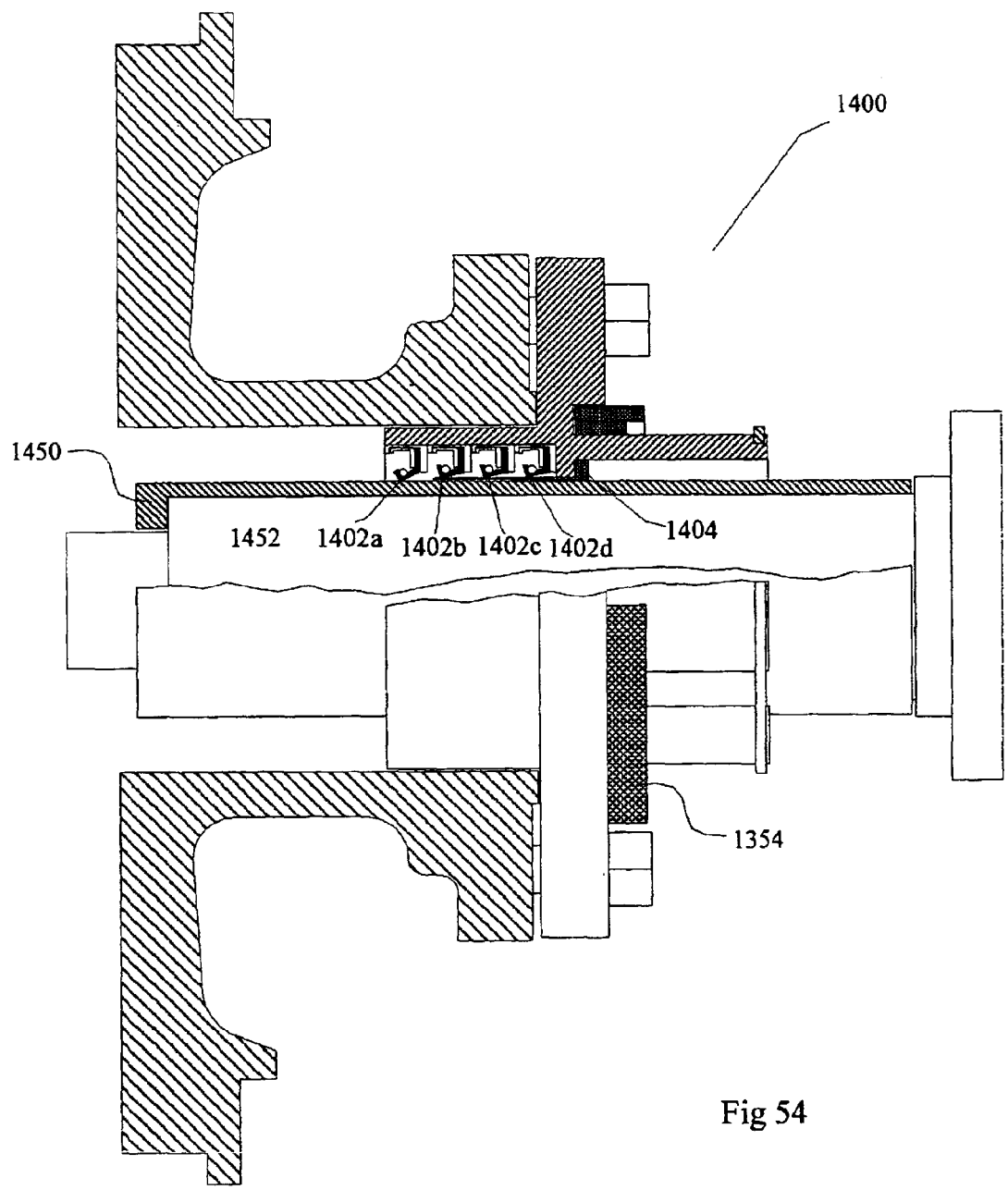
FIGS. 54–58 are diagrammatic sectional views of a sealing apparatus incorporating the aspects depicted in FIGS. 52–53.

Turning to FIG. 54, an exemplary lip seal cartridge 1400 according to the present disclosure is depicted. Lip seal cartridge 1400 is installed in a stuffing box of a pump, as is known in the art. Lip seal 1402a is in sealing engagement with sleeve 1450 secured to shaft 1452. The remaining lip seals 1402b, 1402c, 1402d are retained inside inner barrier sleeve 1404, i.e., barrier sleeve 1404 is interposed between the remaining lip seals so as to maintain them in a preloaded condition spaced from sleeve 1450.

Figure 55:
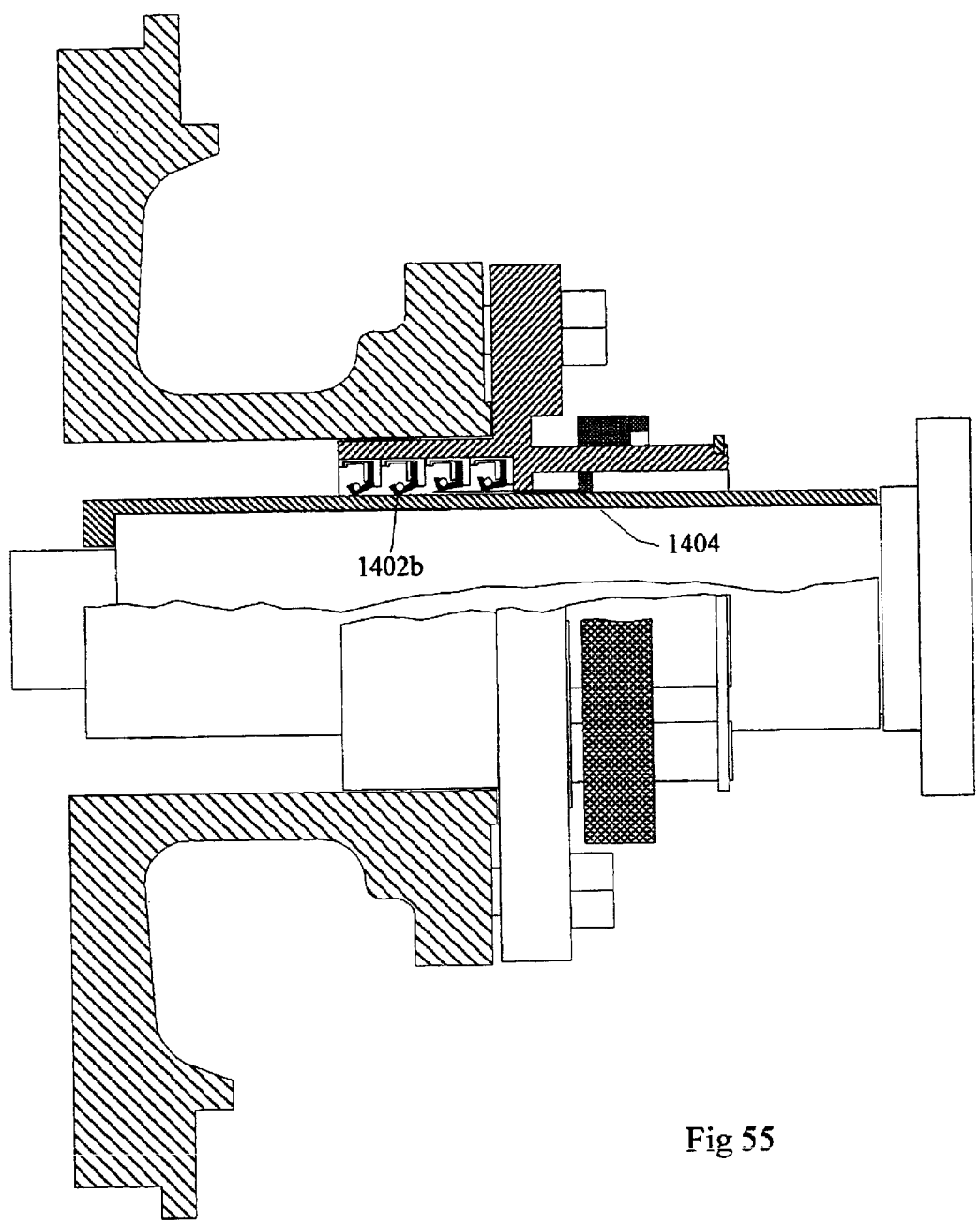
Figure 56:
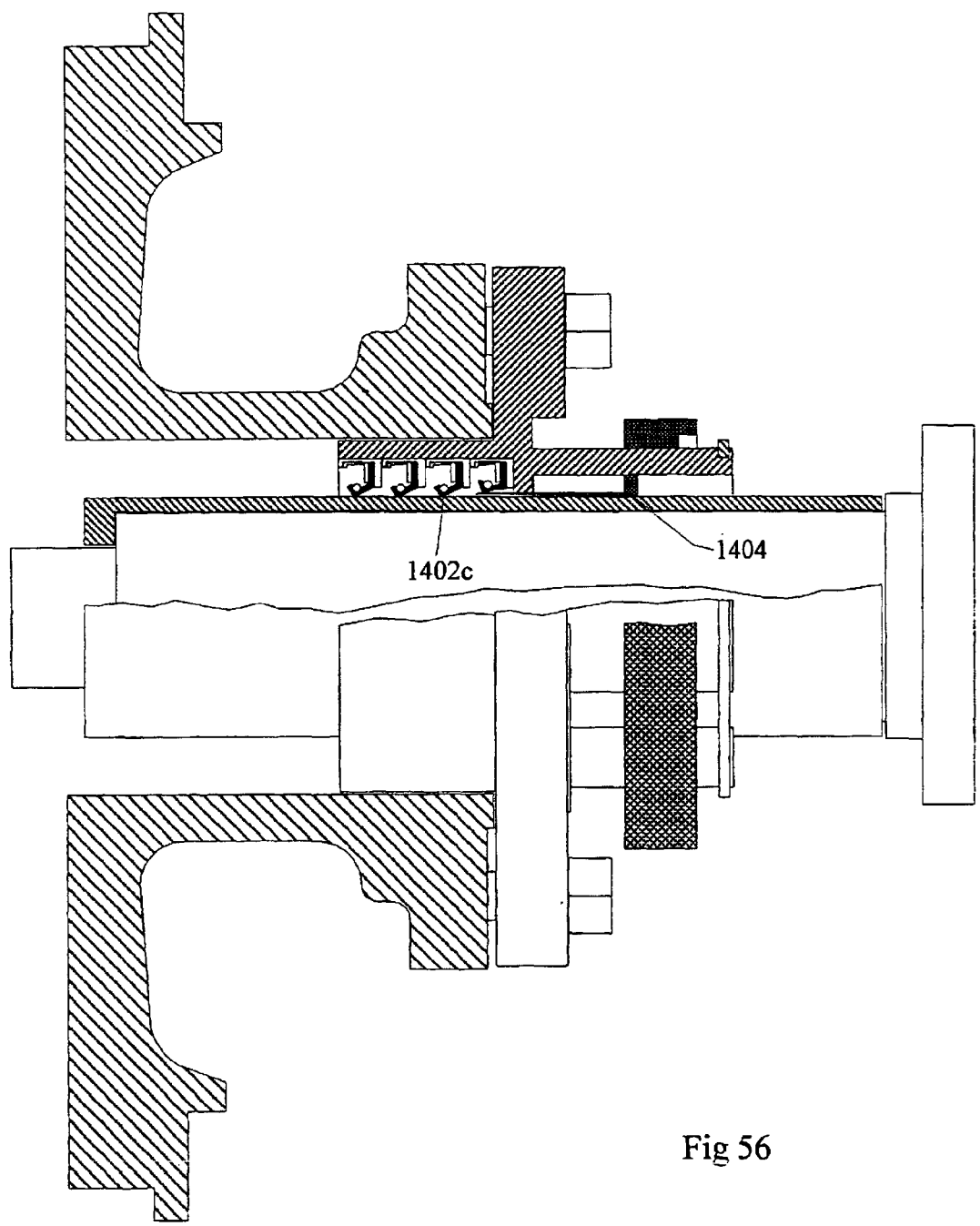
Figure 57:
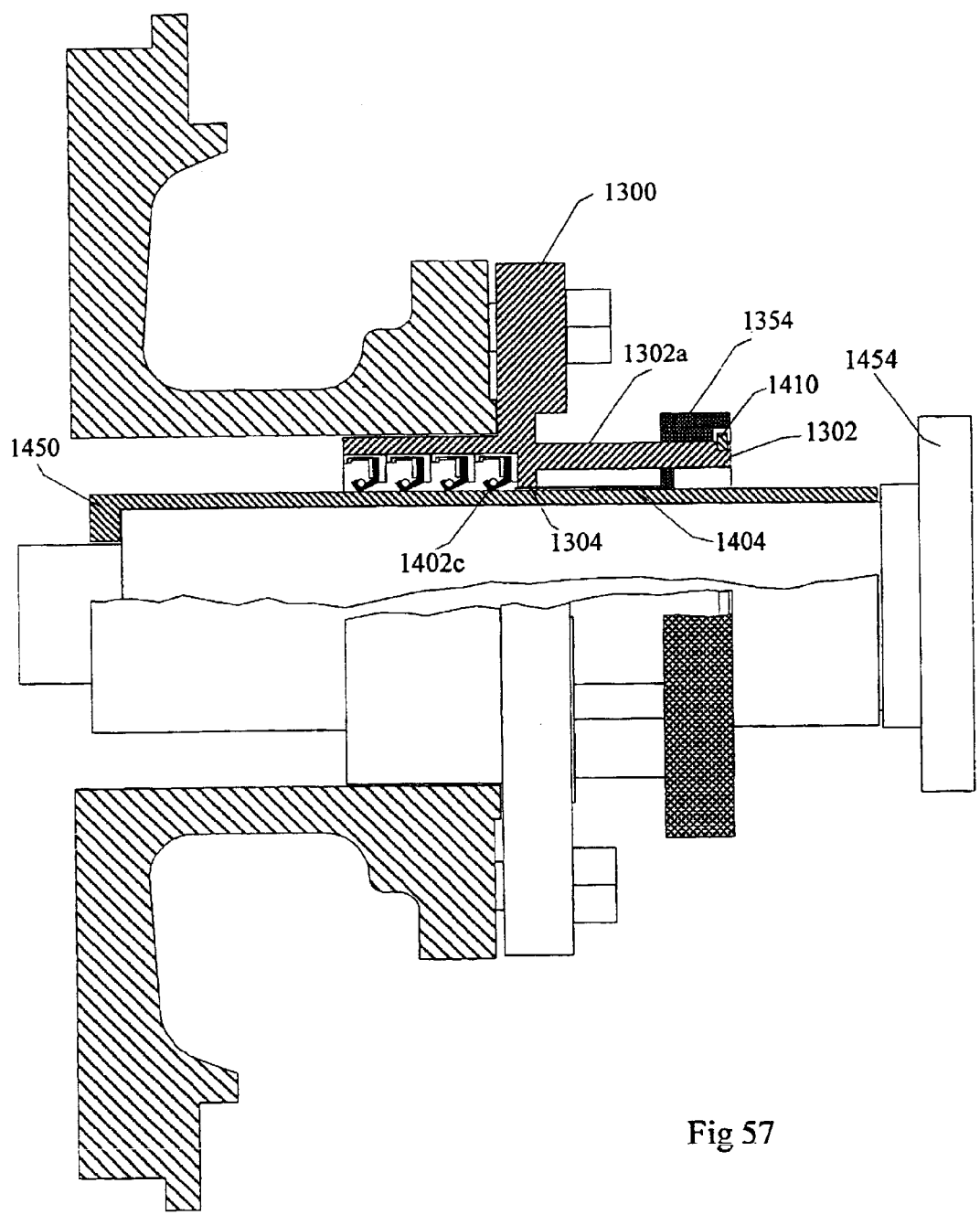

With reference to FIGS. 55–57, barrier sleeve 1404 has moved successively such that lip seals 1402b, 1402c, 1402d are sequentially released from their preloaded conditions so as to sealingly engage sleeve 1450. Each successive lip seal 1402 is released by barrier sleeve 1404 as the preceding lip seal fails, until th last lip seal 1402d is deployed (FIG. 57). The design of lip seal cartridge 1400 is particularly advantageous in applications where there is limited space for axial movement of barrier sleeve 1404 based on the space conservation achieved through the nesting male-female relationships described hereinabove.

With further reference to FIG. 57, barrier sleeve 1404 is depicted in a fully extended configuration and rests against stop ring 1410. Barrier sleeve 1404 is well clear of the first obstruction 1454 associated with the stuffing box/pump assembly in which it operates. The clearance between the outer diameter of finger portion 1302 and the inner diameter of sleeve body 1354 may be as small as 0.002 inches. The clearance between the outer diameter of barrier sleeve 1404 and the inner diameter of flange 1304 of gland 1300 may be as small as 0.002 inches. These tight clearances enable barrier sleeve 1404 to slide freely axially along the length of finger portions 1302, while maintaining the required clearance between barrier sleeve 1404 and sleeve 1450. Indeed, such clearances ensure that there is no contact made between barrier sleeve 1404 and flange 1304, regardless of the axial position of barrier sleeve 1404. The outer diameter of finger portions 1302 in the region 1302a may be grooved to accept a locating spring loaded ball to correctly position barrier sleeve 1404 relative to lip seals 1402.

Figure 58:
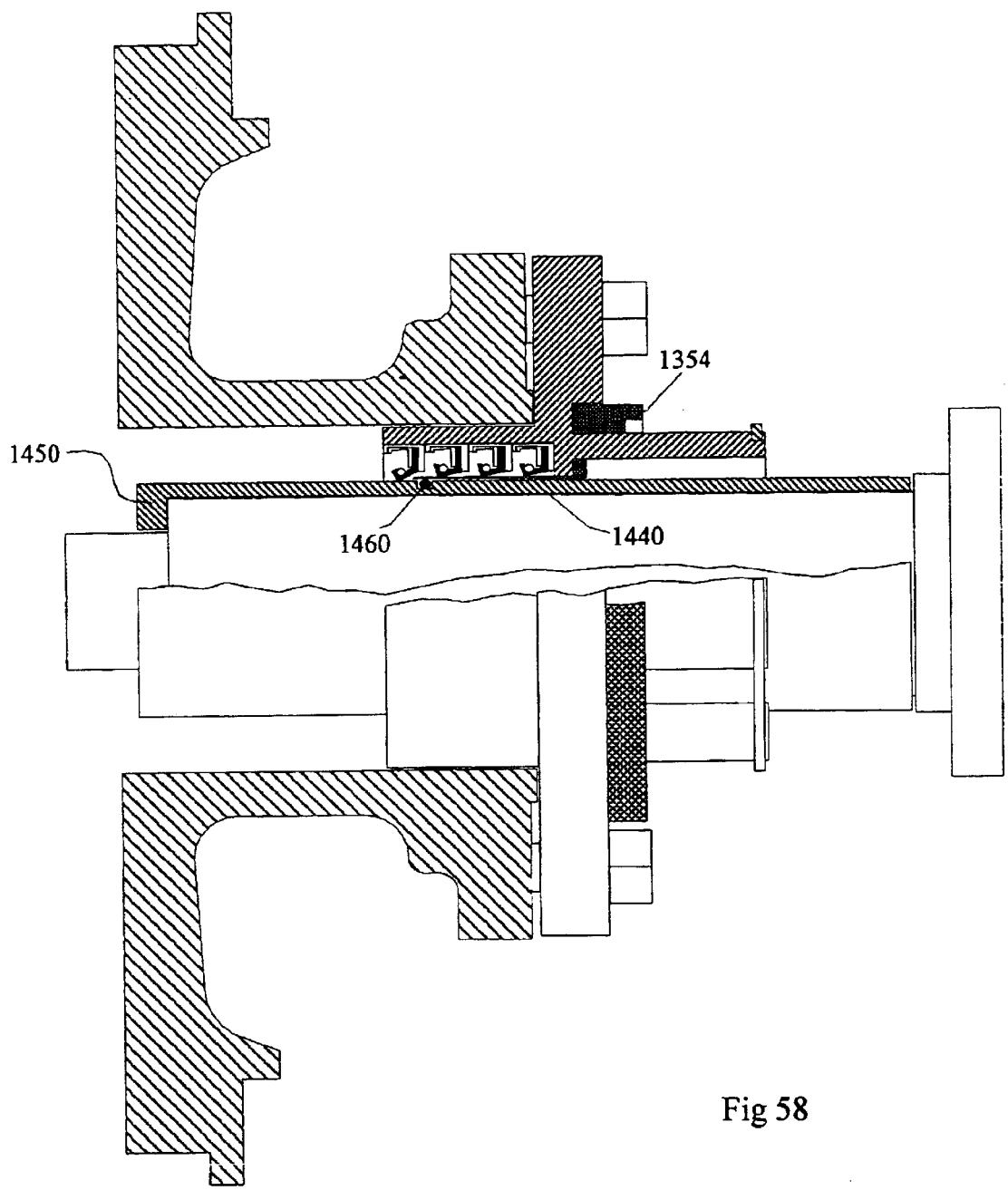

With reference to FIG. 58, an elastomeric bead 1460 installed on an end of sleeve 1450 is depicted. With barrier sleeve 1404 moved fully forward to the left, as shown in FIG. 58, barrier sleeve 1404 may seal against elastomeric bead 1460. This operational orientation may be desirable when lip seal cartridge 1400 is not in use. Thus, elastomeric bead 1460 effectively seals lip seal cartridge in such non-operational configuration.

With reference to FIGS. 59–63, a further sealing apparatus embodiment according to the present disclosure is depicted. Sealing apparatus 1500 includes a gland 1516 and a barrier member defined by a barrier sleeve 1504 and a barrier flange 1502. The barrier sleeve 1504 is in axial alignment with a hooked shaft sleeve 1550 that is adapted to be installed in a stuffing box of a pump or the like. Hooked shaft sleeves are common in many types of pumps and typically utilize the pump's impeller for rotational drive. Resilient lip seals 1506a, 1506b, 1506c, 1506d are mounted within a cartridge 1520 and extend toward shaft sleeve 1550. In the position illustrated in FIG. 59, resilient lip seal 1506a sealingly engages shaft sleeve 1550, while barrier sleeve 1504 is interposed between lip seals 1506b, 1506c, 1506d and shaft sleeve 1550. O-ring 1508 is positioned between barrier sleeve 1504 and gland 1516 to seal therebetween.

Figure 59:
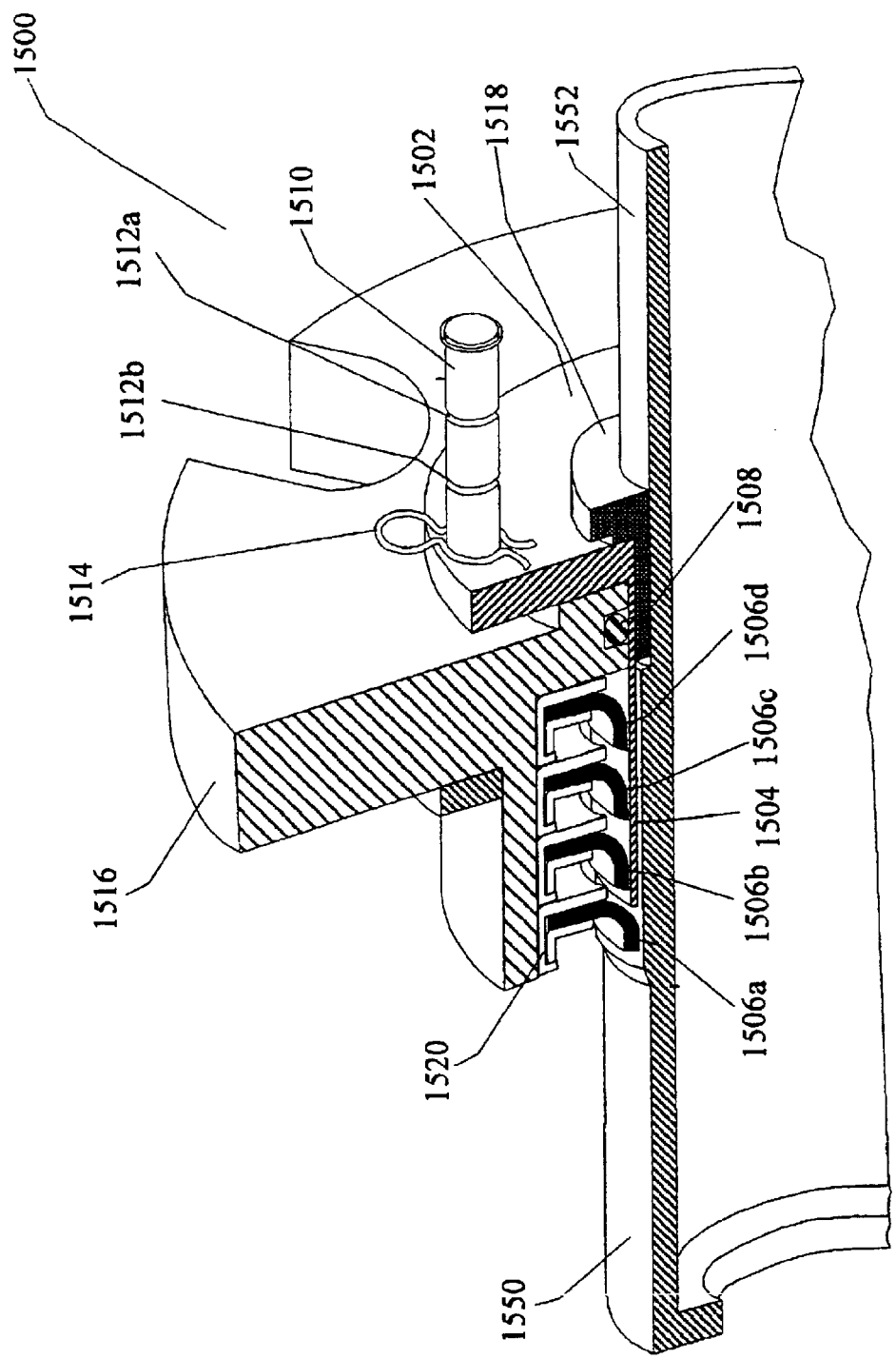
FIG. 59 is a diagrammatic sectional view of a further alternate sealing apparatus according to the present disclosure.

With further reference to the exemplary embodiment of FIGS. 5943, a series of guide pins 1510 extend through aligned apertures formed in barrier flange 1502 and gland 1516 to guide axial movement of barrier sleeve 1504 and to delimit the movement and/or positioning of barrier sleeve 1504 relative to gland 1516. Thus, guide pins 1510 delimit the movement and/or positioning of barrier sleeve 1504 relative to lip seals 1506, as described herein. In a preferred embodiment of sealing apparatus 1500, three ground pins 1510 are utilized, the three pins 1510 being positioned 120 degrees from each other. A series of grooves 1512 are formed in each pin 1510, and a resilient or spring-biased clip 1514 is typically provided for each pin 1510 to cooperate with an appropriate groove 1512 to fix the relative position of the barrier sleeve 1504. As shown in FIG. 59, clip 1514 is clipped to groove 1512c, thereby fixing the positioning of barrier sleeve 1504 interposed between lip seals 1506b, 1506c, 1506d and shaft sleeve 1550.

The apertures formed in the barrier flange 1502 preferably provide a clearance of about 0.001 inches relative to the pins 1510 passing therethrough, and the apertures formed in gland 1516 preferably provide an interference fit of about 0.001 inches relative to the associated guide pin 1510. In forming the apertures and to achieve ease of movement with no interference, the barrier flang 1502 and the gland 1516 are preferably positioned together and clamped. Then, the apertures are generally drilled and reamed in line. Alternative means of fabrication are also contemplated, and the disclosure is not to be limited to the foregoing means of fabrication.

Figure 60:
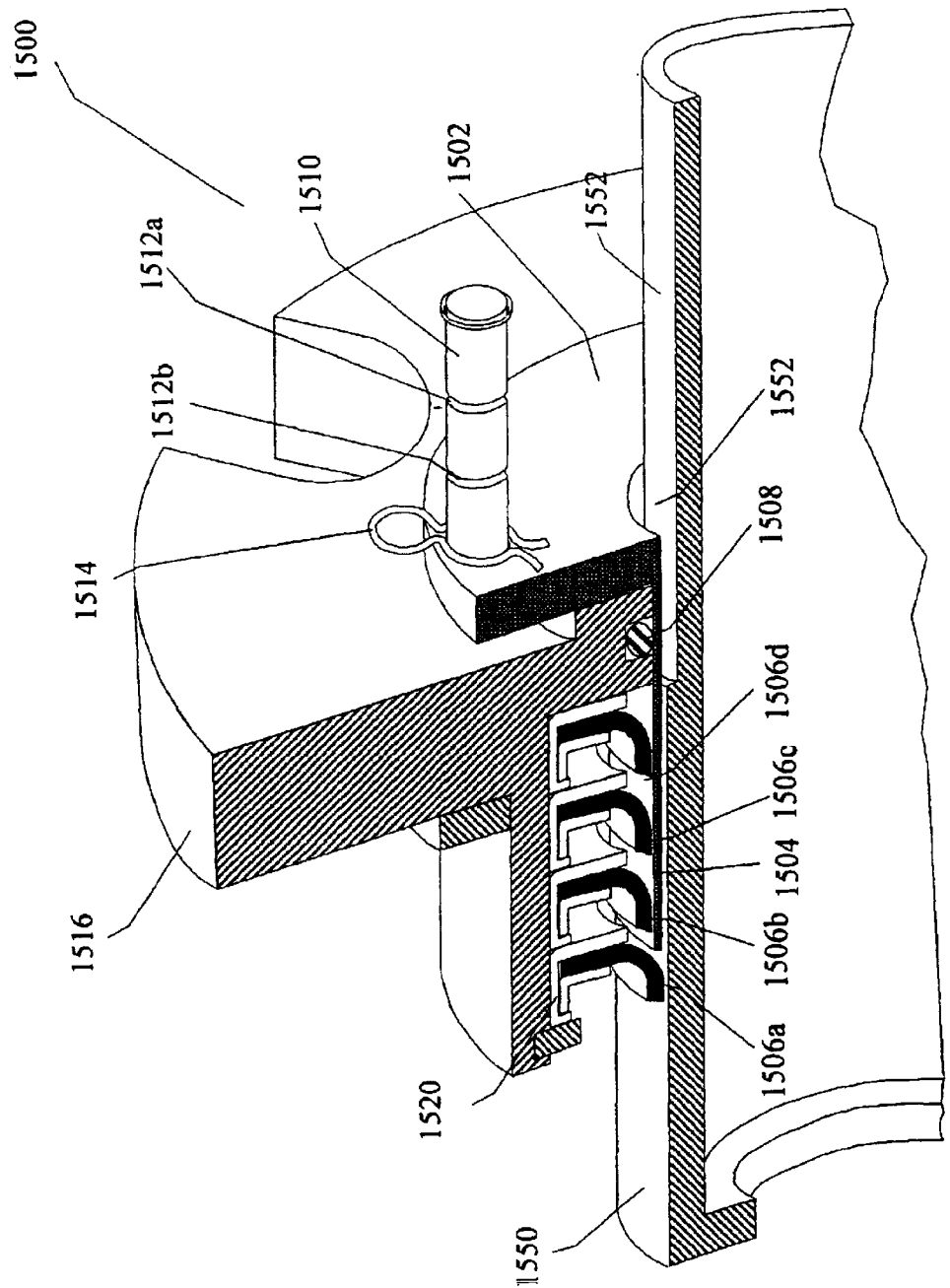
FIGS. 60–63 are further diagrammatic sectional views of the sealing apparatus of FIG. 59.

With further reference to FIG. 59, a split centralizing ring 1518 is initially positioned between barrier sleeve 1504 and shaft sleeve 1550. Centralizing ring 1518 is adapted to slide within a notched region 1552 of reduced diameter formed in shaft sleeve 1550. The outside diameter of the elongated portion of split centralizing ring 1518 is generally about 0.001 inches smaller than the inside diameter of the barrier sleeve 1504. The inside diameter of the split centralizing ring is generally about 0.001 inches larger than the outside diameter of the shaft sleeve 1550 in notched region 1552. These relatively close tolerances ensure that when the sealing apparatus 1500 is installed into the stuffing box of the pump and the gland bolts (not pictured) are tightened, the barrier sleeve 1504 advantageously maintains the desired clearance of about 0.010 inches between barrier sleeve 1504 and shaft sleeve 1550. As shown in FIG. 60, once the gland bolts have been tightened, the centralizing split ring 1518 may be removed and the system is ready for operation.

Figure 61:
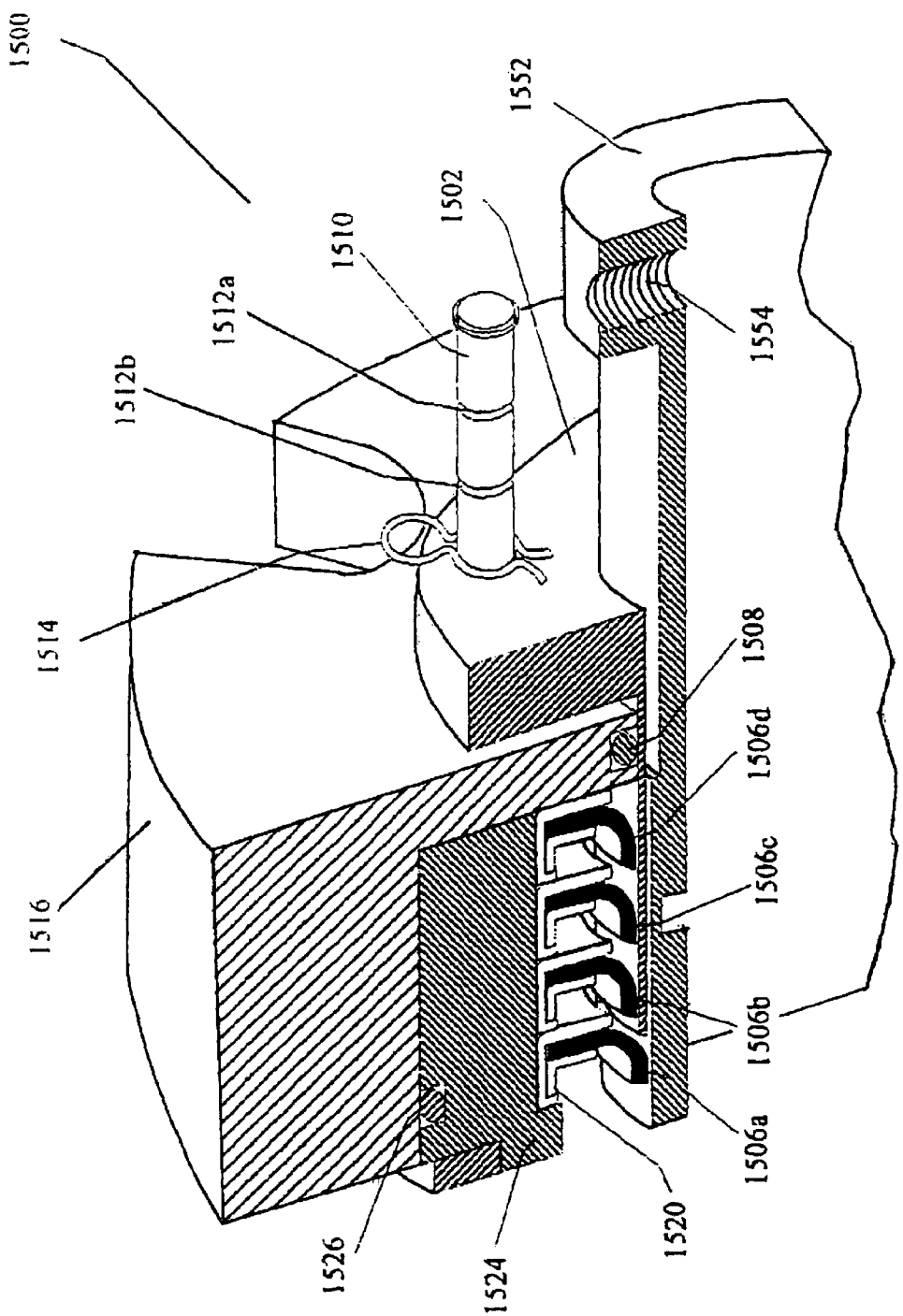
Figure 62:
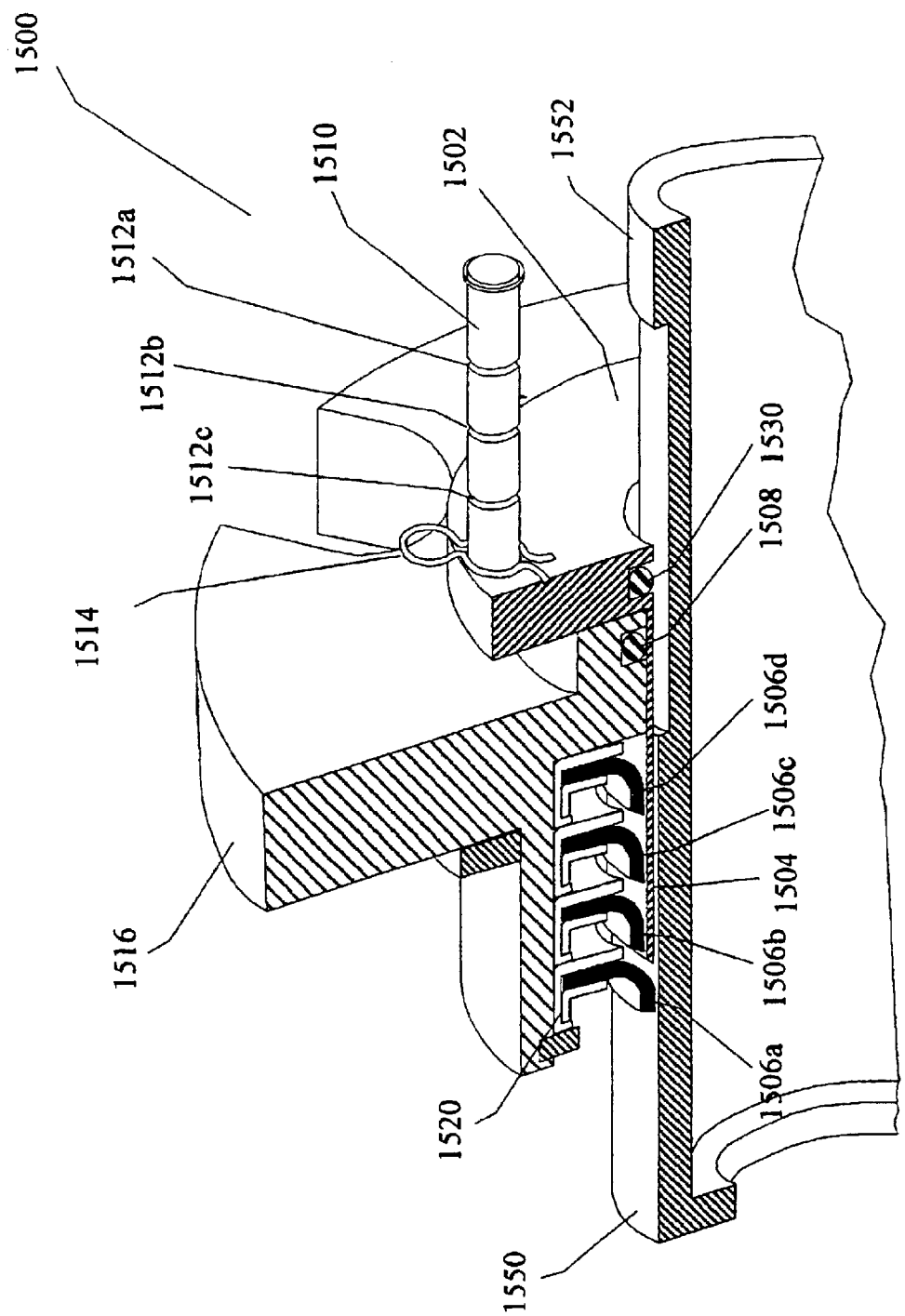
Figure 63:
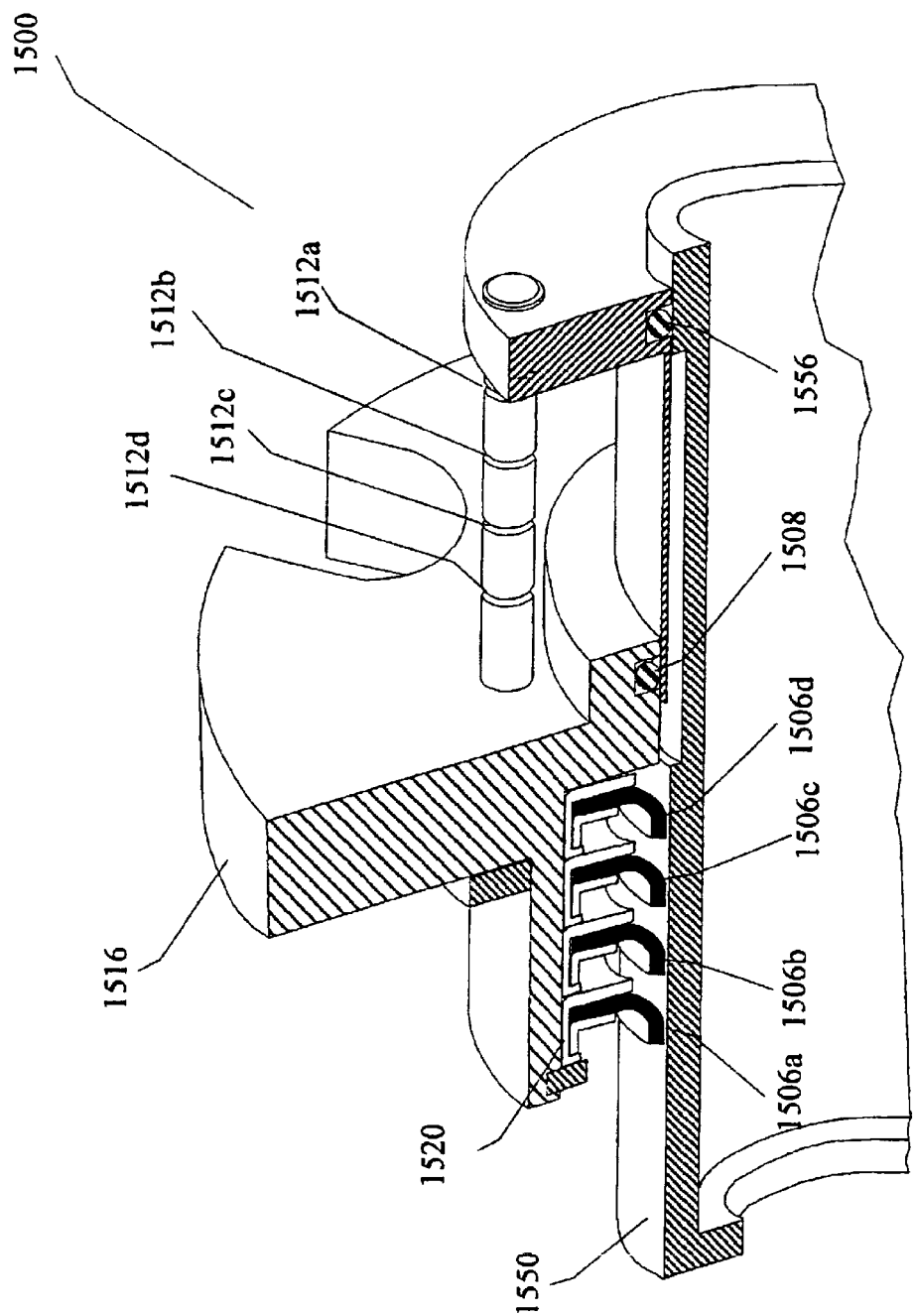

FIG. 61 shows a lip seal cartridge installed inside the gland 1516. Threaded aperture 1554 facilitates the installation of shaft seal 1550. FIGS. 62 and 63 depict sealing apparatus 1500 with an elastomeric O-ring 1530 positioned within barrier flange 1502. With particular reference to FIG. 63, once the last lip seal 1506d has failed and the pump shut down, th barrier sleeve 1504 is moved fully outward and elastomeric O-ring 1530 seals against a shoulder 1556 formed adjacent notched region 1552 in shaft sleeve 1550. The sealing relationship between elastomeric O-ring 1530 and shaft seal 1550, i.e., with the shaft sleeve 1550 in a stationary condition, advantageously isolates the process fluid.

While the present disclosure provides detailed descriptions with reference to preferred embodiments, it is to be understood that various modifications and changes may be made in the construction, arrangement and operation of the sealing systems disclosed herein without departing from the spirit and scope of the invention as defined by the appended claims and reasonable equivalents thereof. For example, for any of the ports, radial channels, and annular channels used for injecting flushing, cooling, lubricating and/or barrier fluid between seal lips, a corresponding outlet radial channel and port can be provided for providing a flow-through liquid circuit. Other variations will become apparent to persons skilled in the art from the detailed description and drawings provided herewith.

What is claimed is:

1. A seal assembly for sealing a shaft within a housing, comprising:
    a) a plurality of resilient seal members radially biased towards said shaft and mounted with respect to said housing, at least one of said resilient seal members disposed to assume a preloaded condition out of contact with said shaft and a loaded condition in sealing contact with said shaft;
    b) a barrier member in axial alignment with said shaft and defining a clearance space between said shaft and said at least one resilient seal member in its preloaded condition, said barrier member physically interposed between said shaft and said at least one resilient seal member in its preloaded condition, said barrier member mounted for movement relative to said shaft;
    c) wherein said at least one resilient seal member deploys from said preloaded condition to said loaded condition in response to movement of said barrier member relative to said shaft, and wherein said movement effects sealing engagement between said at least one resilient seal member and said shaft;
    d) said barrier member being mounted for axial movement relative to said shaft;
    e) said plurality of resilient seal members including first and second resilient seal members configured to assume preloaded and loaded conditions, and wherein said first and second resilient seal members are sequentially deployed from said preloaded condition to said loaded condition in response to axial movement of said barrier member relative to said shaft; and f) said second resilient seal member is deployed into sealing engagement with said shaft in response to a failure of said first resilient sealing element to maintain sealing engagement with said shaft, and wherein said first resilient sealing element effects a partial seal relative to said shaft notwithstanding said failure to maintain sealing engagement with said shaft.

2. A seal assembly according to claim 1, further comprising a leak detector and leak control mechanism, said leak control mechanism adapted to automatically effect said sequential deployment in response to said leak detector sensing a leak relative to said plurality of resilient seal members.

3. A seal assembly for sealing a shaft within a housing, comprising:
   a) a plurality of resilient seal members radially biased towards said shaft and mounted with respect to said housing at least one of said resilient seal members disposed to assume a preloaded condition out of contact with said shaft and a loaded condition in sealing contact with said shaft;
   b) a barrier member in axial alignment with said shaft and defining a clearance space between said shaft and said at least one resilient seal member in its preloaded condition, said barrier member physically interposed between said shaft and said at least one resilient seal member in its preloaded condition, said barrier member mounted for movement relative to said shaft;
   c) wherein said at least one resilient seal member deploys from said preloaded condition to said loaded condition in response to movement of said barrier member relative to said shaft, and wherein said movement effects sealing engagement between said at least one resilient seal member and said shaft;
   d) said barrier member being mounted for axial movement relative to said shaft;
   e) said plurality of resilient seal members including first and second resilient seal members configured to assume preloaded and loaded conditions, and wherein said first and second resilient seal members are sequentially deployed from said preloaded condition to said loaded condition in response to axial movement of said barrier member relative to said shaft; and
   f) a control mechanism for limiting the axial movement of said barrier member relative to said shaft.

4. A seal assembly according to claim 3, wherein said control mechanism defines at least one predetermined increment for axial movement of said barrier member.

5. A seal assembly according to claim 4, wherein said at least one predetermined increment corresponds to deployment of said at least one resilient member from said preloaded condition to said loaded condition.

6. A seal assembly according to claim 4, wherein said at least one predetermined increment is defined by a detent mechanism.

7. A seal assembly for sealing a shaft within a housing, comprising:
   a) a plurality of resilient seal members radially biased towards said shaft and mounted with respect to said housing, at least one of said resilient seal members disposed to assume a preloaded condition out of contact with said shaft and a loaded condition in sealing contact with said shaft;
   b) a barrier member in axial alignment with said shaft and defining a clearance space between said shaft and said at least one resilient seal member in its preloaded condition, said barrier member physically interposed between said shaft and said at least one resilient seal member in its preloaded condition, said barrier member mounted for movement relative to said shaft;
   c) wherein said at least one resilient seal member deploys from said preloaded condition to said loaded condition in response to movement of said barrier member relative to said shaft, and wherein said movement effects sealing engagement between said at least one resilient seal member and said shaft; and
   d) a mechanism for effecting movement of said barrier member relative to said shaft, wherein said mechanism includes a fluid-driven piston.

8. A seal assembly for sealing a shaft within a housing, comprising:
   a) a plurality of resilient seal members radially biased towards said shaft and mounted with respect to said housing, at least one of said resilient seal members disposed to assume a preloaded condition out of contact with said shaft and a loaded condition in sealing contact with said shaft;
   b) a barrier member in axial alignment with said shaft and defining a clearance space between said shaft and said at least one resilient seal member in its preloaded condition, said barrier member physically interposed between said shaft and said at least one resilient seal member in its preloaded condition, said barrier member mounted for movement relative to said shaft;
   c) wherein said at least one resilient seal member deploys from said preloaded condition to said loaded condition in response to movement of said barrier member relative to said shaft, and wherein said movement effects sealing engagement between said at least one resilient seal member and said shaft;
   d) a mechanism for effecting movement of said barrier member relative to said shaft; and
   e) a control mechanism that defines at least one predetermined increment for axial movement of said barrier member relative to said shaft, and wherein said movement of said barrier member relative to said shaft by said mechanism is delimited by said control mechanism.

9. In a seal assembly for sealing a shaft within a housing, said seal assembly including first and second resilient seal members mounted with respect to said housing, the improvement comprising:
   a barrier member defining a barrier region in axial alignment with said shaft and mounted for axial movement relative to said shaft, said barrier region being between said shaft and said first and second resilient seal members, said barrier member physically interposed between said shaft and said first and second resilient seal members;
   wherein said first and second resilient seal members sequentially sealingly engage said shaft in response to translation of said barrier member relative to said a control mechanism defining at least one predetermined increment for axial movement of said barrier member.

10. A method for effecting a seal with a shaft mounted within a stationary housing, comprising:
   a) providing a seal assembly that includes first and second resilient seal members mounted with respect to said stationary housing and a barrier member defining a barrier region in axial alignment with said shaft and mounted for axial movement relative to said shaft, said barrier region being between said shaft and at least said second resilient seal member, said barrier member physically interposed between said shaft and at least said second resilient seal member;

b) moving said barrier member axially relative to said shaft a distance sufficient to free said second resilient seal member from said interposition of said barrier member, said second resilient seal member resiliently moving into sealing engagement with said shaft in response to said barrier member movement, said barrier member is interposed between said shaft and said first and second seal members; and d) wherein said barrier member is moved axially relative to said shaft by introducing a pressurized fluid to a chamber to effect piston-like movement of said barrier member.

11. A method for effecting a seal with a shaft mounted within a stationary housing, comprising:

a) providing a seal assembly that includes first and second resilient seal members mounted with respect to said stationary housing and a barrier member defining a barrier region in axial alignment with said shaft and mounted for axial movement relative to said shaft, said barrier region being between said shaft and at least said second resilient seal member, said barrier member physically interposed between said shaft and at least said second resilient seal member;

b) moving said barrier member axially relative to said shaft a distance sufficient to free said second resilient seal member from said interposition of said barrier member, said second resilient seal member resiliently moving into sealing engagement with said shaft in response to said barrier member movement, said barrier member is interposed between said shaft and said first and second seal members; and c) a leak detector and leak control mechanism, said leak control mechanism adapted to automatically effect said axial movement of said barrier member in response to said leak detector sensing a leak relative to said seal assembly.

12. A method for effecting a seal with a shaft mounted within a stationary housing, comprising:

providing a seal assembly that includes first and second resilient seal members mounted with respect to said stationary housing and a barrier member defining a barrier region in axial alignment with said shaft and mounted for axial movement relative to said shaft, said barrier region being between said shaft and at least said second resilient seal member, said barrier member physically interposed between said shaft and at least said second resilient seal member;

moving said barrier member axially relative to said shaft a distance sufficient to free said second resilient seal member from said interposition of said barrier member, said second resilient seal member resiliently moving into sealing engagement with said shaft in response to said barrier member movement, said barrier member is interposed between said shaft and said first and second seal members;

wherein said shaft is moving relative to said stationary housing, and wherein said movement of said barrier member relative to said shaft is effected without interrupting said shaft movement.

* * * * *

UNITED STATES PATENT AND TRADEMARK OFFICE
CERTIFICATE OF CORRECTION

PATENT NO.        : 6,979,002 B2  
APPLICATION NO. : 10/312020  
DATED             : December 27, 2005  
INVENTOR(S)      : Thomas W. Ramsay Page 1 of 1

It is certified that error appears in the above-identified patent and that said Letters Patent is hereby corrected as shown below:

Claim 9

Column 20, Line 61   Delete "said a" and replace with --said shaft; and a--.

Signed and Sealed this

Tenth Day of October, 2006

JON W. DUDAS  
*Director of the United States Patent and Trademark Office*